US011416524B2

(12) United States Patent
Singi et al.

(10) Patent No.: US 11,416,524 B2
(45) Date of Patent: Aug. 16, 2022

(54) DATA CLASSIFICATION AND MODELLING BASED APPLICATION COMPLIANCE ANALYSIS

(71) Applicant: ACCENTURE GLOBAL SOLUTIONS LIMITED, Dublin (IE)

(72) Inventors: Kapil Singi, Bangalore (IN); Vikrant Kaulgud, Pune (IN); Sanjay Podder, Thane (IN); Adam Patten Burden, Tampa, FL (US); Swapnajeet Gon Choudhury, Bangalore (IN); Rambhau Eknath Rote, Bangalore (IN); Kishore Durg, Bangalore (IN); Raghunandan Hemmige Keshava, Bangalore (IN); Swati Sharma, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/100,569

(22) Filed: Nov. 20, 2020

(65) Prior Publication Data
US 2021/0224298 A1    Jul. 22, 2021

(30) Foreign Application Priority Data

Jan. 22, 2020  (IN) .............................. 202011002845
Sep. 14, 2020  (IN) .............................. 202011039680

(51) Int. Cl.
*G06F 16/28*   (2019.01)
*G06F 16/901*  (2019.01)
*G06N 5/02*    (2006.01)

(52) U.S. Cl.
CPC ........ *G06F 16/285* (2019.01); *G06F 16/9024* (2019.01); *G06N 5/025* (2013.01)

(58) Field of Classification Search
CPC ... G06F 16/285; G06F 16/9024; G06N 5/025; G06N 20/00
(Continued)

(56) References Cited

U.S. PATENT DOCUMENTS

| 10,055,410 B1* | 8/2018 | Dubbels .................. G06F 16/93 |
| 2012/0011077 A1* | 1/2012 | Bhagat ............... G06Q 10/0635 |
| | | 705/317 |

(Continued)

OTHER PUBLICATIONS

Zachary N. J. Peterson et al., "A Position Paper on Data Sovereignty: The Importance of Geolocating Data in the Cloud", Naval Postgraduate School, (2011), (5 pages).
(Continued)

*Primary Examiner* — Evan Aspinwall
(74) *Attorney, Agent, or Firm* — Mannava & Kang, P.C.

(57) ABSTRACT

In some examples, data classification and modelling based application compliance analysis may include generating, for application data for an application, and based on data laws, a knowledge graph schema that is used to generate an instantiated knowledge graph. Based on a plurality of data sources, domain knowledge and patterns, and the instantiated knowledge graph, classified data may be generated to generate an annotated knowledge graph. Based on the annotated knowledge graph, an indication of applicable sovereign laws and compliance related to the application data for the application may be generated. Based on the annotated knowledge graph and the applicable sovereign laws and compliance related to the application data for the application, a sovereign cloud strategy related to the application data for the application may be generated. Further, the sovereign cloud strategy may be applied to the application data for the application.

20 Claims, 42 Drawing Sheets

(58) Field of Classification Search
USPC .......................................................... 707/740
See application file for complete search history.

(56) References Cited

U.S. PATENT DOCUMENTS

| | | | | |
|---|---|---|---|---|
| 2016/0306989 | A1* | 10/2016 | Embleton | G06F 21/602 |
| 2017/0220964 | A1* | 8/2017 | Datta Ray | H04L 63/20 |
| 2017/0236077 | A1* | 8/2017 | Venna | G06F 16/33 |
| | | | | 705/7.28 |
| 2017/0371860 | A1* | 12/2017 | McAteer | G06F 40/30 |
| 2018/0189388 | A1* | 7/2018 | Baldini Soares | G06F 16/9024 |

OTHER PUBLICATIONS

Mark Gondree et al., "Geolocation of Data in the Cloud", Naval Postgraduate School, (2013), (13 pages).
Lo'ai Tawalbeh et al., "A Secure Cloud Computing Model based on Data Classification", First International Workshop on Mobile Cloud Computing Systems, Management, and Security (MCSMS-2015), (6 pages).
Rizwana Shaikha et al., "Data Classification for achieving Security in cloud computing", Procedia Computer Science 45 ( 2015 ) pp. 493-498, (6 pages).
Joachim Daiber et al., "Improving Efficiency and Accuracy in Multilingual Entity Extraction", (2013), (4 pages).
Shuo Yang et al., "Efficiently Answering Technical Questions—A Knowledge Graph Approach", (2017), (8 pages).
Chetan Jaiswal et al., "IGOD: Identification of Geolocation of Cloud Datacenters", Department of Computer Science and Electrical Engineering, University of Missouri. (2015), (8 pages).
Patrick Ernst et al., "KnowLife: a Knowledge Graph for Health and Life Sciences", Harvard School of Engineering and Applied Sciences, 2014 IEEE, pp. 12541257, (4 pages).
Office Journal of the European Communities, Directive of 95/46/EC of the European Parliament and of the Council on the protection of individuals with regard to the processing of personal data and on the free movement of such data:, Oct. 24, 1995, (20 pages).
DataSunrise-Data & Database Security and Compliance (2020), (8 pages).

* cited by examiner

LAWS APPLICABILITY BASED ON DATA CLASSIFICATION

| COUNTRIES | LOCALIZATION | MEDICAL DATA | FINANCIAL DATA | | | SENSITIVE DATA | |
|---|---|---|---|---|---|---|---|
| | | Health_Info | Credit_Card_Info | Bank_Info | Religious_Info | Ethnicity_Info | Sexual_Orientation_Info |
| USA | X | HIPAA | PCI DSS, FCRA | | DPPA | | |
| Singapore | X | Private Hospital And Medical Clinic Act | PCI DSS | MAS, Banking Act | PDP | | |
| France | X | GDPR | GDPR, PCI DSS | | | GDPR-Article-9 | GDPR-Article-9 |

☐ DATA IDENTIFIED AND CLASSIFIED  ▒ DATA NOT PRESENT

*FIG. 7*

| MULTI-CLOUD DEPLOYMENT ARCHITECTURE | Cloud Service Provider | Region | Data Center | Cloud Strategy |
|---|---|---|---|---|
| 1. Data localization laws | | ✓ | ✓ | PRIVATE PUBLIC MULTI HYBRID & ON-PREMISE STRATEGY |
| 2. Data sovereignty compliance | ✓ | | | |
| 3. Cloud interoperability | ✓ | ✓ | | |
| 4. Application landscape inc. infrastructure | | ✓ | ✓ | |
| 5. Business SLA's such as Availability etc. | | | | |

GENERATE, FOR APPLICATION DATA FOR AN APPLICATION, AND BASED ON DATA LAWS, AN ANNOTATED KNOWLEDGE GRAPH
3702

GENERATE, BASED ON THE ANNOTATED KNOWLEDGE GRAPH, AN INDICATION OF APPLICABLE SOVEREIGN LAWS AND COMPLIANCE RELATED TO THE APPLICATION DATA FOR THE APPLICATION
3704

GENERATE, BASED ON THE ANNOTATED KNOWLEDGE GRAPH AND THE APPLICABLE SOVEREIGN LAWS AND COMPLIANCE RELATED TO THE APPLICATION DATA FOR THE APPLICATION, A SOVEREIGN CLOUD STRATEGY RELATED TO THE APPLICATION DATA FOR THE APPLICATION
3706

APPLY, BASED ON THE SOVEREIGN CLOUD STRATEGY RELATED TO THE APPLICATION DATA FOR THE APPLICATION, THE SOVEREIGN CLOUD STRATEGY TO THE APPLICATION DATA FOR THE APPLICATION
3708

*FIG. 37*

DATA CLASSIFICATION AND MODELLING BASED APPLICATION COMPLIANCE ANALYSIS

PRIORITY

This application is a Non-Provisional Application of commonly assigned and co-pending Provisional Application Serial Number 202011039680, filed Sep. 14, 2020, and co-pending Provisional Application Serial Number 202011002845, filed Jan. 22, 2020, the disclosures of which are hereby incorporated by reference in their entireties.

BACKGROUND

A software application may be used by various users that are dispersed across multiple geographies. The application may be deployed and/or hosted within private, public, hybrid cloud, or entirely in an organization's data center. Such applications may need to comply with various rules and regulations.

BRIEF DESCRIPTION OF DRAWINGS

Features of the present disclosure are illustrated by way of example and not limited in the following figure(s), in which like numerals indicate like elements, in which:

FIG. 7 illustrates data classification based law applicability to illustrate operation of the data classification and modelling based application compliance analysis apparatus of FIG. 1 in accordance with an example of the present disclosure;

FIG. 17 illustrates data sovereignty and sovereign cloud strategy recommendation to illustrate operation of the data classification and modelling based application compliance analysis apparatus of FIG. 1 in accordance with an example of the present disclosure;

FIG. 33 illustrates details related to multi-vendor hybrid strategy associated with the sovereign cloud strategy generator to illustrate operation of the data classification and modelling based application compliance analysis apparatus of FIG. 1 in accordance with an example of the present disclosure;

FIG. 37 illustrates a flowchart of an example method for data classification and modelling based application compliance analysis in accordance with an example of the present disclosure.

DETAILED DESCRIPTION

Figure 1:
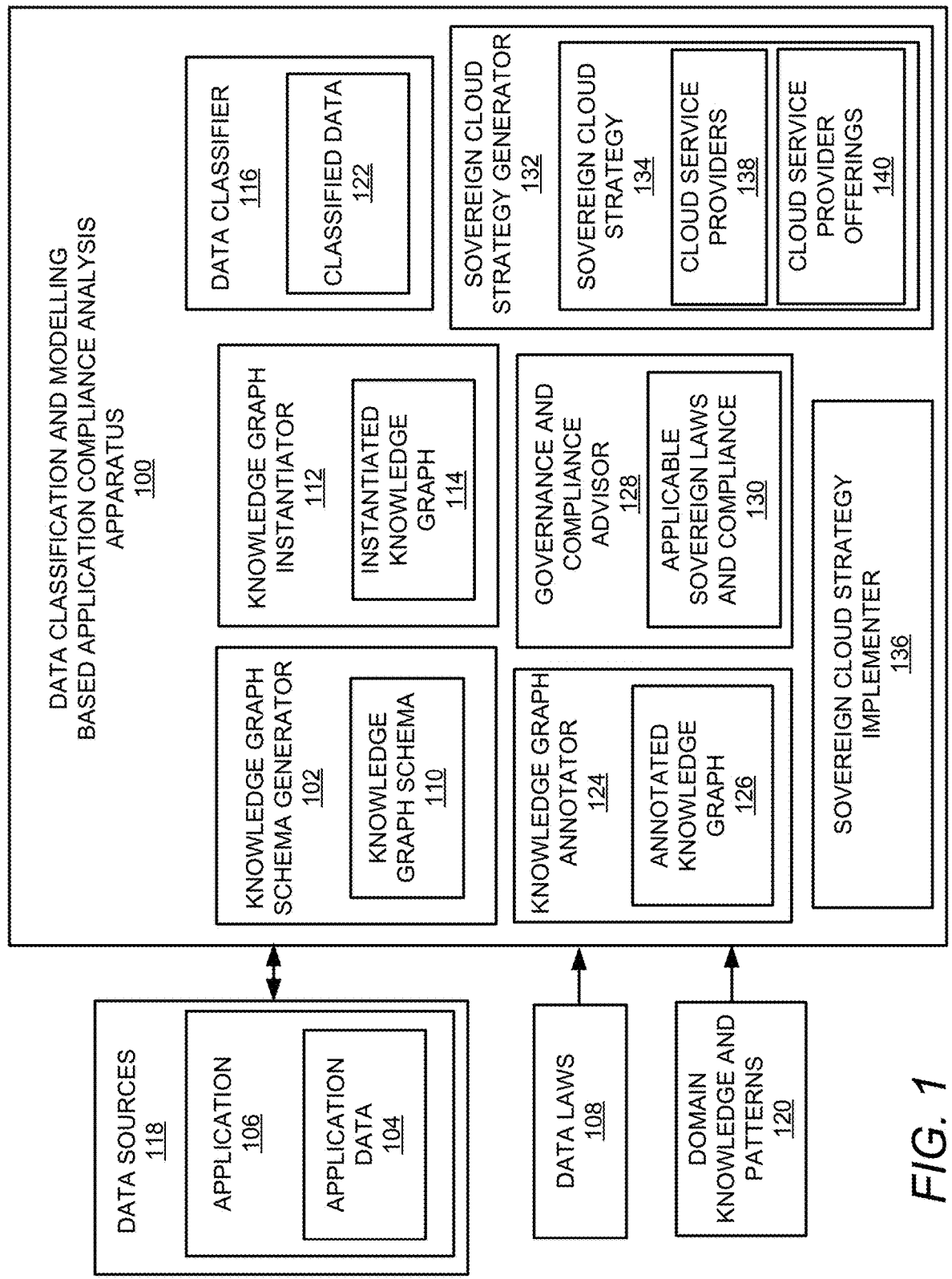
FIG. 1 illustrates a layout of a data classification and modelling based application compliance analysis apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Data classification and modelling based application compliance analysis apparatuses, methods for data classification and modelling based application compliance analysis, and non-transitory computer readable media having stored thereon machine readable instructions to provide data classification and modelling based application compliance analysis are disclosed herein. The apparatuses, methods, and non-transitory computer readable media disclosed herein provide for data classification and modelling based application compliance analysis by generating a knowledge graph (e.g., a knowledge model) based on the aspects of data classification rules, regional sovereignty laws, and cloud service provider information. In this regard, the apparatuses, methods, and non-transitory computer readable media disclosed herein provide for generation of a knowledge graph based data sovereignty governance framework to classify data and identify relevant applicable laws. The apparatuses, methods, and non-transitory computer readable media disclosed herein provide for the analysis of an application's relational database to classify the data based on data classification aspects. In this regard, regional and locational information about application users, as well as applicable sovereignty laws including data localization laws based on a user's regional information may be identified and analyzed. The various applicable regulations and rules within the laws may be identified by determining priorities using a regional sovereignty approach as disclosed herein. An application deployment strategy or migration to the cloud based on a cloud service provider's information that includes various cloud service provide offerings may also be recommended and applied for storage of application data for an application.

With respect to application compliance, a software application may be generally used by various users dispersed across multiple geographies. The software application may be deployed and/or hosted within private, public, hybrid cloud, or entirely in an organization's data centers (e.g., on-premise). The application hosted in a particular country may need to adhere to the laws of the hosted country or state (e.g., data sovereignty compliance). In contrast, data localization laws may represent regulations enforcing how data can be processed in a certain territory. Each country or region may have many laws pertaining to domains such as finance, medical, etc. (e.g., Health Insurance Portability and Accountability Act (HIPAA)) or privacy and protection laws for individual citizens of a country (such as General Data Protection Regulation (GDPR)) which becomes part of data localization and sovereignty laws (e.g., data laws as disclosed herein). Further, such laws may be evolving as governments and regulatory bodies keep enhancing these laws as and when they discover new issues and loopholes. With ever evolving regulations, it is technically challenging for an organization to keep track of regulations and accordingly adopt their application to be compliant.

Yet further, data has emerged as a central commodity in most modern applications. Unregulated and rampant collection of user and usage data by applications has led to concerns on privacy, trust, and ethics. This has resulted in several governments and organizations across geographies to frame laws on data that govern and define boundaries for the storage, processing and transitioning of data, and thereby safeguard the interests of its citizens. Data sovereignty and data localization are two important aspects, which deal with the adherence to the laws and governance structures, that define where and how data is collected and processed. The applicability of different data laws depends upon several attributes such as the nature, type, and purpose of data. Non-compliance to data laws and regulations can lead to serious repercussions for enterprises, ranging from penalties to loss of brand value. In this regard, it is technically challenging for enterprises to ensuring that all of their applications are complaint to various data laws. Enterprises have to account with a plethora of data laws (that are constantly evolving) and are often unclear even in correctly identifying all the applicable data laws for their context let alone ensuring compliance to regulations.

The apparatuses, methods, and non-transitory computer readable media disclosed herein address at least the aforementioned further technical challenges by implementing a knowledge graph (e.g., a knowledge model) based on the aspects of data classification rules, regional sovereignty laws, and cloud service providers information. In this regard, an application's relational database (e.g., that stores application data as disclosed herein) may be analyzed to classify data based on a model's data classification aspect. Regional and localization aspects of application users may be determined, and sovereignty laws including data localization laws may be identified based on a user's localization aspects. Applicable laws may be prioritized and recommended, and cloud service providers may be ranked and recommended with respect to an application's cloud deployment or migration strategy. In this regard, the apparatuses, methods, and non-transitory computer readable media disclosed herein provide for the recommendation of an optimum cloud deployment and migration strategy adhering to data sovereignty compliance based on application data classification and analysis.

The apparatuses, methods, and non-transitory computer readable media disclosed herein may further provide for implementation of a knowledge-graph based data sovereignty governance framework to assist an organization in analyzing their data sources, and generate an indication of relevant applicable regulations that an organization has to adhere to. In this regard, the knowledge-graph based data sovereignty governance framework may include (i) creation of knowledge graph schemas for different regulations/laws, (ii) identification of different classes of data elements, (iii) classification of applications data into their corresponding type, (iv) mapping of application data onto a knowledge graph of regulations, and (v) identification of applicable laws and rules on the classified data.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example data classification and modelling based application compliance analysis apparatus (hereinafter also referred to as "apparatus 100").

Referring to FIG. 1, the apparatus 100 may include a knowledge graph schema generator 102 that is executed by at least one hardware processor (e.g., the hardware processor 3602 of FIG. 36, and/or the hardware processor 3804 of FIG. 38) to generate, for application data 104 for an application 106, and based on data laws 108, a knowledge graph schema 110.

Figure 3:
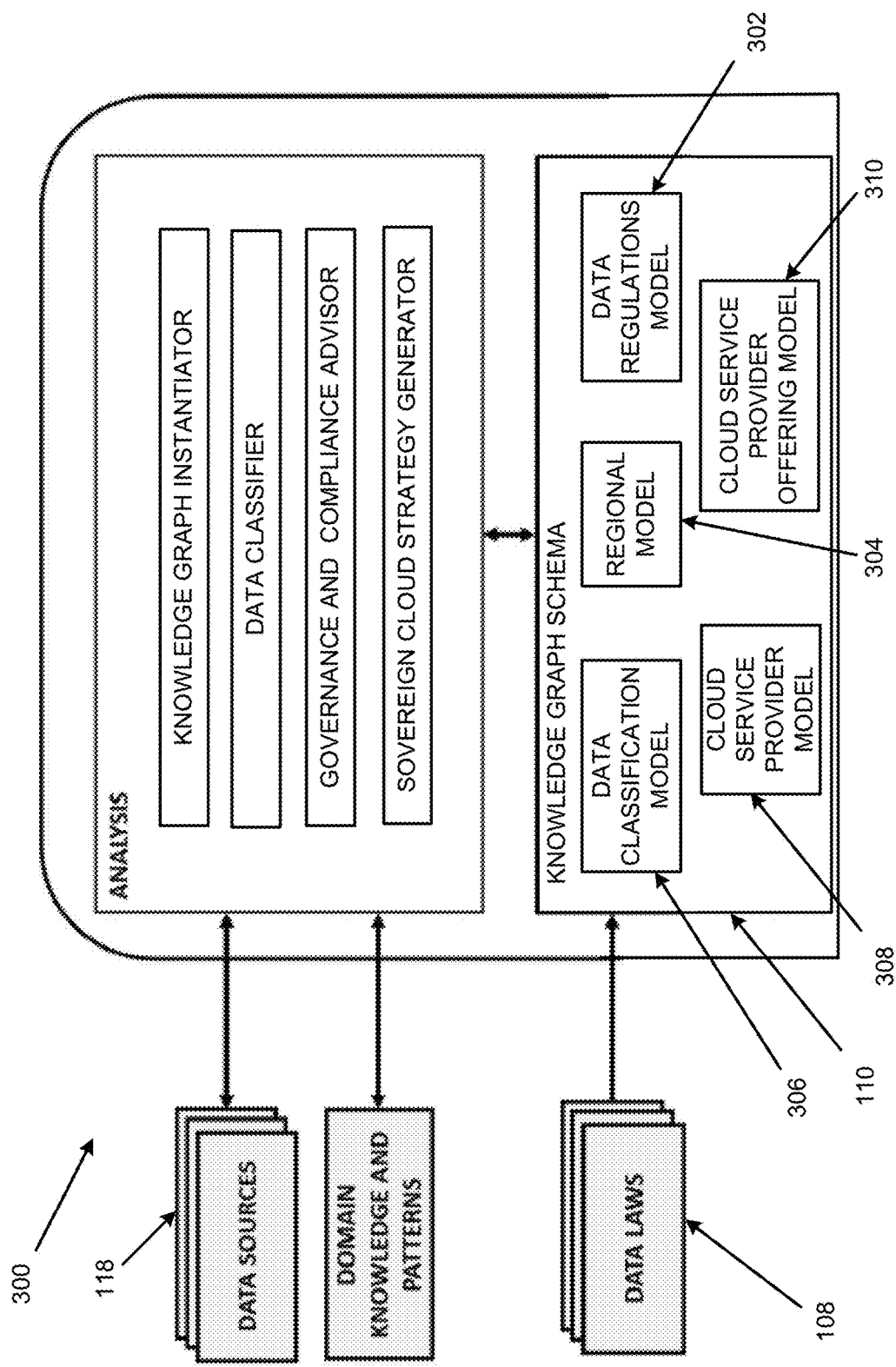
FIG. 3 illustrates a data sovereignty governance framework to illustrate operation of the data classification and modelling based application compliance analysis apparatus of FIG. 1 in accordance with an example of the present disclosure.

According to examples disclosed herein with respect to FIGS. 1 and 3, the knowledge graph schema 110 may include a data classification model to classify the application data 104 according to the data laws 108. Additionally or alternatively, the knowledge graph schema 110 may include a regional model to encapsulate geographies with respect to larger geographical entities. Additionally or alternatively, the knowledge graph schema 110 may include a data regulations model to encapsulate the data laws 108 for regions associated with storage of the application data 104 for the application 106. Additionally or alternatively, the knowledge graph schema 110 may include a cloud service provider model to encapsulate properties associated with cloud service providers for the storage of the application data 104 for the application 106. Additionally or alternatively, the knowledge graph schema 110 may include a cloud service provider offering model to encapsulate cloud service offerings associated with the cloud service providers.

A knowledge graph instantiator 112 that is executed by at least one hardware processor (e.g., the hardware processor 3602 of FIG. 36, and/or the hardware processor 3804 of FIG. 38) may generate, based on the data laws 108 and the knowledge graph schema 110, an instantiated knowledge graph 114. The instantiated knowledge graph 114 may also be referred to as a knowledge model.

A data classifier 116 that is executed by at least one hardware processor (e.g., the hardware processor 3602 of FIG. 36, and/or the hardware processor 3804 of FIG. 38) may generate, based on a plurality of data sources 118, domain knowledge and patterns 120, and the instantiated knowledge graph 114, classified data 122. The domain knowledge and patterns 120 may represent knowledge of the terms and terminology used by a relevant domain and industry. Each domain and industry may define its own set of terms and terminology which needs to be modeled into the instantiated knowledge graph 114 as domain knowledge. For example, a term "report" in a health industry may refer to a medical report whereas the same term may refer to a financial report in a financial industry. With respect to domain knowledge and patterns 120, a pattern may define all of the combinations that may be used to identify a term or terminology. A term or terminology may have one or more patterns associated therewith. The volume of a pattern in a classification process may be directly proportionate to the effectiveness of the classification process to identify the term or terminology from input data. Patterns may facilitate identification of relevant data(d′) from input data. The relevant data may then be mapped to the domain knowledge to apply context to the data and understand its appropriate meaning. For example, for the pattern {rep%id, %rep_id%, repoid} which is used to capture report id from an input source, once identified, the classifier may need to understand what a report id means in the context of the domain to which the input source of data belongs to. In this example, if the domain is considered to be health care, then the classifier may determine that the report id may refer to a medical record, classify the data as personal-health data, and thereafter this knowledge may be used to identify the pertinent regulation.

A knowledge graph annotator 124 that is executed by at least one hardware processor (e.g., the hardware processor 3602 of FIG. 36, and/or the hardware processor 3804 of FIG. 38) may generate, based on the classified data 122 and the instantiated knowledge graph 114, an annotated knowledge graph 126.

A governance and compliance advisor 128 that is executed by at least one hardware processor (e.g., the hardware processor 3602 of FIG. 36, and/or the hardware processor 3804 of FIG. 38) may generate, based on the annotated knowledge graph 126, an indication of applicable sovereign laws and compliance 130 related to the application data 104 for the application 106.

A sovereign cloud strategy generator 132 that is executed by at least one hardware processor (e.g., the hardware processor 3602 of FIG. 36, and/or the hardware processor 3804 of FIG. 38) may generate, based on the annotated knowledge graph 126 and the applicable sovereign laws and compliance 130 related to the application data 104 for the application 106, a sovereign cloud strategy 134 related to the application data 104 for the application 106.

According to examples disclosed herein, the sovereign cloud strategy generator 132 may generate, based on the annotated knowledge graph 126 and the applicable sovereign laws and compliance 130 related to the application data 104 for the application 106, the sovereign cloud strategy 134 that includes a ranking of cloud service providers 138 for storage of the application data 104 for the application 106.

According to examples disclosed herein with respect to FIGS. 1 and 16-19, the sovereign cloud strategy generator 132 may determine, for each cloud service provider of the cloud service providers 138, and for each factor of a plurality of factors associated with the applicable sovereign laws and compliance 130, a score.

Figure 20:
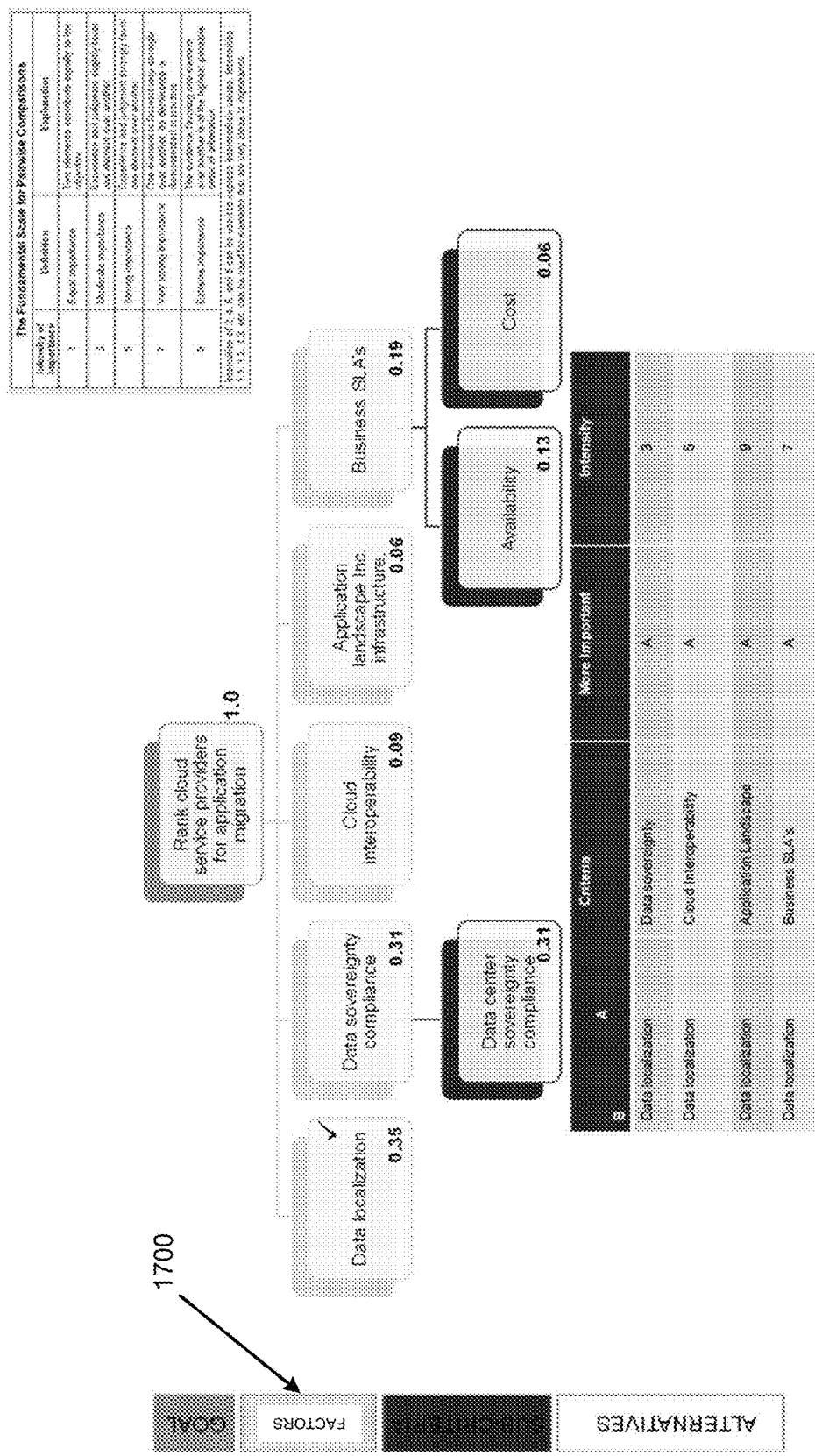
FIG. 20 illustrates further details of data sovereignty and sovereign cloud strategy recommendation to illustrate operation of the data classification and modelling based application compliance analysis apparatus of FIG. 1 in accordance with an example of the present disclosure.
Figure 21:
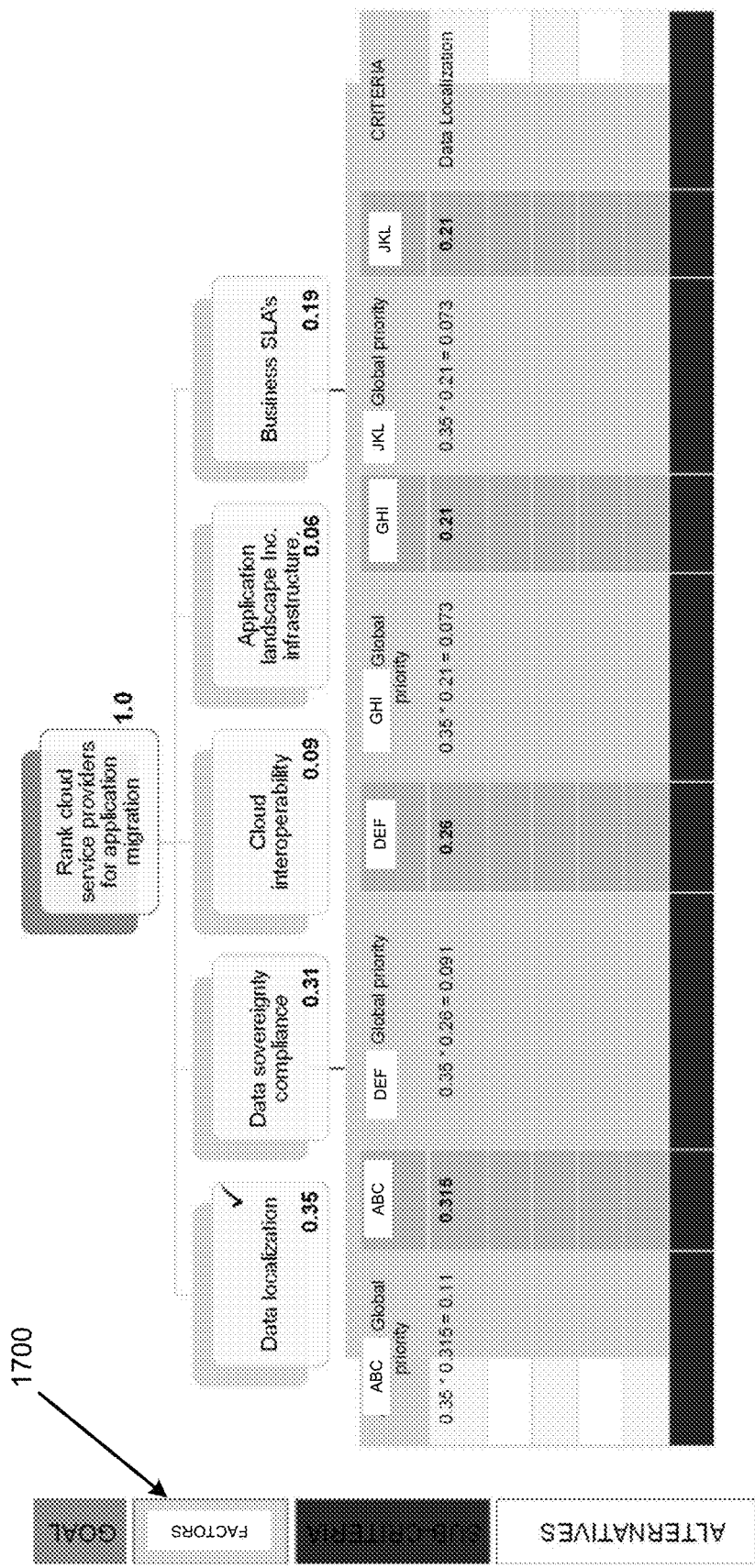
FIG. 21 illustrates further details of data sovereignty and sovereign cloud strategy recommendation to illustrate operation of the data classification and modelling based application compliance analysis apparatus of FIG. 1 in accordance with an example of the present disclosure.

According to examples disclosed herein with respect to FIGS. 1 and 20-21, the sovereign cloud strategy generator 132 may modify, based on a weight associated with each factor of the plurality of factors, the score to generate, for each cloud service provider of the cloud service providers 138, and for each factor of the plurality of factors, a weighted score.

Figure 22:
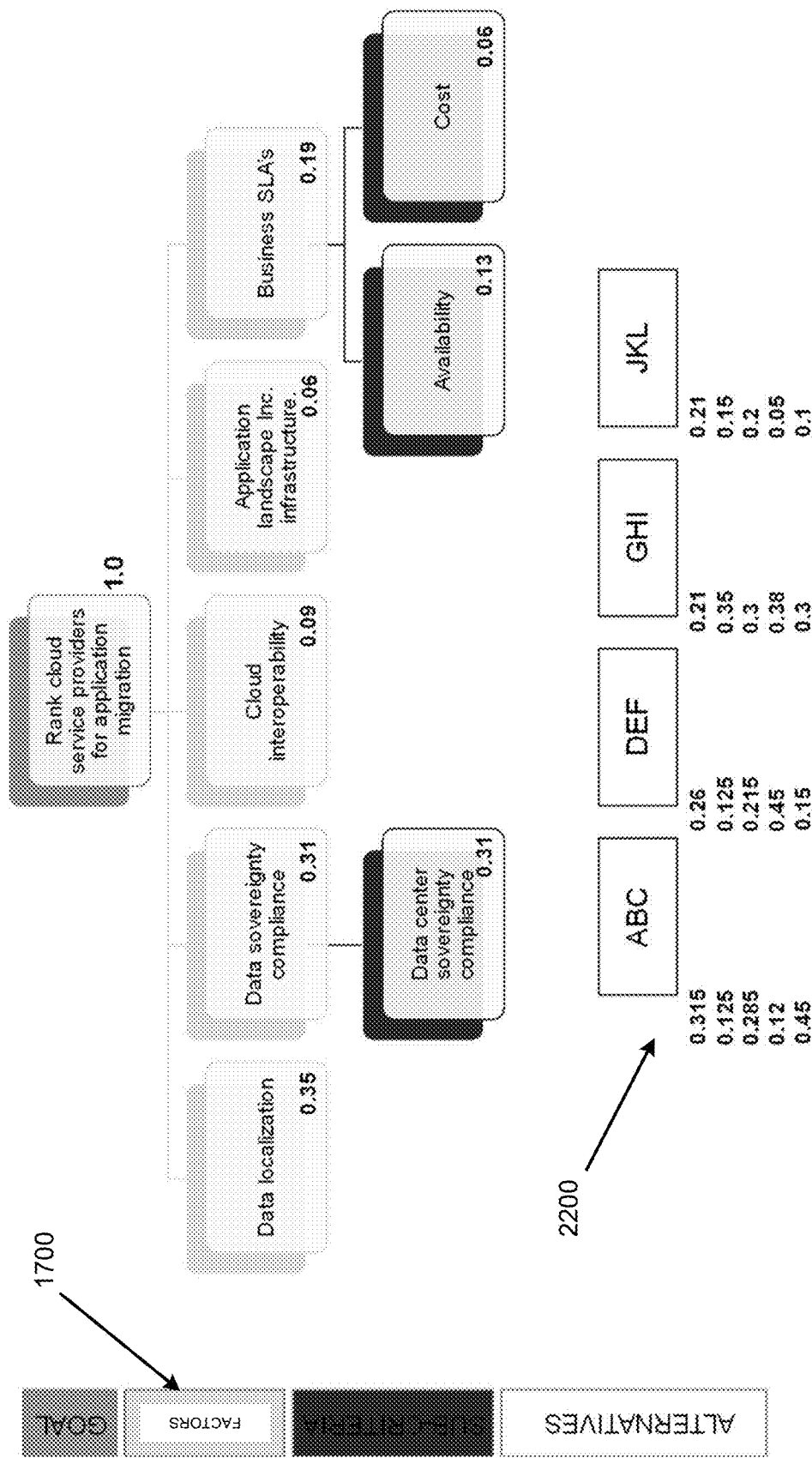
FIG. 22 illustrates further details of data sovereignty and sovereign cloud strategy recommendation to illustrate operation of the data classification and modelling based application compliance analysis apparatus of FIG. 1 in accordance with an example of the present disclosure.
Figure 23:
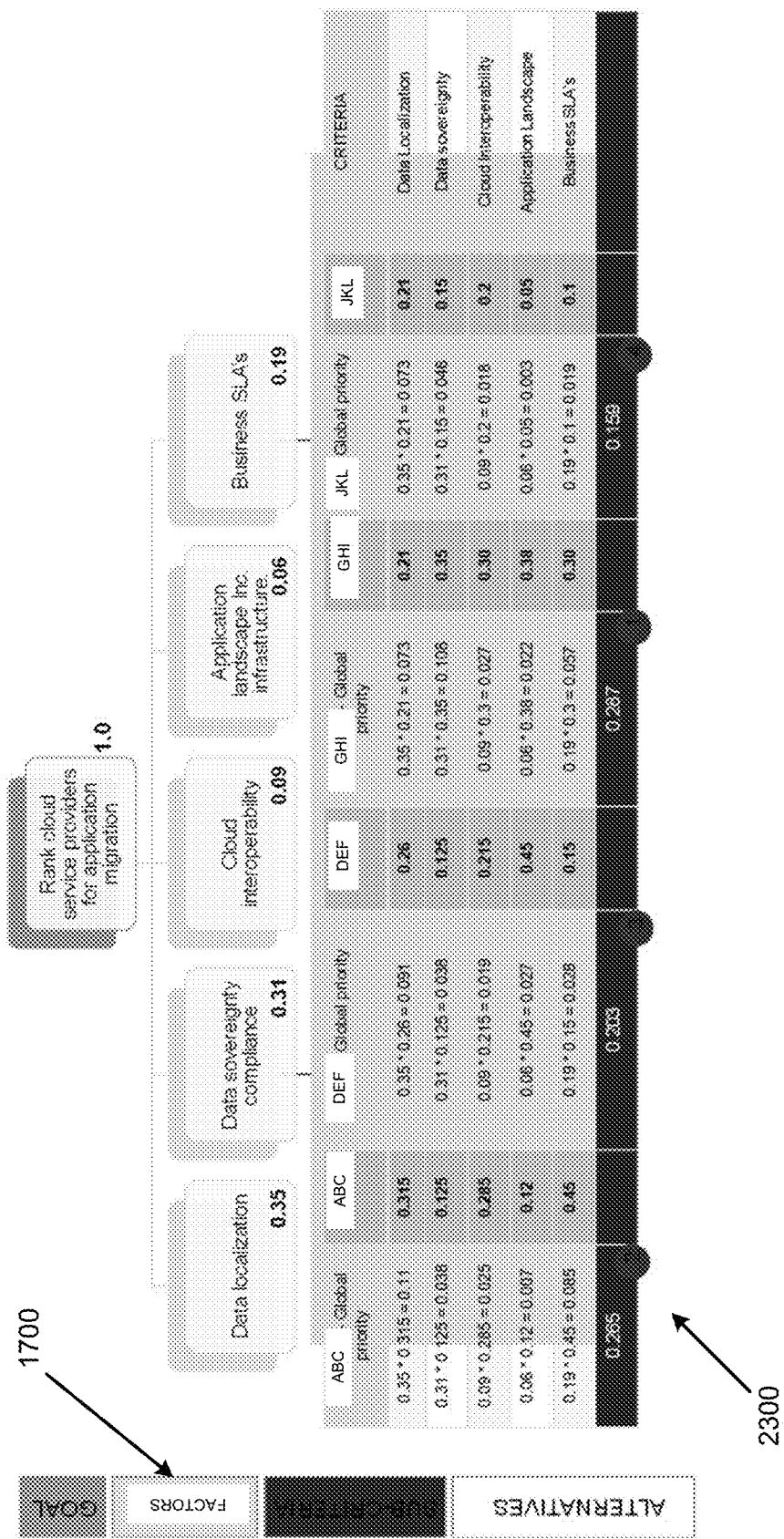
FIG. 23 illustrates further details of data sovereignty and sovereign cloud strategy recommendation to illustrate operation of the data classification and modelling based application compliance analysis apparatus of FIG. 1 in accordance with an example of the present disclosure.

According to examples disclosed herein with respect to FIGS. 1, 22, and 23, the sovereign cloud strategy generator 132 may determine, for each cloud service provider of the cloud service providers 138 and based on the weighted score corresponding to each factor of the plurality of factors, an overall weighted factor score. Further, the sovereign cloud strategy generator 132 may rank, based on the overall weighted factor score for each cloud service provider of the cloud service providers 138, the cloud service providers 138.

According to examples disclosed herein, the sovereign cloud strategy generator 132 may generate, for a highest ranked cloud service provider of the ranked cloud service providers 138, a ranking of cloud service provider offerings 140 for storage of the application data 104 for the application 106.

According to examples disclosed herein, the sovereign cloud strategy generator 132 may generate, for each of the ranked cloud service providers 138, a ranking of cloud service provider offerings 140 for storage of the application data 104 for the application 106. In this regard, as disclosed herein with respect to FIGS. 1 and 27, the sovereign cloud strategy generator 132 may determine, based on analysis of a plurality of ranked cloud service provider and ranked cloud service provider offering combinations, a best fit cloud service provider and cloud service provider offering combination. Thus, a best fit cloud service provider may be determined (and implemented) based on factors associated with cloud service providers, as well as factors associated with cloud service provider offerings to identify, for a particular application 106, a best fit cloud service provider (which may be lower ranked cloud service provider), and an associated cloud service provider offering.

A sovereign cloud strategy implementer 136, executed by the at least one hardware processor that is executed by at least one hardware processor (e.g., the hardware processor 3602 of FIG. 36, and/or the hardware processor 3804 of FIG. 38) may apply, based on the sovereign cloud strategy 134 related to the application data 104 for the application 106, the sovereign cloud strategy 134 to the application data 104 for the application 106.

According to examples disclosed herein, the sovereign cloud strategy implementer 136 may apply, based on the sovereign cloud strategy related to the application data for the application, a highest ranked cloud service provider offering of the ranked cloud service provider offerings 140 to store the application data 104 for the application 106. Alternatively, as disclosed herein, the sovereign cloud strategy implementer 136 may apply, based on the sovereign cloud strategy related to the application data for the application, the best fit cloud service provider and cloud service provider offering combination to store the application data 104 for the application 106.

Figure 2:
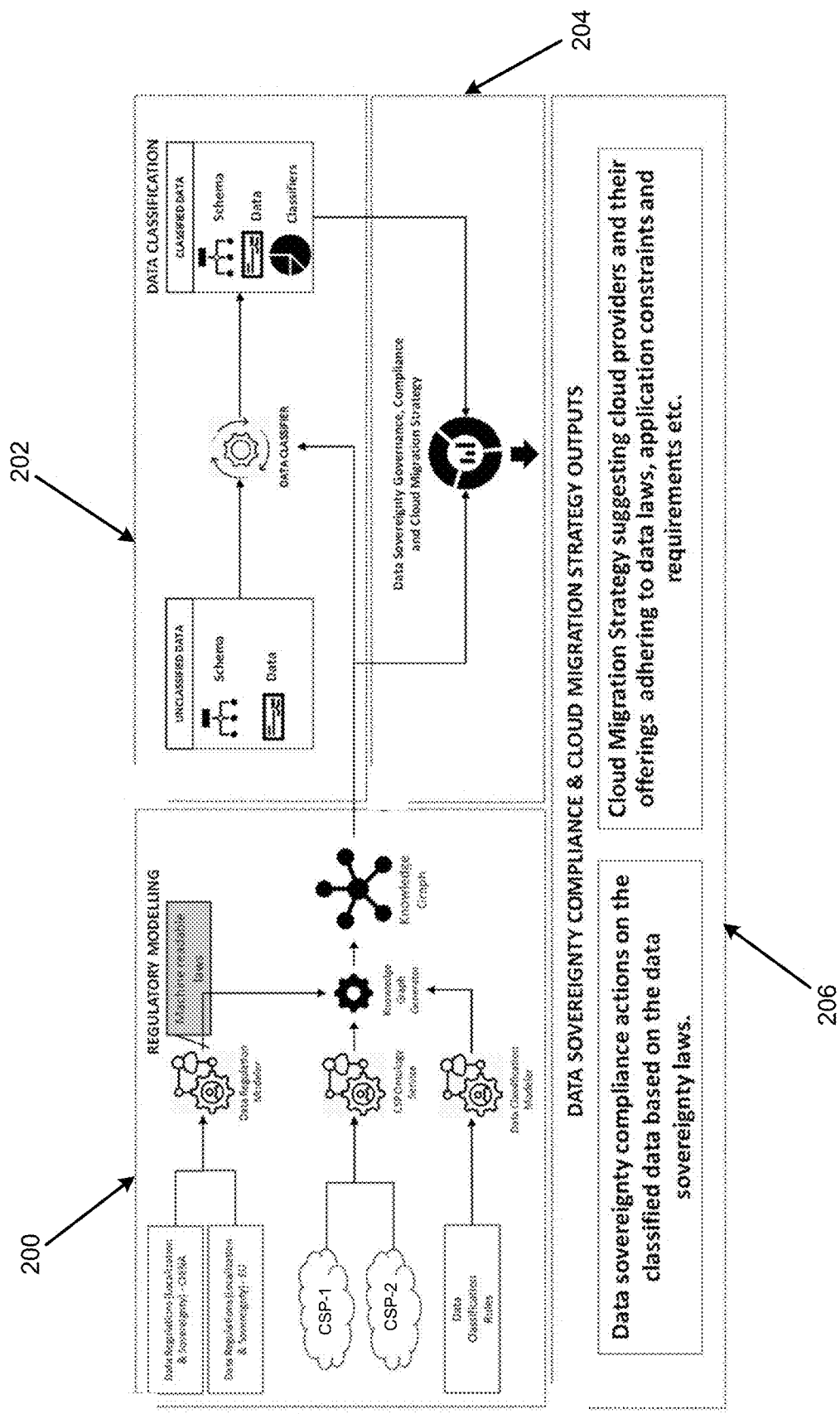
FIG. 2 illustrates data sovereignty and use cases (implementation approach) to illustrate operation of the data classification and modelling based application compliance analysis apparatus of FIG. 1 in accordance with an example of the present disclosure.

FIG. 2 illustrates data sovereignty and use cases (implementation approach) to illustrate operation of the apparatus 100 in accordance with an example of the present disclosure.

Referring to FIG. 2, the functionality of the apparatus 100 may be specified into a regulatory modelling block at 200, a data classification block at 202, a data sovereignty governance, compliance and cloud migration strategy block 204 (e.g., applicable sovereign laws and compliance as disclosed herein), and a data sovereignty compliance and cloud migration strategy output block 206 (e.g., sovereign cloud strategy as disclosed herein).

FIG. 3 illustrates a data sovereignty governance framework to illustrate operation of the apparatus 100 in accordance with an example of the present disclosure.

FIG. 3 depicts a high-level overview of the data sovereignty governance framework 300. In this regard, knowledge graphs may form the core of the data sovereignty governance framework 300. The data sovereignty governance framework 300 may encapsulate the rules and regulations from different data governance laws. A knowledge graph may represent a multi-relational graph composed of entities (captured as nodes) and relations (captured as edges). The annotated knowledge graph 126 may be formed of five models that include, as shown, a data regulations model 302, a regional model 304, a data classification model 306, a cloud service provider model 308, a cloud service provider offering model 310.

Figure 5A:
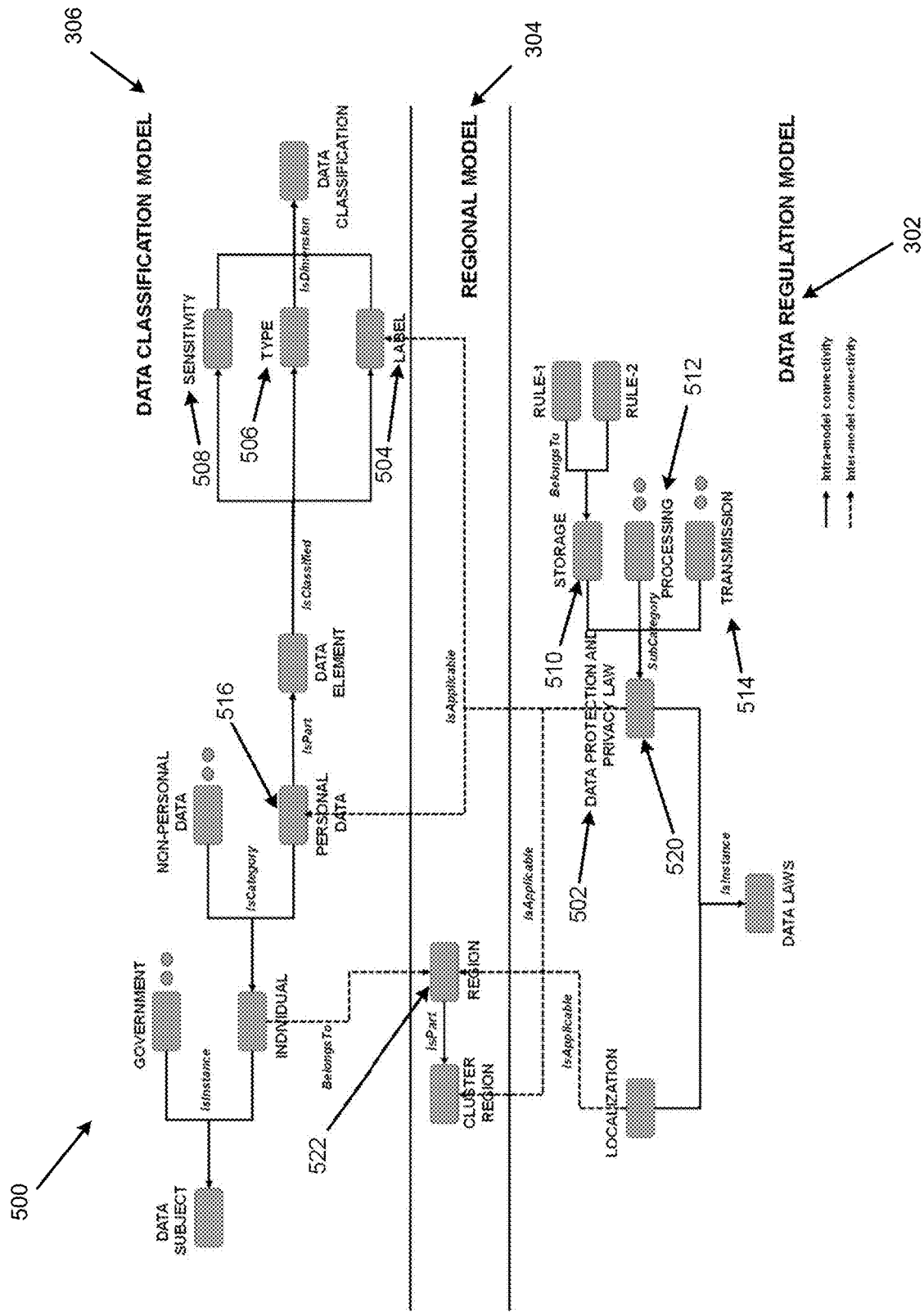
FIGS. 5A and 5B illustrate knowledge graphs snippets to illustrate operation of the data classification and modelling based application compliance analysis apparatus of FIG. 1 in accordance with an example of the present disclosure.
Figure 5B:
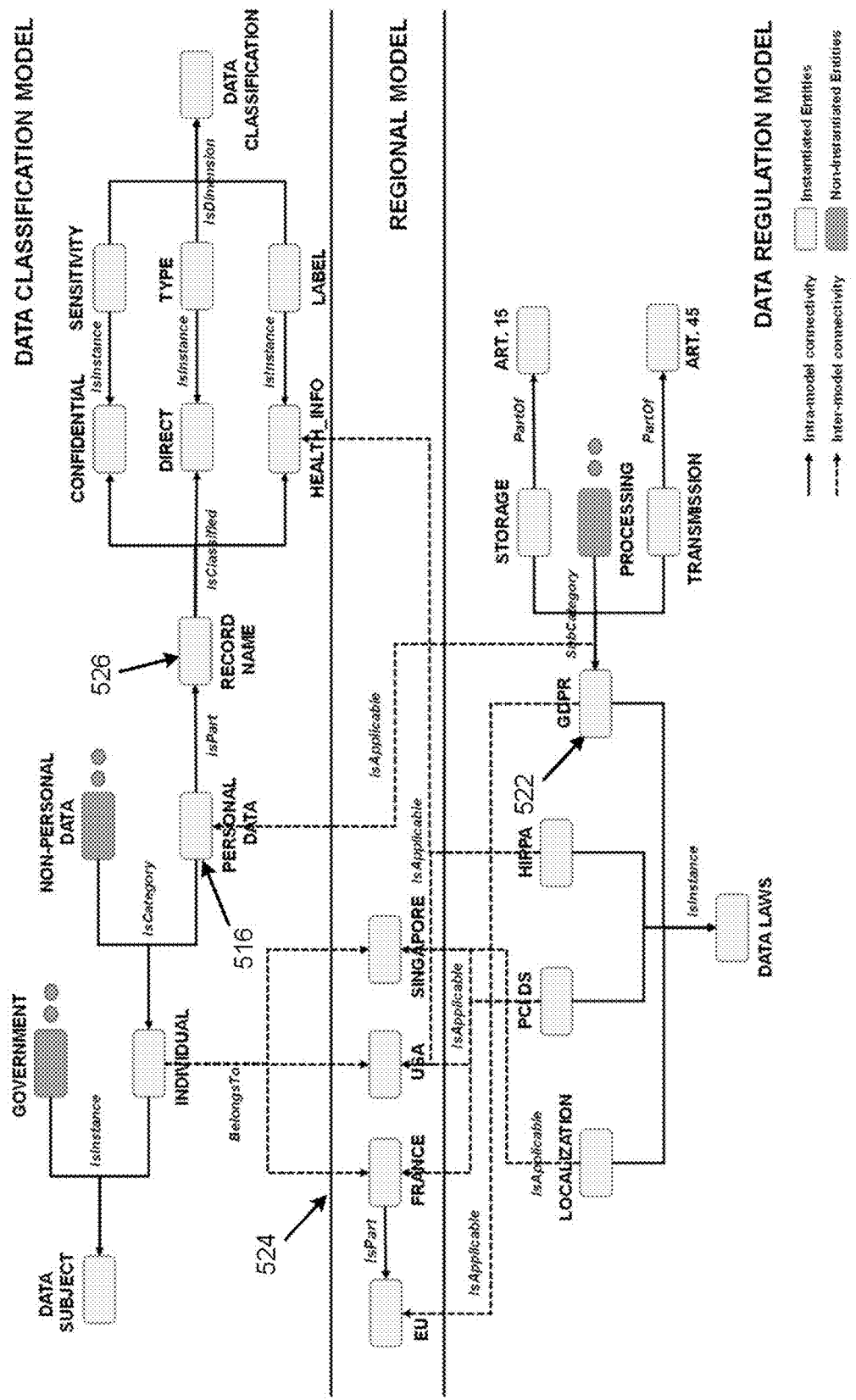

FIGS. 5A and 5B illustrate knowledge graphs snippets, namely a knowledge graph schema and an instantiated knowledge graph, respectively, to illustrate operation of the apparatus 100 in accordance with an example of the present disclosure.

Referring to FIG. 5A, a knowledge graph snippet 500 may include a snippet of a knowledge graph schema 110, where the knowledge graph schema 110 and thus the annotated knowledge graph 126 as shown in FIG. 5B may be formed of five models that include, as shown, the data regulations model 302, the regional model 304, the data classification model 306, the cloud service provider model 308, the cloud service provider offering model 310 (note, cloud service provider model 308, cloud service provider offering model 310 not shown in FIG. 5A).

With respect to the data classification model 306, the applicability of data laws 108 may be based on the nature and type of data. For example, a certain data law may be applicable to an individual's personal data, while other data laws may be applicable to an individual's sensitive data elements of personal data. Hence, there is a need to classify data in accordance to how they are defined in the laws. In this regard, FIG. 5A depicts a snippet of the data classification model 306 based on the data protection and privacy data law 502. The root node may represent a data-subject (such as an individual, organization etc.). The individual's data may be categorized into personal and non-personal data. For the data classification model 306, each category of data may further include multiple data elements, which may be classified on three different dimensions that include a label dimension 504, a type dimension 506, and a sensitivity dimension 508.

The label dimension 504 may identify the class or context to which the data element belongs to. For example, data elements such as address, phone number, etc., provide contact information and hence are characterized as the label contact-Info.

The type dimension 506 may refer to the ability of the data element to identify the subject, and may take on two values, namely directly assigned to those data elements that by themselves may facilitate identification of a subject (e.g., to address the references to 'direct personal data' under General Data Protection Regulation (GDPR) and Personally Identifiable Information (PII) under Health Insurance Portability and Accountability Act (HIPAA)), and indirectly assigned to data elements which on their own may not reveal the identity of an individual but can be derived from other data elements.

The sensitivity dimension 508 may be assigned to capture the risk sensitivity profile of the data element, such as public, confidential, highly sensitive, etc.

The regional model 304 may encapsulate geographies such as a region and its association with a larger geographical entity. For example, cluster region such as region France is part of a cluster region for Europe (EU). The regional model 304 may act as a connector between data-classification and regulation models. The data-subjects may be linked with regions using 'belongsTo' and data laws using 'applicableTo' relations.

The data regulations model 302 may encapsulate the laws associated with regions. The root node may signify data laws whose instances can be the different laws such as data protection and privacy laws, localization laws, etc. The laws may be further categorized based on the kind of data operation (e.g., data storage, data processing, and data transmission) that they are subjected too. The laws may be further categorized as storage 510, processing 512, and transmission 514 categories. For example, a European rule pertaining to transfers based on the adequacy decision may fall under the transmission category where personal data flow outside Europe is restricted to countries whose sovereignty laws do not provide 'adequate level of protection'.

Referring again to FIGS. 2 and 3, data sources 118 may refer to all forms and types of application data that is captured (e.g., structured, unstructured, customer, usage profiles, etc.). In this regard, relevant sovereignty laws that are applicable to these data sources 118 may be identified. With respect to structured data, such as relational data, database schemas (i.e., column names) of the various tables may be subjected to the following analysis.

Referring to FIGS. 1-3, the knowledge graph instantiator 112 may instantiate the knowledge graph with the data laws 108 (e.g., data sovereignty laws) and the data classification model 306 based on knowledge graph schema 110 to generate the instantiated knowledge graph 114.

The data classifier 116 may first discover data (e.g., the application data 104) and then classify data elements of applications data using the data classification model 306 of the instantiated knowledge graph 114.

The governance and compliance advisor 128 may perform two types of analysis. First, the governance and compliance advisor 128 may identify a relational schema on the data sources and also have queries to determine the regional context from the data sources 118. For example, a query may include determining 'regions' information about the application users. Secondly, the governance and compliance advisor 128 may determine various data laws applicable to the classified data elements using the annotated knowledge graph 126.

The governance and compliance advisor 128 may then generate context sensitive awareness and prescriptive suggestions about the applicable data laws. In this regard, the governance and compliance advisor 128 may generate an identification of applicable laws as the applicable sovereign laws and compliance 130.

Figure 4:
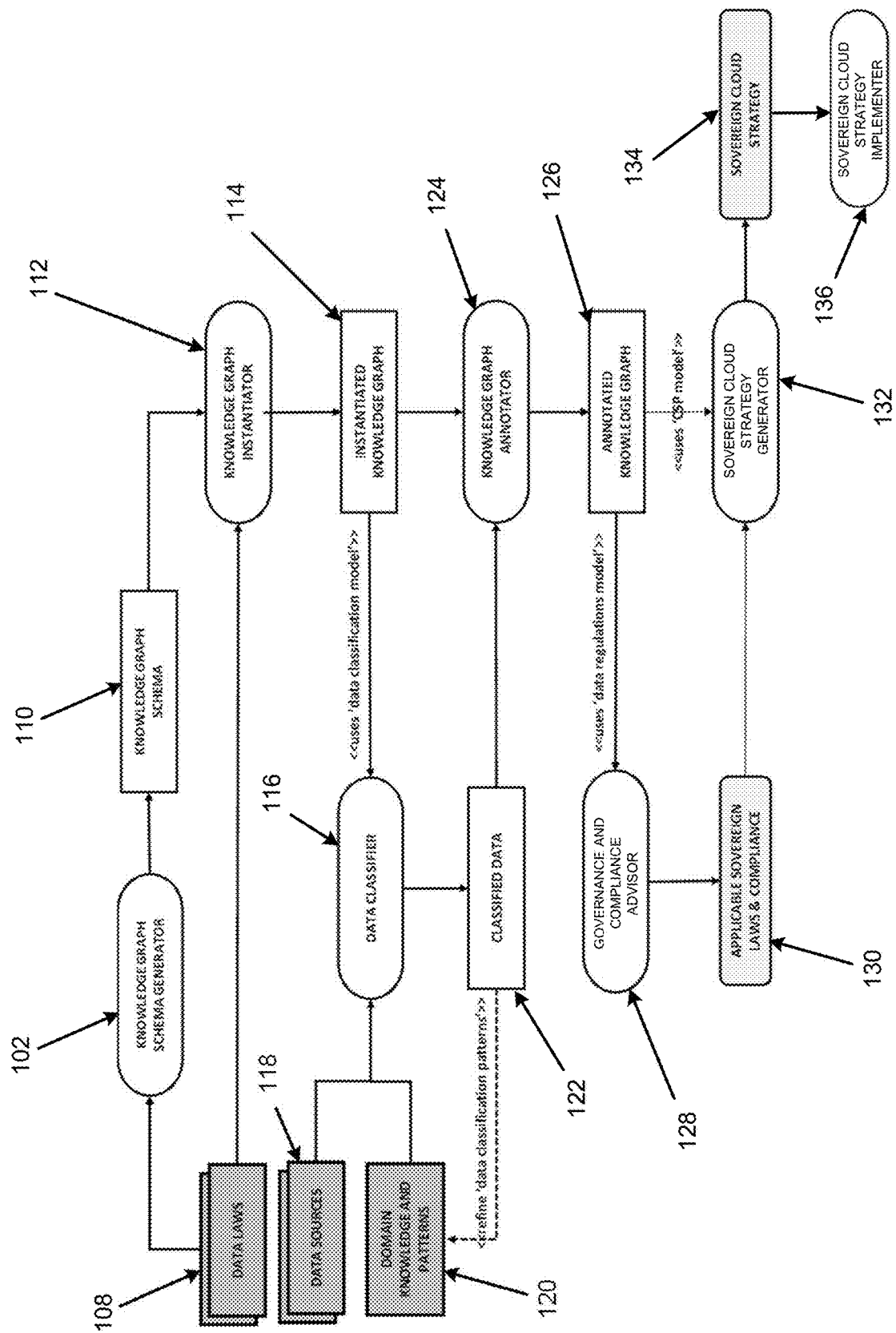
FIG. 4 illustrates a data sovereignty governance framework process flow to illustrate operation of the data classification and modelling based application compliance analysis apparatus of FIG. 1 in accordance with an example of the present disclosure.

FIG. 4 illustrates a data sovereignty governance framework process flow to illustrate operation of the apparatus 100 in accordance with an example of the present disclosure.

Referring to FIG. 4, the knowledge graph schema generator 102 may generate the knowledge graph schema 110 using, for example, domain knowledge and a subject matter expert's inputs.

The knowledge graph instantiator 112 may extract the data laws 108 from distributed and heterogeneous sources. The extracted data laws 108 may then be mapped to the knowledge graph schema 110 to identify the data types associated with the laws and the geography for which the laws are defined. The knowledge graph instantiator 112 may map all of the extracted information to the knowledge graph schema 110 to generate the instantiated knowledge graph 114 as shown in FIG. 5B. For example, the data elements part of the personal data category 516 in the knowledge graph schema 110 may be instantiated with the actual data elements such as 'Full name' along with the characterization dimensions such as, {Label:Contact_Info}, {Type: Direct} and {Sensitivity:Confidential}. Similarly, laws and regions (e.g., at 518 and 520) may be instantiated with actual laws and applicable regions (e.g., at 522 and 524). For example, a European data protection and privacy law may include two rules under each sub-category of storage and transmission. A first storage rule may represent right to access by the data subject, whereas a second transmission rule may represent transfers on the basis of an adequacy decision. Since a law may not enforce a citizen's data to be kept within the regional boundaries, in this regard, a 'Localization' law for the European region may not be applicable (e.g., no edge has been modeled from the law to the region 'France' and cluster region 'EU'). As the European law may be applicable to a 'personal data' category, there may be a connection 'IsApplicable' between 'European' law and 'Personal data' data type. Similarly, region 'France' being a part of a cluster region 'EU' may be instantiated.

The data classifier 116 may analyze the relational data sources (e.g., columns within the tables) using the data classification model 306 of the instantiated knowledge graph 114, and the associated data classification patterns, and classify the data elements. The data classifier 116 may use three approaches to classify a data element to resolve ambiguities. The approaches may include a direct pattern match, natural language processing (NLP) on the data element metadata (e.g., column description) to determine the context and match with the pattern, and similarity analysis using neighbor classified columns of the same table. Classification may represent an adaptive process, which is then used to refine the data classification patterns as well as edit the instantiated knowledge graph 114 based on the new findings and learnings.

Once the classification process is completed, the knowledge graph annotator 124 may map the data sources on to the knowledge graph schema 110 obtained from the data laws 108, thus filtering (removing) all irrelevant elements, to generate the annotated knowledge graph 126.

The governance and compliance advisor 128 may then use the annotated knowledge graph 126 to identify the laws and regulations the application data 104 needs to be compliant with. Thus, the governance and compliance advisor 128 may generate an identification of applicable laws as the applicable sovereign laws and compliance 130.

Figure 6:
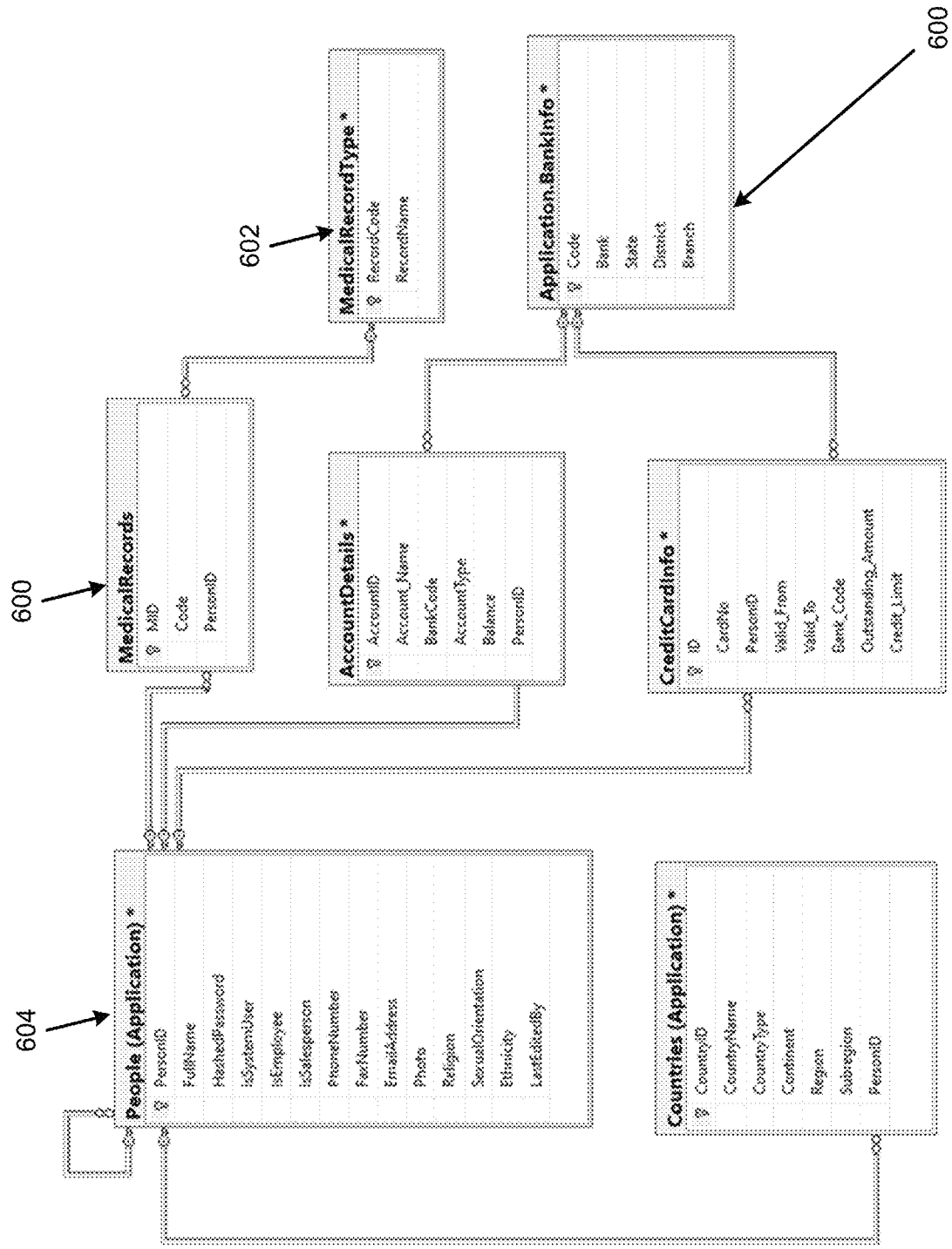
FIG. 6 illustrates an application relational data snippet to illustrate operation of the data classification and modelling based application compliance analysis apparatus of FIG. 1 in accordance with an example of the present disclosure.

FIG. 6 illustrates an application relational data snippet to illustrate operation of the apparatus 100 in accordance with an example of the present disclosure.

Referring to FIG. 6, with respect to an example associated with the governance workflow, a snippet of data source schemas (from an application 106) may be considered as depicted using an Entity-Relationship (E-R) diagram. The entities or tables may include application user's data pertaining to personal, banking, health and credit card information. For example, the table 'MedicalRecords' 600, 'MedicalRecord-Type' 602 may include health information. The tables may be related to each other by using a primary key and a foreign key. For example, the table 'People' 604 (capturing application user's data) and table 'Countries' 606 (capturing list of worldwide countries) are related using the 'CountryId'. In this regard, FIG. 5B depicts a snippet of an instantiated knowledge graph 114. For example, a single data element 'Record Name' 526 has been illustrated along with four various data sovereignty laws.

The data classifier 116 may use the instantiated knowledge graph 114 and classification patterns to classify the columns of the tables. For example, column 'FullName' will directly match with the pattern for data element 'Full Name' and is classified with 'Label:Contact Info', 'Type:Direct', 'Sensitivity:Confidential'. However, for the column 'Code' in 'MedicalRecords' table 600 as well as 'BankInfo' table 606 might not be correctly disambiguated because Code is subsumed in the patterns 'HealthCode' and 'BankingCode'. For such scenarios, similarity analytics may be used to obtain the similarity score with the column neighbors and add onto the previous pattern match score. This will assist in classification of the data elements appropriately. For example, the neighboring columns of the MedicalRecords table 600 will have the patterns related to Medical domain. In this regard, the data element's description may be used to perform text and intent analysis in case that the ambiguity still persists.

FIG. 7 illustrates data classification based law applicability to illustrate operation of the apparatus 100 in accordance with an example of the present disclosure.

Referring to FIG. 7, the data elements may be classified under Health Info at 700, Credit Card Info at 702, Bank Info at 704, Religious Info at 706, etc. While performing analysis on the data sources, a user's data may be identified from countries such as Singapore, United States of America (USA), France, etc. Based on the querying of an instantiated knowledge graph, applicable laws may be determined as shown in FIG. 7. The localization laws of the USA, France and Singapore may not restrict data within boundaries against countries such as China, which may include strict boundary restrictions. Also based on the classified data, the relevant applicability of various laws and rules associated with the laws may be obtained. For example, for data element 'Record Name' of label 'Health Info', the USA may require adherence to HIPAA, Singapore may require adherence to Private Hospital and Medical Clinic Act, and France may require adherence to GDPR. In this manner, the governance framework 300 may assist organizations with analysis of their data sources, and facilitate identification of the relevant applicable rules/clauses within the laws/regulations.

Figure 8:
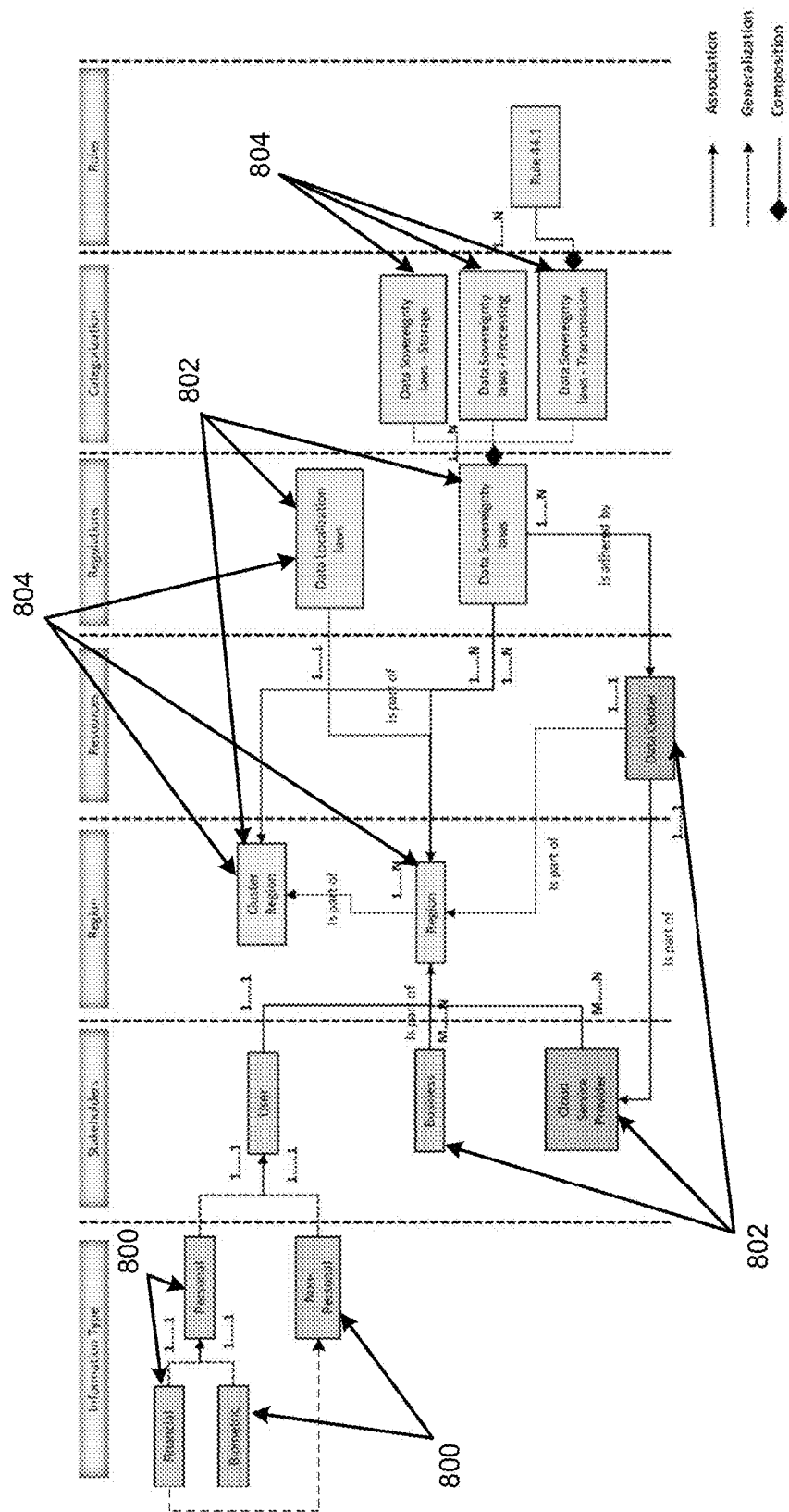
FIG. 8 illustrates data sovereignty and a model to illustrate operation of the data classification and modelling based application compliance analysis apparatus of FIG. 1 in accordance with an example of the present disclosure.

FIG. 8 illustrates data sovereignty and a model to illustrate operation of the apparatus 100 in accordance with an example of the present disclosure.

Referring to FIG. 8, user data including blocks financial, biometric, personal, non-personal, and user may be specified at 800. Elements including business, cloud service provider, region, cluster region, data center, and data sovereignty collectively referred to by label 802 may pertain to a cloud system provider ontology. Further, elements including data localization laws, cluster region, region, data sovereignty laws—storage, data sovereignty laws—processing, and data sovereignty laws—transmission collectively referred to by label 804 may pertain to data laws.

Figure 9:
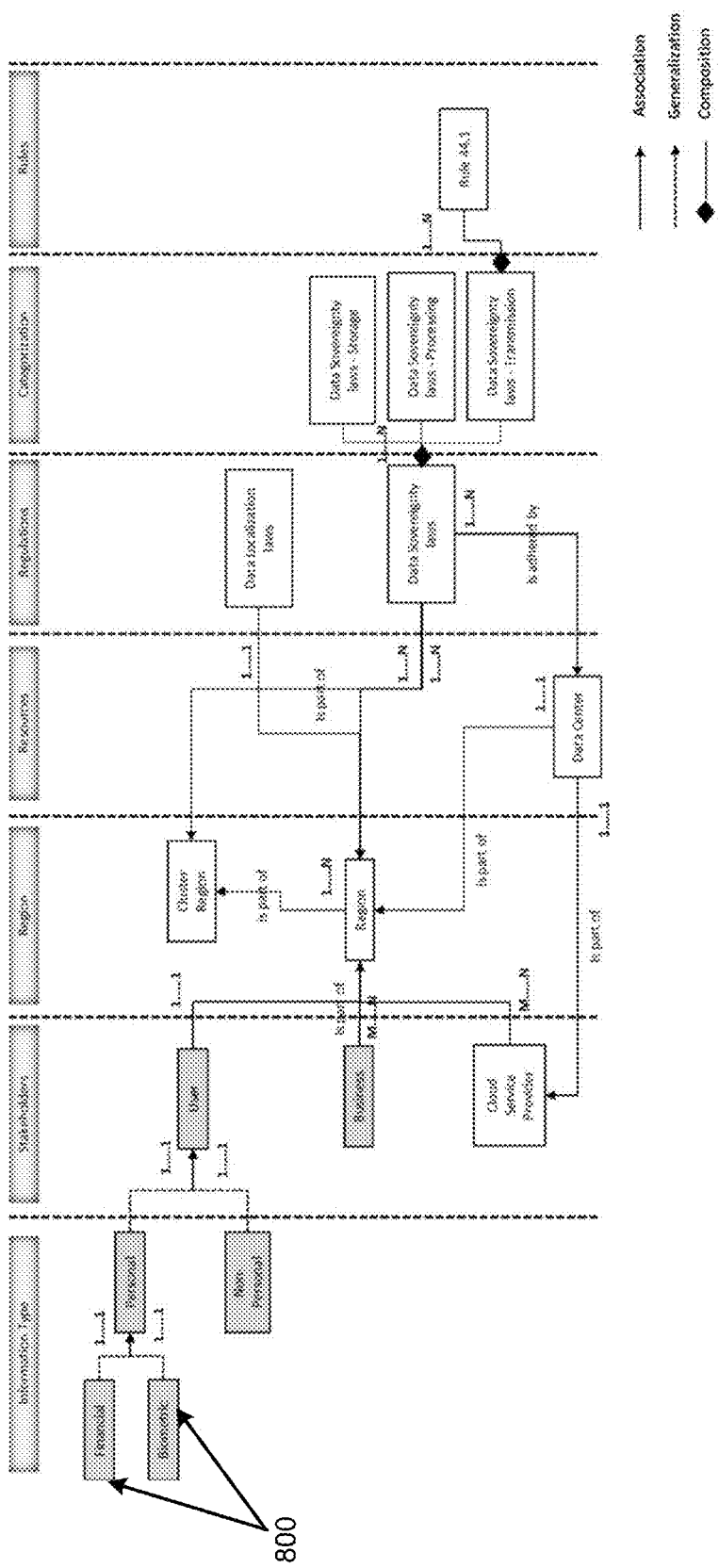
FIG. 9 illustrates details of user data for FIG. 8 in accordance with an example of the present disclosure.

FIG. 9 illustrates details of user data for FIG. 8 in accordance with an example of the present disclosure.

Referring to FIG. 9, user data including blocks financial, biometric, personal, non-personal, and user may be specified at 800.

Figure 10:
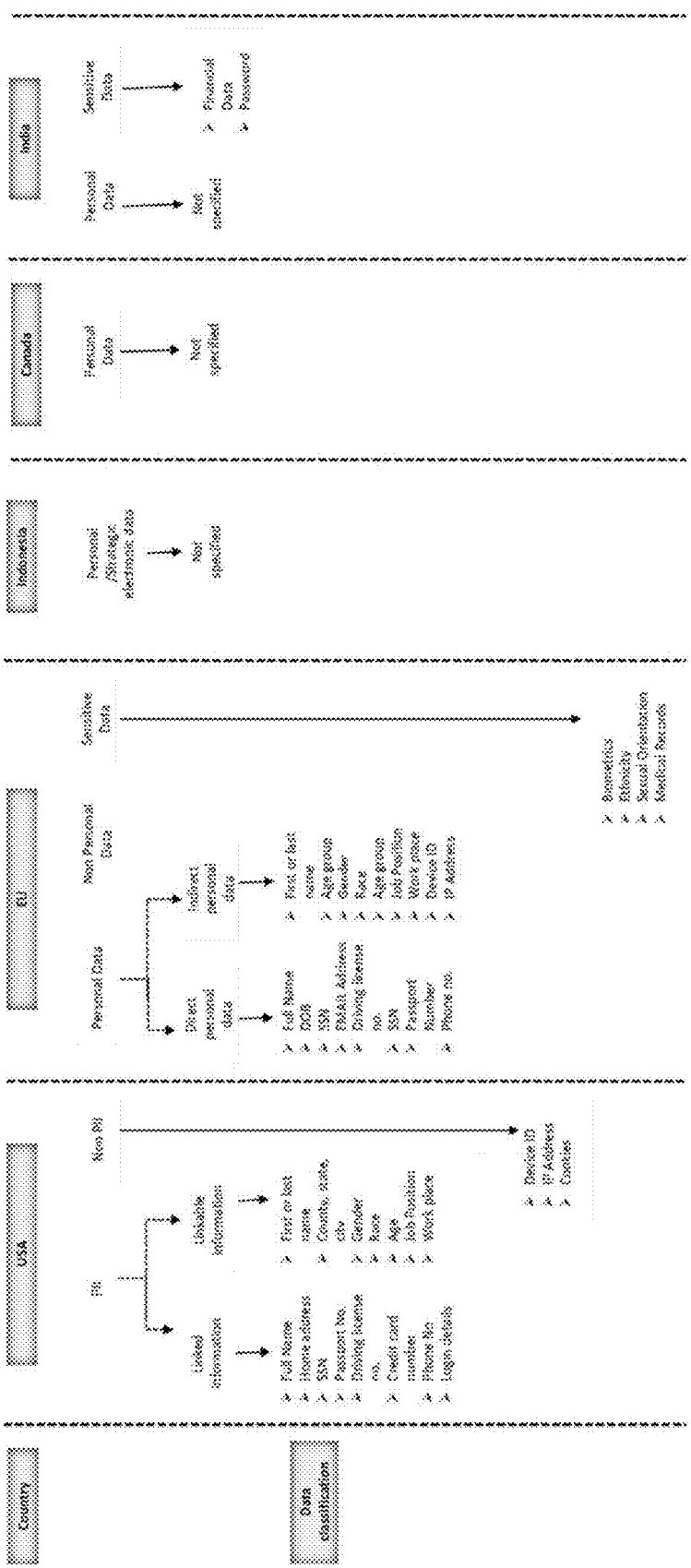
FIG. 10 illustrates data sovereignty and user data classification (regional rules) to illustrate operation of the data classification and modelling based application compliance analysis apparatus of FIG. 1 in accordance with an example of the present disclosure.

FIG. 10 illustrates data sovereignty and user data classification (regional rules) to illustrate operation of the apparatus 100 in accordance with an example of the present disclosure.

Referring to FIG. 10, examples of data laws for various countries and regions such as the USA, Europe (EU), Indonesia, Canada, and India. The data laws may pertain to personally identifiable information (PII), non-personally identifiable information, etc.

Figure 11:
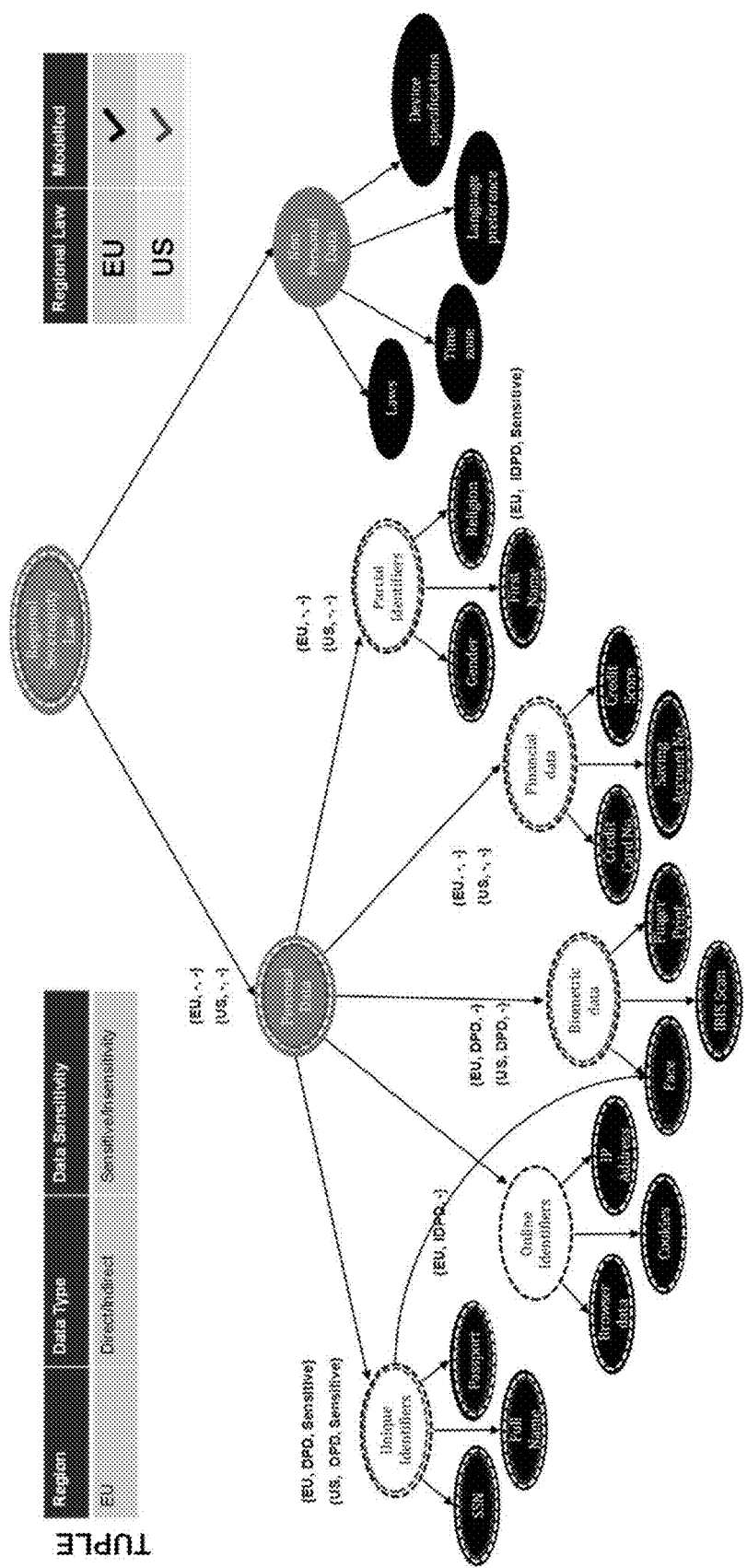
FIG. 11 illustrates data sovereignty and user data classification (embedding of multi-regional rules) to illustrate operation of the data classification and modelling based application compliance analysis apparatus of FIG. 1 in accordance with an example of the present disclosure.

FIG. 11 illustrates data sovereignty and user data classification (embedding of multi-regional rules) to illustrate operation of the apparatus 100 in accordance with an example of the present disclosure. With respect to data sovereignty and user data classification (embedding of multi-regional rules), each region and country may bucketize data into certain groups based on the data protection law prevalent in the region and country. In the context of the instantiated knowledge graph 114, these buckets may be denoted as "Data Types" to which a data is connected. A particular data may belong to a particular data type for a country and region whereas the same data may belong to a different data type for a different country and region. Identifying this connection between a data and its data type for a region and country and co-relating it with its connection with a different data type for a different country and region may serve as a prerequisite for modelling the various data types, data and their correlation. For example, a facial image captured may be considered as a unique identifier in a country and region, and hence it has its defined rules and regulations pertaining to unique identifiers. The same facial image may be considered as biometric data in another country and region have a different set of rules and regulation pertaining to biometric data.

Figure 12:
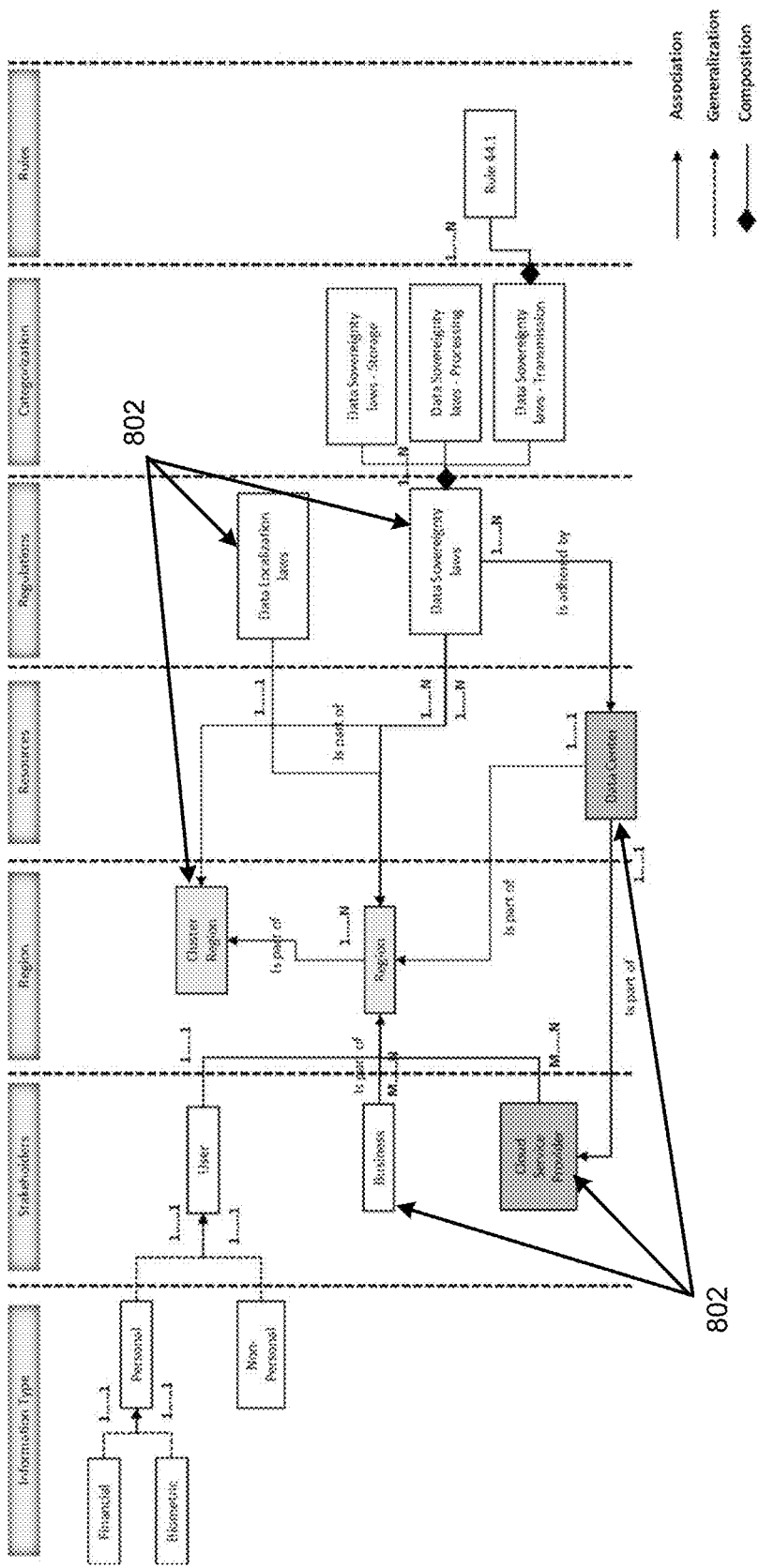
FIG. 12 illustrates details of cloud service provider (CSP) ontology for FIG. 8 in accordance with an example of the present disclosure.

FIG. 12 illustrates details of cloud service provider (CSP) ontology for FIG. 8 in accordance with an example of the present disclosure.

Referring to FIG. 12, elements including business, cloud service provider, region, cluster region, data center, and data sovereignty collectively referred to by label 802 may pertain to a cloud system provider ontology.

Figure 13:
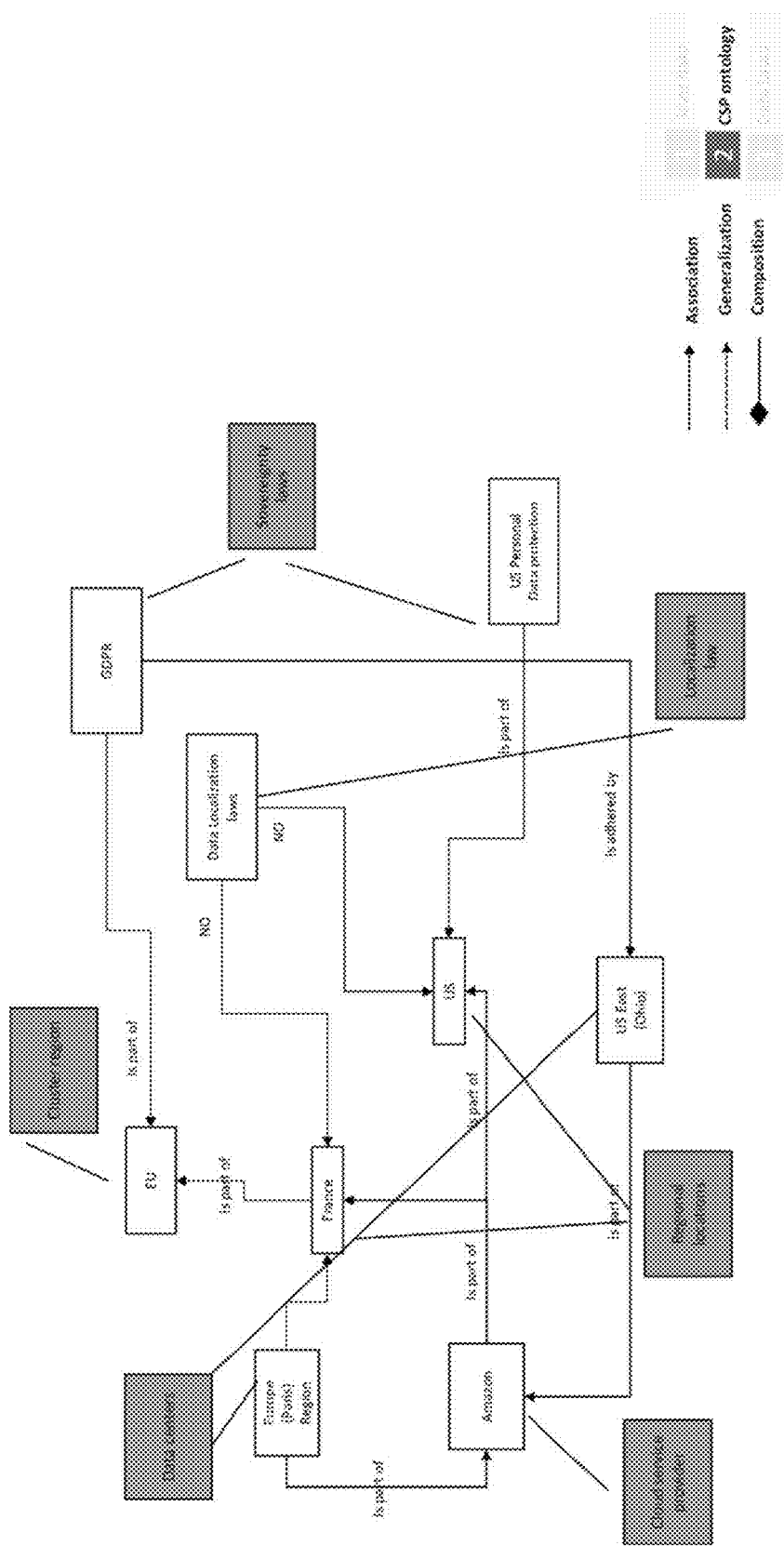
FIG. 13 illustrates data sovereignty and a cloud service provider model to illustrate operation of the data classification and modelling based application compliance analysis apparatus of FIG. 1 in accordance with an example of the present disclosure.

FIG. 13 illustrates data sovereignty and a cloud service provider model to illustrate operation of the apparatus 100 in accordance with an example of the present disclosure.

Referring to FIG. 13, the data sovereignty and a cloud service provider model 308 may specify various attributes and interconnections associated with cloud service providers, countries, regions, data laws, etc.

Figure 14:
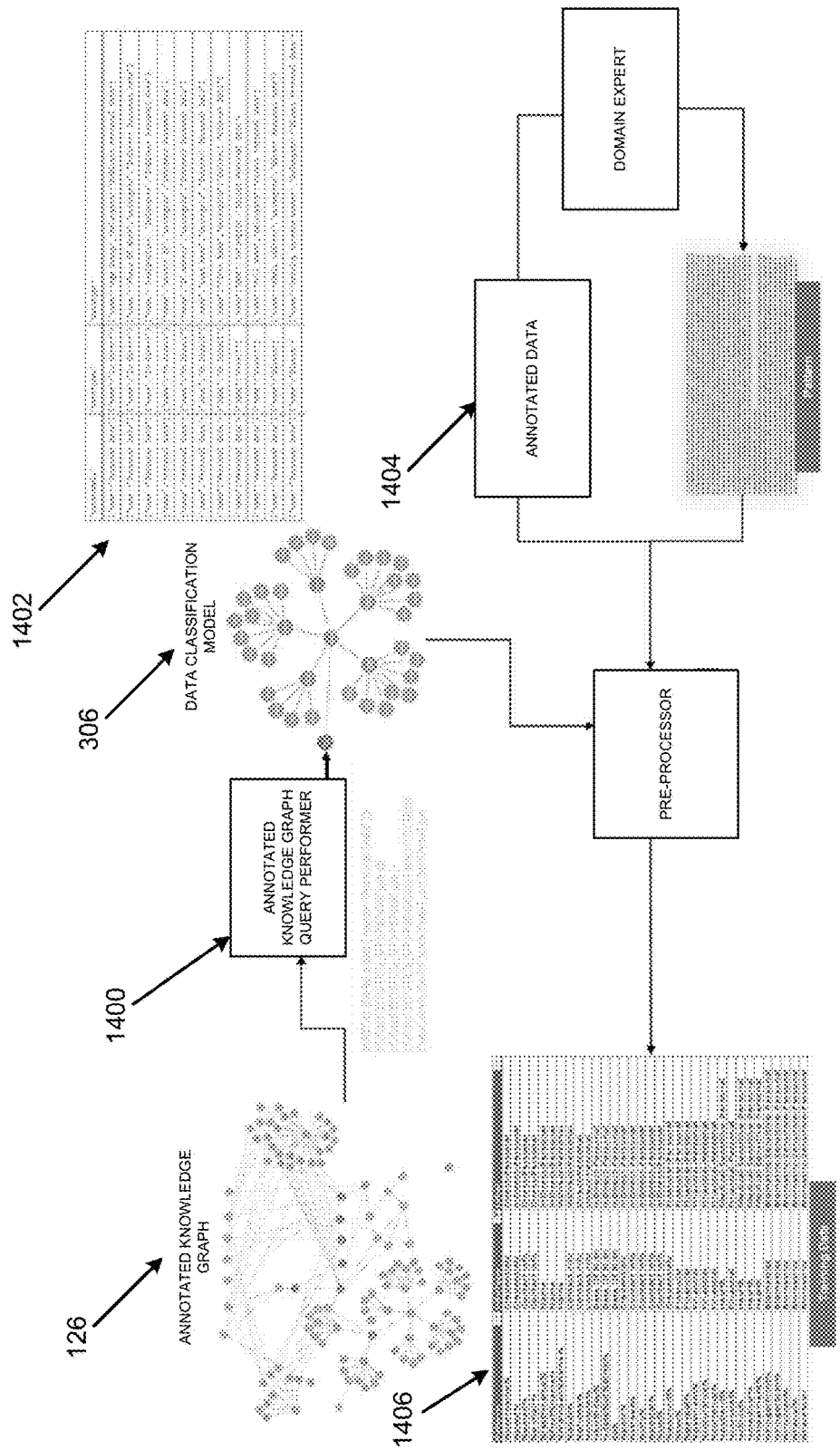
FIG. 14 illustrates data sovereignty and artificial intelligence based data classification to illustrate operation of the data classification and modelling based application compliance analysis apparatus of FIG. 1 in accordance with an example of the present disclosure.

FIG. 14 illustrates data sovereignty and artificial intelligence based data classification to illustrate operation of the apparatus 100 in accordance with an example of the present disclosure.

Referring to FIG. 14, the annotated knowledge graph 126 may be queried by an annotated knowledge graph query performer 1400 to extract the data classification model 306. The extracted data at 1402 may represent regulated data. At 1404, a domain expert may add additional terms and/or label the regulated data from 1402 to generate training data at 1406. Once the classification model 306 has been trained on the regulations and their associated data types, the annotated knowledge graph query performer 1400 may be used to obtain the various data and their associated data type which may be referred to as an instantiated regulation model. A subject matter expert or domain expert may annotate the various patterns to the various information types that may be used to discover all of the datatypes pertaining to a domain. A processor may then process the instantiated model with the annotated data to label every data and finally create training data.

Figure 15:
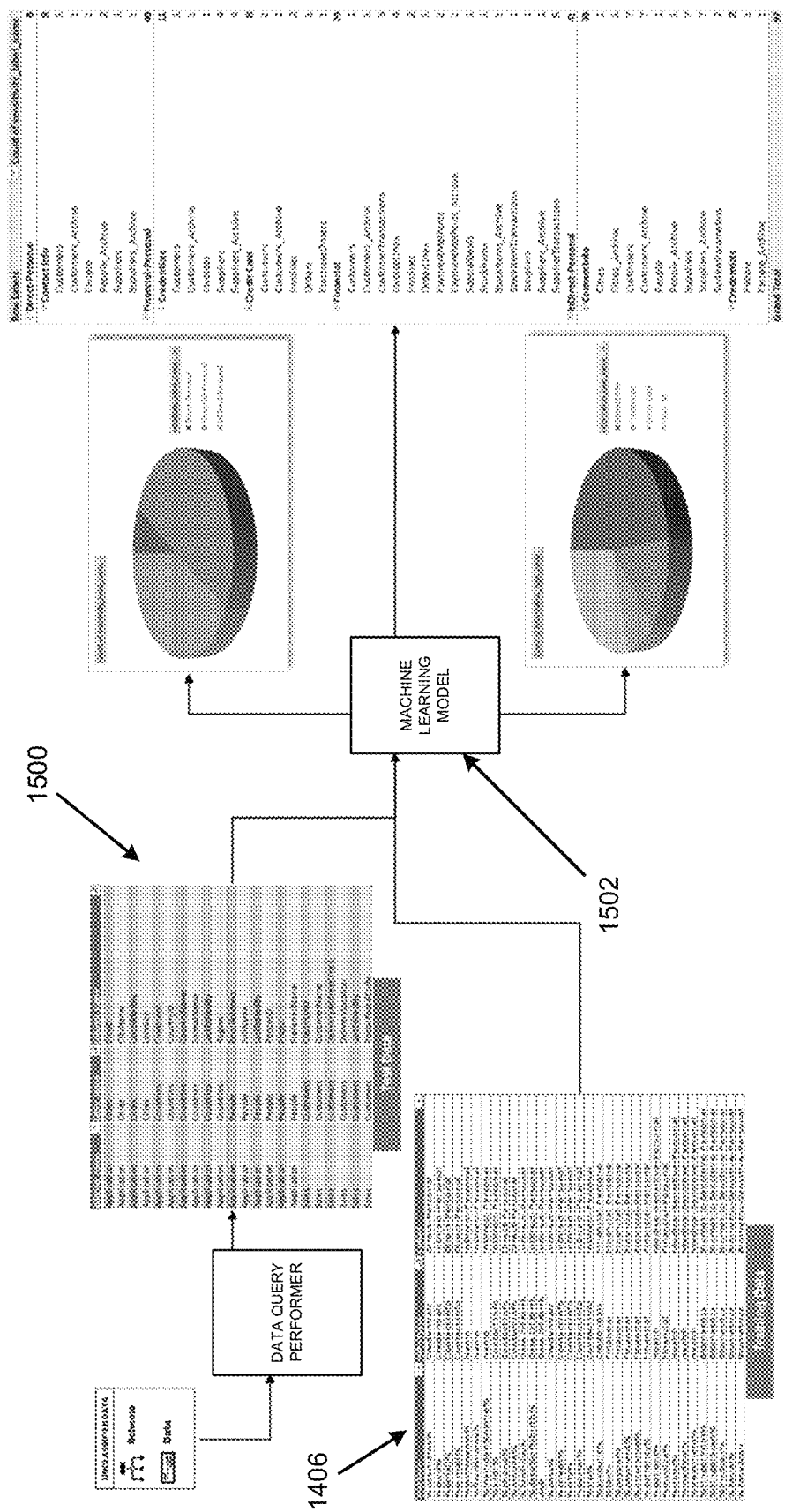
FIG. 15 illustrates data sovereignty and artificial intelligence based data classification to illustrate operation of the data classification and modelling based application compliance analysis apparatus of FIG. 1 in accordance with an example of the present disclosure.

FIG. 15 illustrates data sovereignty and artificial intelligence based data classification to illustrate operation of the apparatus 100 in accordance with an example of the present disclosure.

Referring to FIG. 15, the training data at 1406 and test data at 1500 may be utilized to generate a machine learning model at 1502. The machine learning model may be generated by training the model using the training data at 1406 and test data at 1500. The machine learning model may be built either using a supervised or unsupervised learning approach. The correctness of the machine learning model may be directly proportional to the quality and quantity of the training data. The machine learning model may subject the test data to a classification process that uses the various patterns, domain knowledge, associations, and proximity parameters of the data to predict a classified output. Once a machine learning model has been trained, test data may be passed to it as an input and the machine learning model may thereby discover, label, and annotate the input data based on its training.

Figure 16:
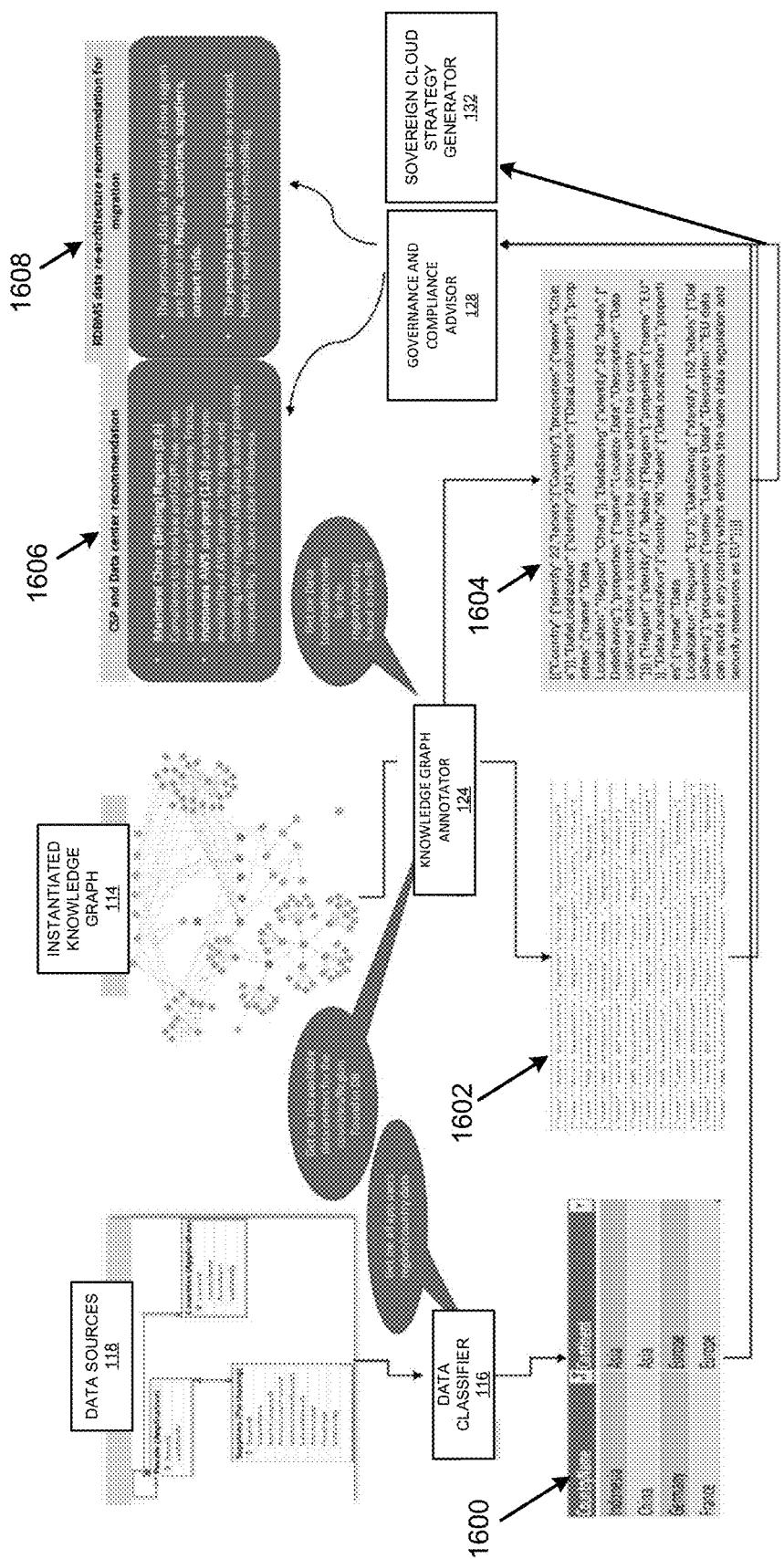
FIG. 16 illustrates data sovereignty and policy based sovereign cloud strategy recommendation to illustrate operation of the data classification and modelling based application compliance analysis apparatus of FIG. 1 in accordance with an example of the present disclosure.

FIG. 16 illustrates data sovereignty and policy based sovereign cloud strategy recommendation to illustrate operation of the apparatus 100 in accordance with an example of the present disclosure.

Specifically, FIG. 16 illustrates operations associated with components such as the data classifier 116, the knowledge graph annotator 124, the governance and compliance advisor 128, and the sovereign cloud strategy generator 132. In this regard, based on a query such as "get me all app users region/country data", the data classifier 116 may generate the table at 1600. Based on queries such as "get me the available data centers for the countries/region found in DB" and "get me data localization rules for the region/country found in the DB", the knowledge graph annotator 124 may generate the results at 1602 and 1604, respectively. Further, the governance and compliance advisor 128 and/or the sovereign cloud strategy generator 132 may generate the results at 1606 and 1608, respectively. For example, the sovereign cloud strategy generator 132 may generate the results at 1606 that may include an indication of a cloud service provider and data center recommendation, and an associated score for a country (e.g., 0.8 for mainland China, and 1.0 for Indonesia).

FIG. 17 illustrates data sovereignty and sovereign cloud strategy recommendation to illustrate operation of the apparatus 100 in accordance with an example of the present disclosure.

Referring to FIG. 17, the sovereign cloud strategy generator 132 may rank the cloud service providers for an application migration to the cloud. The various factors 1700 and criteria such as localization law, provider data center's sovereignty compliance, interoperability amongst providers, application landscape such as existing data centers, etc., and service level agreements (e.g., availability to achieve business continuity or 99.9% uptime) may be considered for deriving the ranking of these providers. These factors 1700 may be utilized to generate the scores associated with a cloud service provider (e.g., 0.8 for mainland China, and 1.0 for Indonesia as shown in FIG. 16). An analytical hierarchy approach may be implemented to determine priority or ranking on a wide range of alternatives (e.g., CSP and their alternatives) with respect to the set of criteria to achieve a goal. Thus, additional and/or alternative criteria may be included or added as needed.

Figure 18:
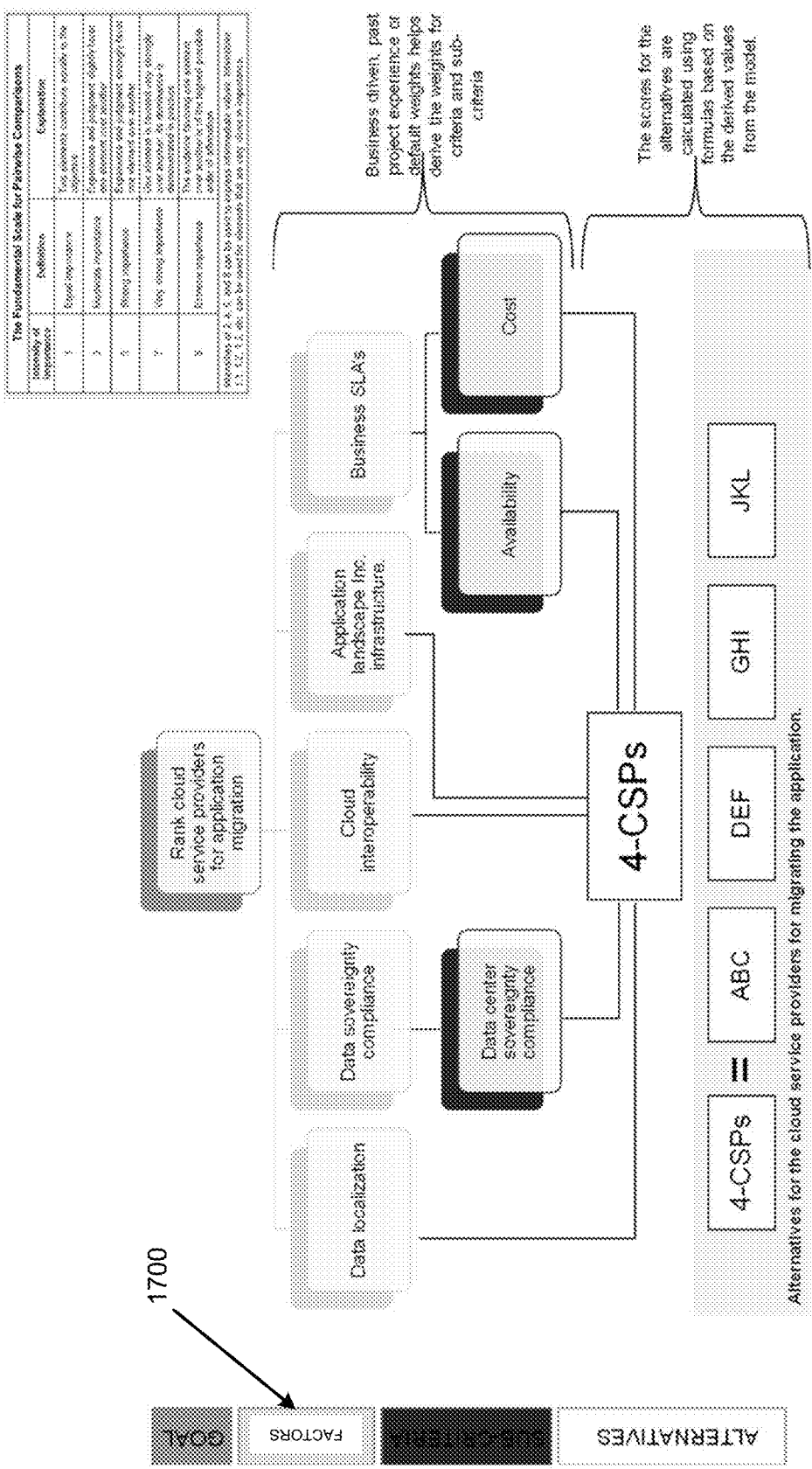
FIG. 18 illustrates further details of data sovereignty and sovereign cloud strategy recommendation to illustrate operation of the data classification and modelling based application compliance analysis apparatus of FIG. 1 in accordance with an example of the present disclosure.

FIG. 18 illustrates further details of data sovereignty and sovereign cloud strategy recommendation to illustrate operation of the apparatus 100 in accordance with an example of the present disclosure.

Referring to FIG. 18, the factors 1700 including localization law, provider data center's sovereignty compliance, interoperability amongst providers, application landscape such as existing data centers, etc., and service level agreements may be analyzed for different cloud service providers to generate a recommendation of the cloud service providers 138 with respect to the applicable sovereign laws and compliance 130. For example, the cloud service providers 138 may include, for example, Amazon™, Azure™, Google™, and IBM™, and other such cloud service providers. In FIG. 18, the cloud service providers 138 are generally denoted as ABC, DEF, GHI, and JHK. Intensities of importance as shown at 1800 may also be accounted for to rank the cloud service providers.

Figure 19:
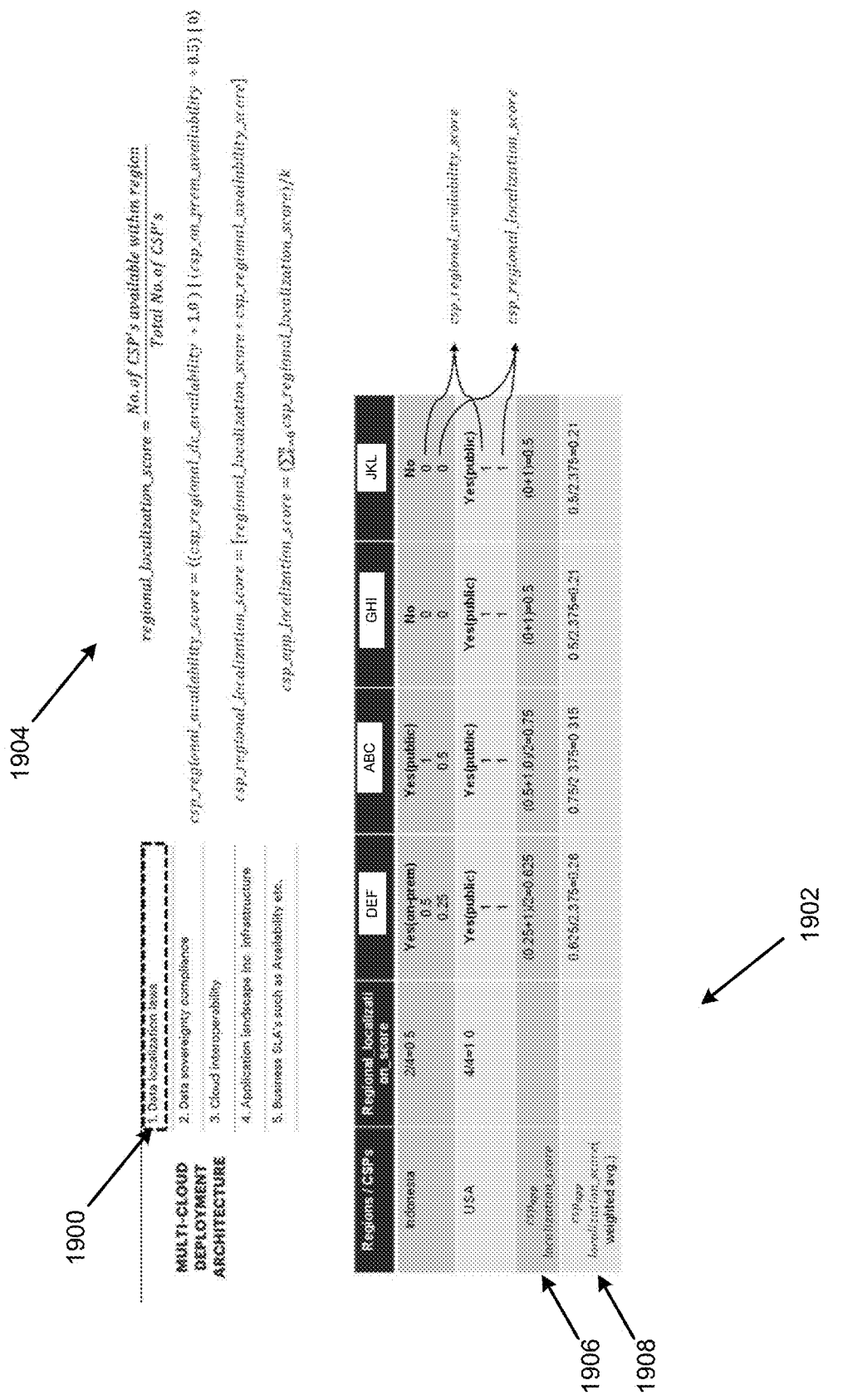
FIG. 19 illustrates further details of data sovereignty and sovereign cloud strategy recommendation to illustrate operation of the data classification and modelling based application compliance analysis apparatus of FIG. 1 in accordance with an example of the present disclosure.

FIG. 19 illustrates further details of data sovereignty and sovereign cloud strategy recommendation to illustrate operation of the apparatus 100 in accordance with an example of the present disclosure.

Referring to FIG. 19, with respect to the factor including localization law at 1900, various scores may be determined as shown at 1902 based on the analysis performed at 1904. For example, based on the $csp_{app}$ localization_score determined at 1906, a weighted average may be determined at 1908. A similar analysis may be performed with respect to the remaining factors of provider data center's sovereignty compliance, interoperability amongst providers, application landscape such as existing data centers, etc., and service level agreements.

FIG. 20 illustrates further details of data sovereignty and sovereign cloud strategy recommendation to illustrate operation of the apparatus 100 in accordance with an example of the present disclosure.

Referring to FIG. 20, a weight may be determined for each of the factors 1700. For example, the weights, which are normalized, may be specified as follows for localization law as 0.35, provider data center's sovereignty compliance as 0.31, interoperability amongst providers as 0.09, application landscape such as existing data centers as 0.06, and service level agreements as 0.19. These weights may be determined from various user inputs as to the relative importance of the factors.

FIG. 21 illustrates further details of data sovereignty and sovereign cloud strategy recommendation to illustrate operation of the apparatus 100 in accordance with an example of the present disclosure.

Referring to FIG. 21, with respect to the factor including localization law, the scores determined as shown in FIG. 19 may be multiplied with the weights assigned as shown in FIG. 20 to determine a weighted scores. For example, with respect to the factor including localization law (e.g., "Data localization"), the weighted score for cloud service provider ABC is 0.315, for DEF is 0.26, for GHI is 0.21, and for JKL is 0.21. In a similar manner, weight scores may be determined for the other factors of provider data center's sovereignty compliance, interoperability amongst providers, application landscape such as existing data centers, etc., and service level agreements.

FIG. 22 illustrates further details of data sovereignty and sovereign cloud strategy recommendation to illustrate operation of the apparatus 100 in accordance with an example of the present disclosure.

Referring to FIG. 22, weighted scores for all of the factors 1700 including localization law, provider data center's sovereignty compliance, interoperability amongst providers, application landscape such as existing data centers, etc., and service level agreements are listed at 2200 for the cloud service providers ABC, DEF, GHI, and JKL.

FIG. 23 illustrates further details of data sovereignty and sovereign cloud strategy recommendation to illustrate operation of the apparatus 100 in accordance with an example of the present disclosure.

Referring to FIG. 23, based on the weighted scores for all of the factors 1700 shown in FIG. 23, the sovereign cloud strategy generator 132 may determine an overall weighted factor score for each of the cloud service providers ABC as 0.265, DEF as 0.203, GHI as 0.287, and JKL as 0.159 as shown at 2300. Based on the overall weighted factor scores, cloud service provider GHI that received a score of 0.287 (e.g., 28.7%) may be ranked the highest. If only factors with respect to cloud service providers are analyzed, the sovereign cloud strategy generator 132 may recommend the highest ranked cloud service provider (e.g., cloud service provider GHI).

Figure 24:
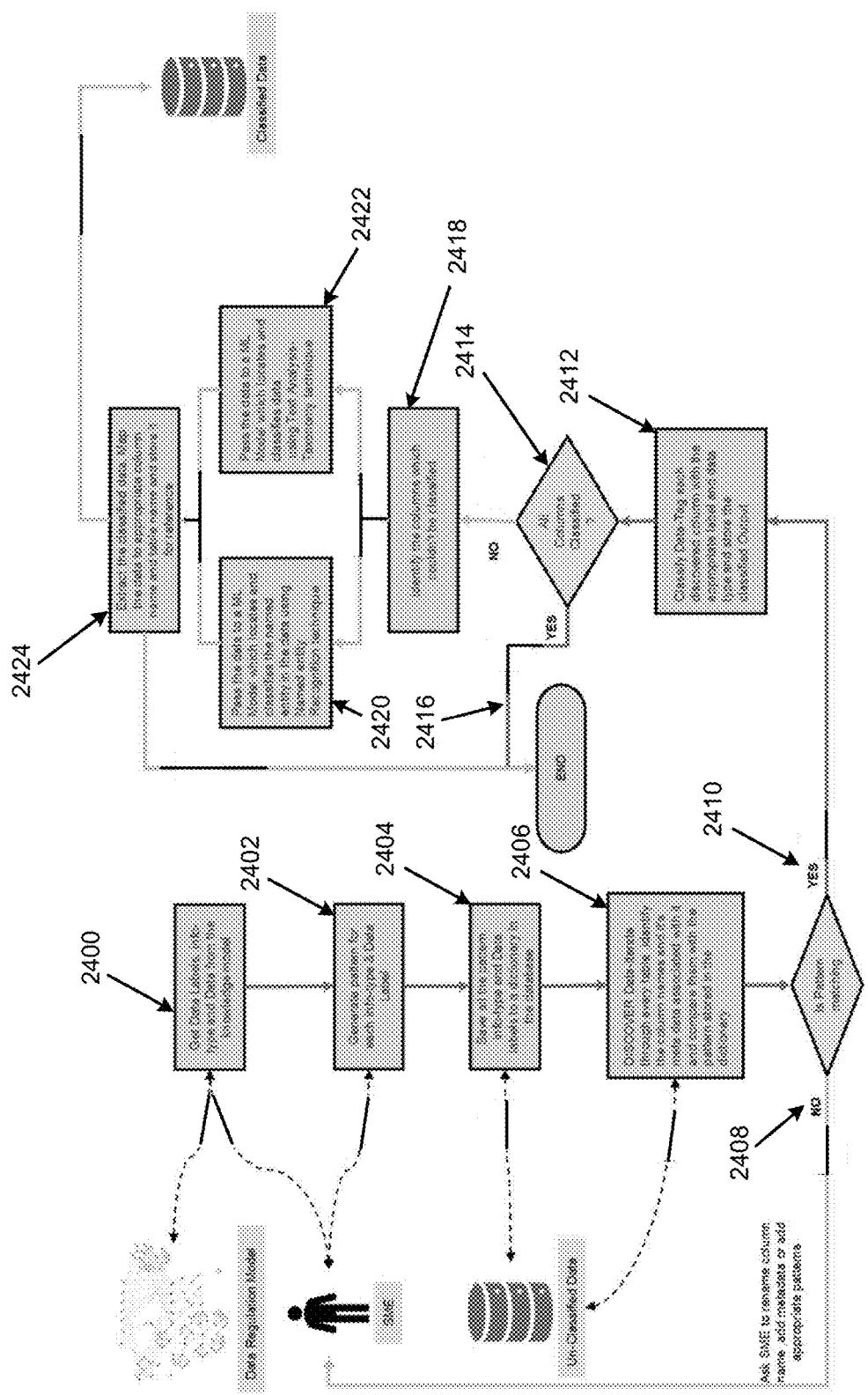
FIG. 24 illustrates further details of the data classification and modelling based application compliance analysis apparatus of FIG. 1 in accordance with an example of the present disclosure.

FIG. 24 illustrates further details of the apparatus 100 in accordance with an example of the present disclosure.

Referring to FIG. 24, operation of the data classifier 116 is illustrated in detail. For example, steps 2400-2424 performed by the data classifier 116 may be implemented to generate the classified data 122. Specifically, at block 2400, the data classifier 116 may obtain data labels, info-type, and data from the annotated knowledge graph 126. At block 2402, the data classifier 116 may generate a pattern for each info-type and data label. At block 2404, the data classifier 116 may store the pattern, info-type, and data labels to a dictionary. At block 2406, the data classifier 116 may discover data by iterating through every table, identify column names, and associated meta data with the stored pattern. At 2408, if there is no pattern match, a subject matter expert may be requested to add metadata and add appropriate patterns. At 2410, if there is a pattern match, at block 2412, the data classifier 116 may classify data and tag each discovered column with the appropriate label and data type, and store the classified output. If all columns are determined to be classified at 2414, at 2416, the data classifier 116 may end further processing. If all columns are not determined to be classified at 2414, the data classifier 116 may proceed to block 2418 to identify columns that are not classified. Further processing may proceed to block 2420 to utilize a recognition technique or to block 2422 to utilize a taxonomy technique. At block 2424, the data classifier 116 may extract the classified data, and map the data to the appropriate column name, and table name, and store for reference.

Figure 25:
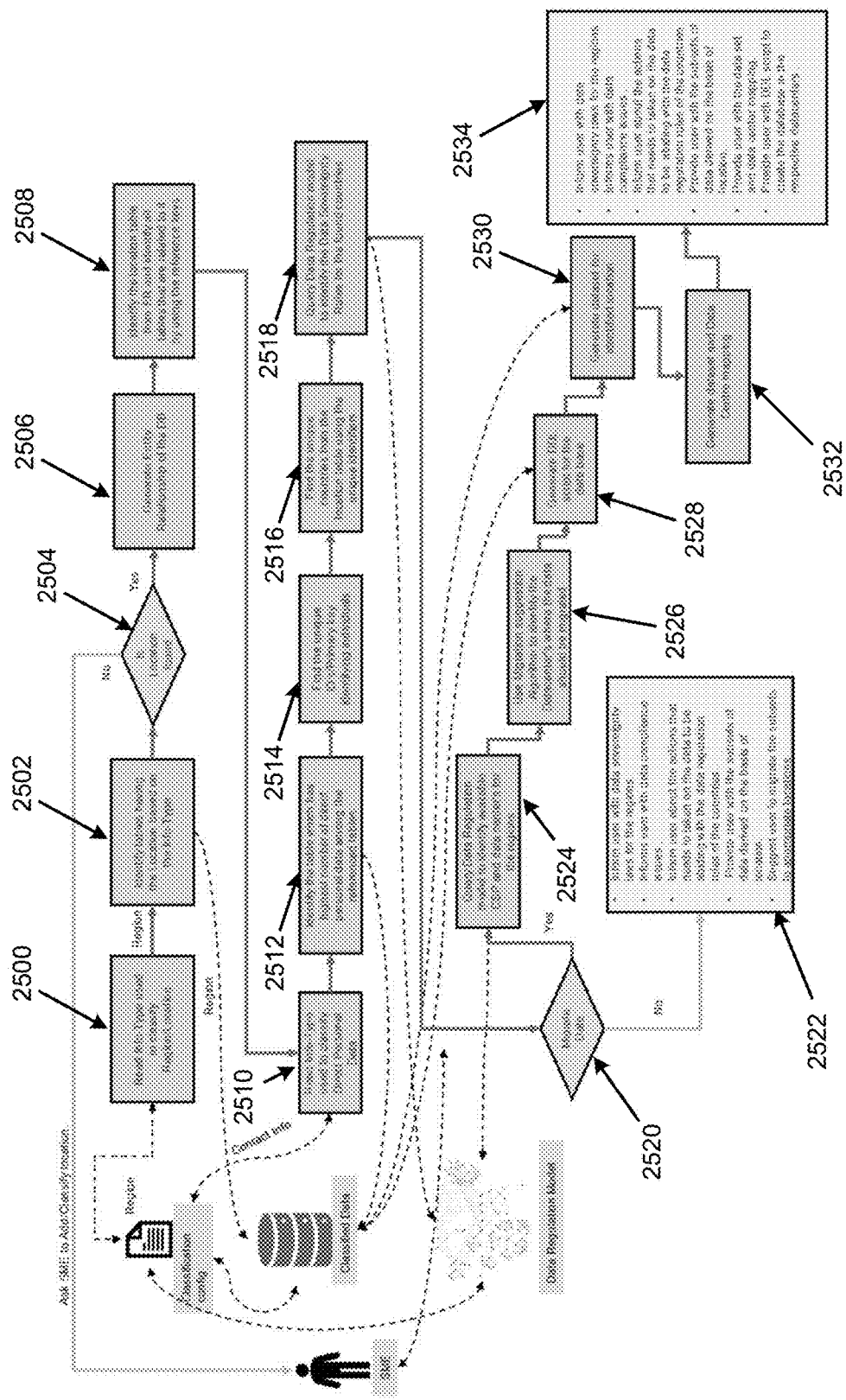
FIG. 25 illustrates a data regulation model to illustrate operation of the data classification and modelling based application compliance analysis apparatus of FIG. 1 in accordance with an example of the present disclosure.

FIG. 25 illustrates a data regulation model to illustrate operation of the apparatus 100 in accordance with an example of the present disclosure.

Referring to FIG. 25, with respect to generation of the data regulations model 302, steps 2500-2534 may be performed to generate the data regulations model 302. At block 2500, the knowledge graph instantiator 112 may read info-type used to classify region/location. At block 2502, the knowledge graph instantiator 112 may identify tables having the location based on info-type. At block 2504, if no location is found, the knowledge graph instantiator 112 may query a subject matter expert. At block 2504, if a location is found, the knowledge graph instantiator 112 may generate, at 2506, entity relationship of the database. At block 2508, the knowledge graph instantiator 112 may identify the location table from the entity relationship, and identify tables that are related by using reference keys. At block 2510, the knowledge graph instantiator 112 may read info-type used to classify direct personal data. At block 2512, the knowledge graph instantiator 112 may identify the table which has a highest number of direct personal data amount reference tables. At block 2514, the knowledge graph instantiator 112 may identify unique identifications (IDs) and primary key identifying individuals. At block 2516, the knowledge graph instantiator 112 may identify unique countries from the location table using the unique identifiers. At block 2518, the knowledge graph instantiator 112 may query the data regulations model to identify data sovereignty rules for the found countries. At 2520, the knowledge graph instantiator 112 may determine whether to migrate data, and if not, proceed to block 2522. Alternatively, the knowledge graph instantiator 112 may proceed to block 2524 to query the data regulations model to identify available cloud service provider and data centers for the region. At block 2526, the knowledge graph instantiator 112 may use a migration recommendation process to identify data centers where the data should be migrated. At block 2528, the knowledge graph instantiator 112 may generate a DDL script for the database. At block 2530, the knowledge graph instantiator 112 may generate a dataset for the identified location. At block 2532, the knowledge graph instantiator 112 may generate a dataset and data center mapping, and proceed to block 2534.

Figure 26:
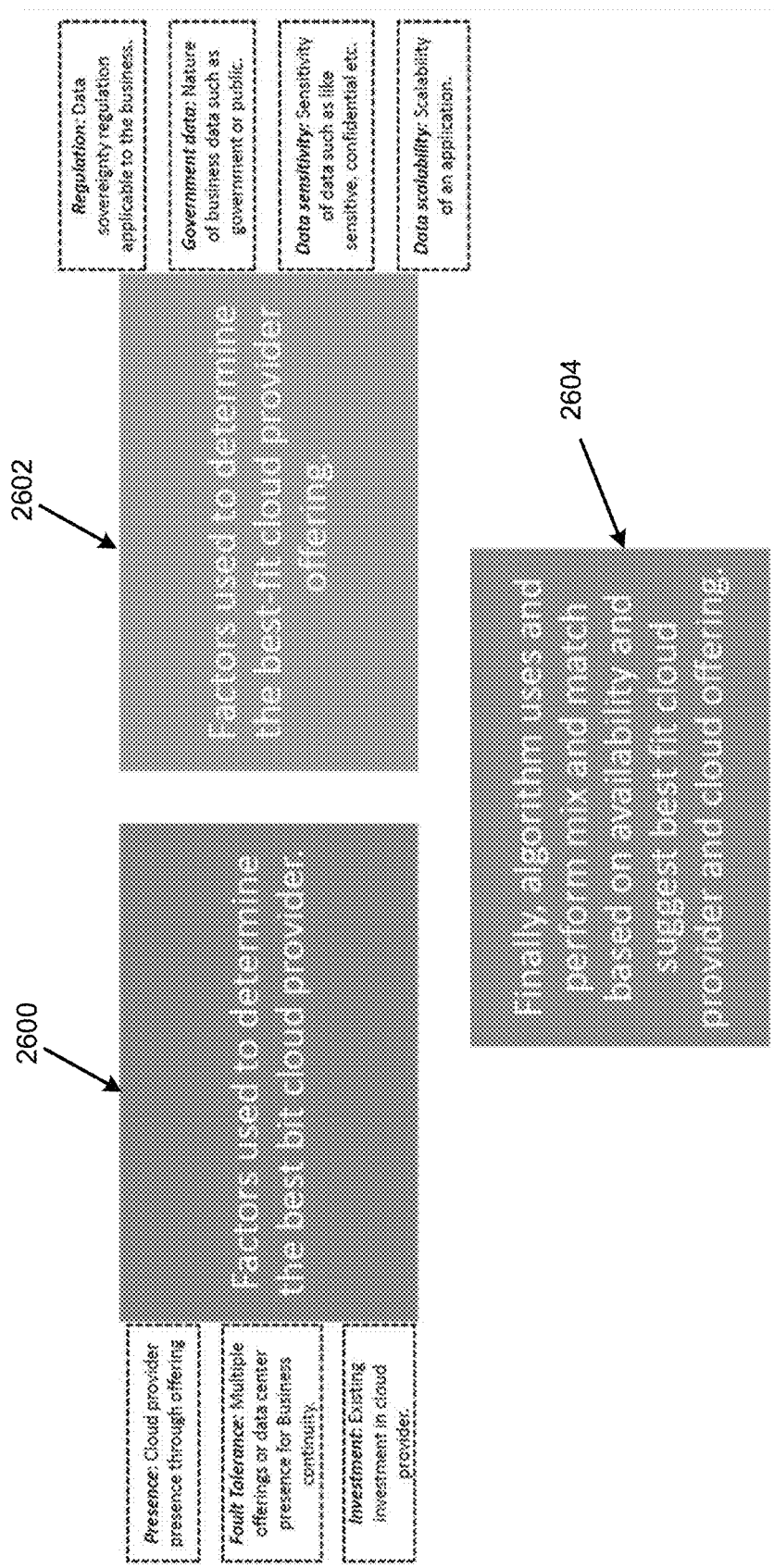
FIG. 26 illustrates details related to a sovereign cloud strategy generator to illustrate operation of the data classification and modelling based application compliance analysis apparatus of FIG. 1 in accordance with an example of the present disclosure.

FIG. 26 illustrates details related to the sovereign cloud strategy generator 132 to illustrate operation of the apparatus 100 in accordance with an example of the present disclosure.

Referring to FIG. 26, the sovereign cloud strategy generator 132 may utilize factors at 2600 to determine the best fit cloud service provider, and the factors at 2602 to determine the best fit cloud service provider offering. Further, at 2604, the sovereign cloud strategy generator 132 may perform analysis based on availability to generate a final recommendation of a best fit cloud service provider and cloud service provider offering combination.

Figure 27:
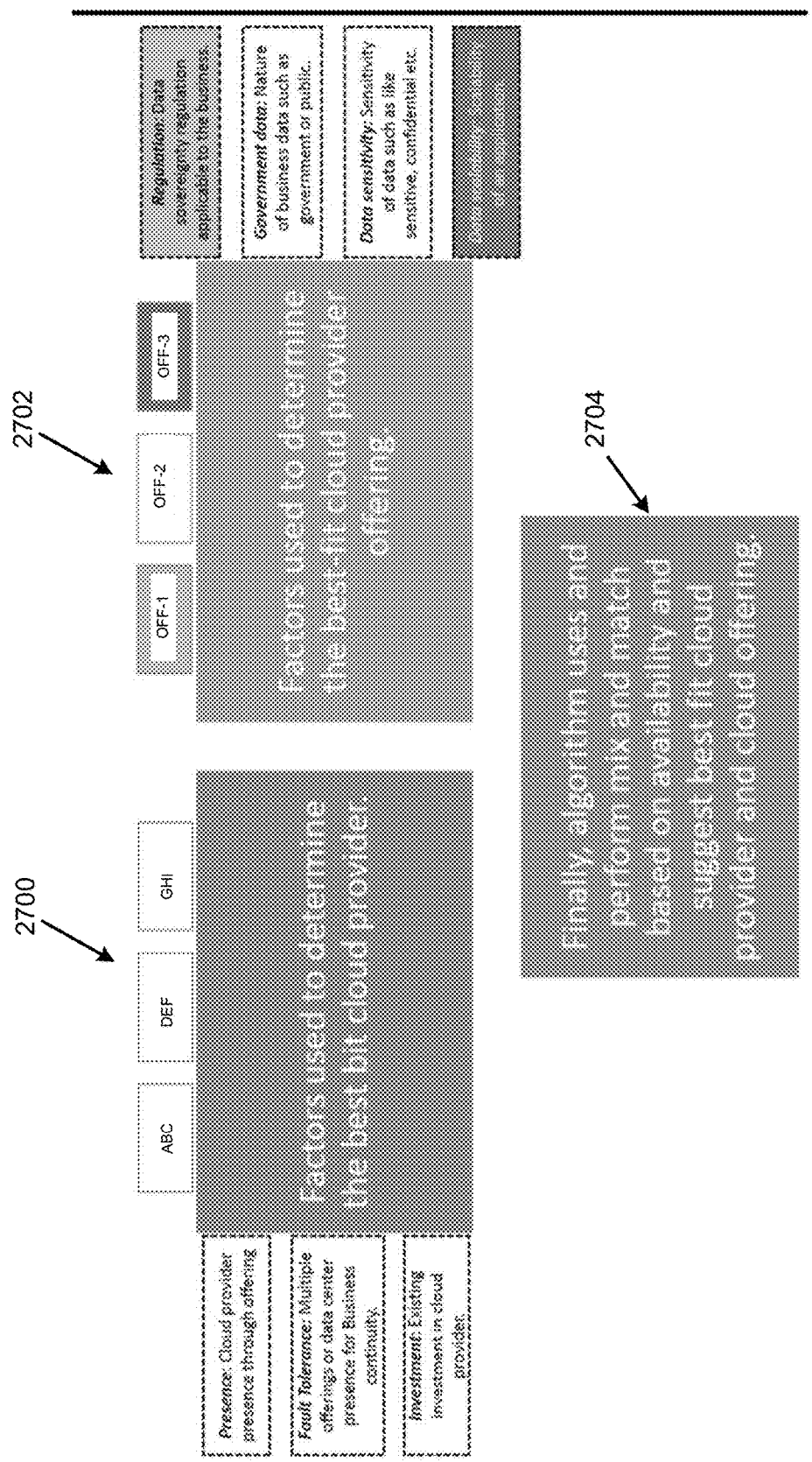
FIG. 27 illustrates further details related to the sovereign cloud strategy generator to illustrate operation of the data classification and modelling based application compliance analysis apparatus of FIG. 1 in accordance with an example of the present disclosure.

FIG. 27 illustrates further details related to the sovereign cloud strategy generator 132 to illustrate operation of the apparatus 100 in accordance with an example of the present disclosure.

Referring to FIG. 27, the sovereign cloud strategy generator 132 may utilize factors at 2700 to determine the best fit cloud service provider between providers such as ABC, DEF, and GHI, and factors at 2702 to determine the best fit cloud service provider offering as OFF-1, OFF-2, or OFF-3. In this regard, at 2704, the sovereign cloud strategy generator 132 may perform analysis based on factors such as availability, and other types of factors, to generate a recommendation of a best fit cloud service provider and cloud service provider offering combination.

Figure 28:
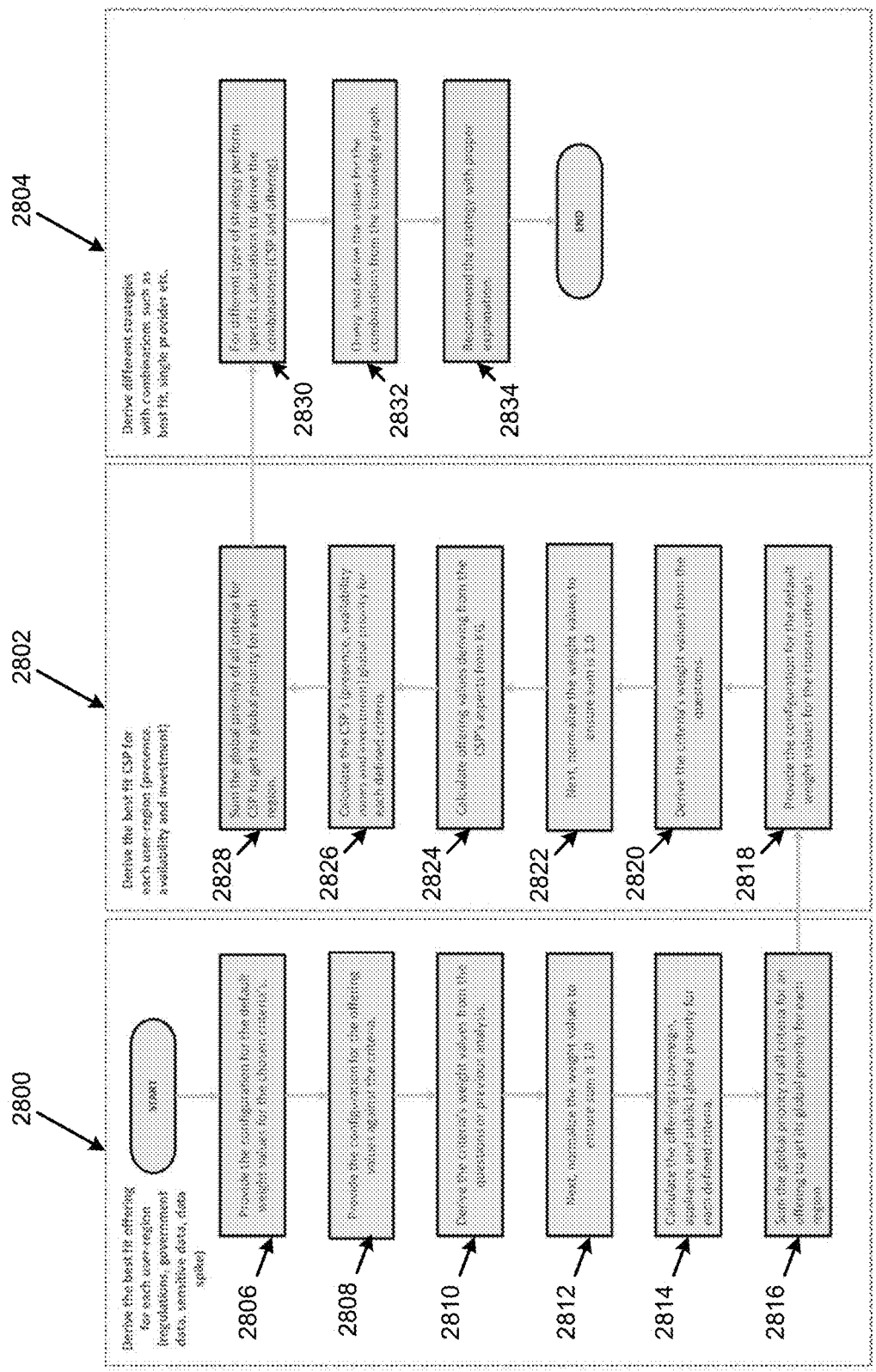
FIG. 28 illustrates a logical flow associated with the sovereign cloud strategy generator to illustrate operation of the data classification and modelling based application compliance analysis apparatus of FIG. 1 in accordance with an example of the present disclosure.

FIG. 28 illustrates a logical flow associated with the sovereign cloud strategy generator 132 to illustrate operation of the apparatus 100 in accordance with an example of the present disclosure.

Referring to FIG. 28, the logical flow associated with the sovereign cloud strategy generator 132 may include a logical flow at 2800 to derive the best fit cloud service provider offering for each user-region (e.g., to meet regulations, government data, sensitive data, data spike, etc.). A logical flow at 2802 may be implemented by the sovereign cloud strategy generator 132 to derive the best fit cloud service provider for each user-region (e.g., to meet presence, availability (or fault tolerance) and investment). Further, a logical flow at 2804 may be implemented by the sovereign cloud strategy generator 132 to derive different strategies with combinations such as best fit, single provider, etc.

Specifically, at block 2806, the sovereign cloud strategy generator 132 may provide the configuration for the default weight values for the chosen factors. At block 2808, the sovereign cloud strategy generator 132 may provide the configuration for the cloud service provider offering values against the factors. At block 2810, the sovereign cloud strategy generator 132 may determine the factor's weight values from inquiries or previous analysis. At block 2812, the sovereign cloud strategy generator 132 may normalize the weight values to a sum of 1.0. At block 2814, the sovereign cloud strategy generator 132 may determine the cloud service provider offerings (e.g., OFF-1, OFF-2, OFF-3, etc.) global priority for each defined factor. At block 2816, the sovereign cloud strategy generator 132 may generate a sum of the global priority of all factors for a cloud service provider offering to obtain its global priority for each region. At block 2818, the sovereign cloud strategy generator 132 may provide the configuration for the default weight values for the chosen factors. At block 2820, the sovereign cloud strategy generator 132 may determine the factor's weight values from inquiries. At block 2822, the sovereign cloud strategy generator 132 may normalize the weight values to a sum of 1.0. At block 2824, the sovereign cloud strategy generator 132 may determine offering values derived from the cloud service providers' aspects from the annotated knowledge graph. At block 2826, the sovereign cloud strategy generator 132 may determine the cloud service provider's global priority for each defined factor. At block 2828, the sovereign cloud strategy generator 132 may generate a sum of the global priority of all factors for a cloud service provider to get its global priority for each region. At block 2830, the sovereign cloud strategy generator 132 may perform, for different types of strategies, analysis to determine the combinations (cloud service provider and cloud service provider offering). At block 2832, the sovereign cloud strategy generator 132 may query and determine the values for the combinations from the annotated knowledge graph. At block 2834, the sovereign cloud strategy generator 132 may generate the sovereign cloud strategy 134.

Figure 29A:
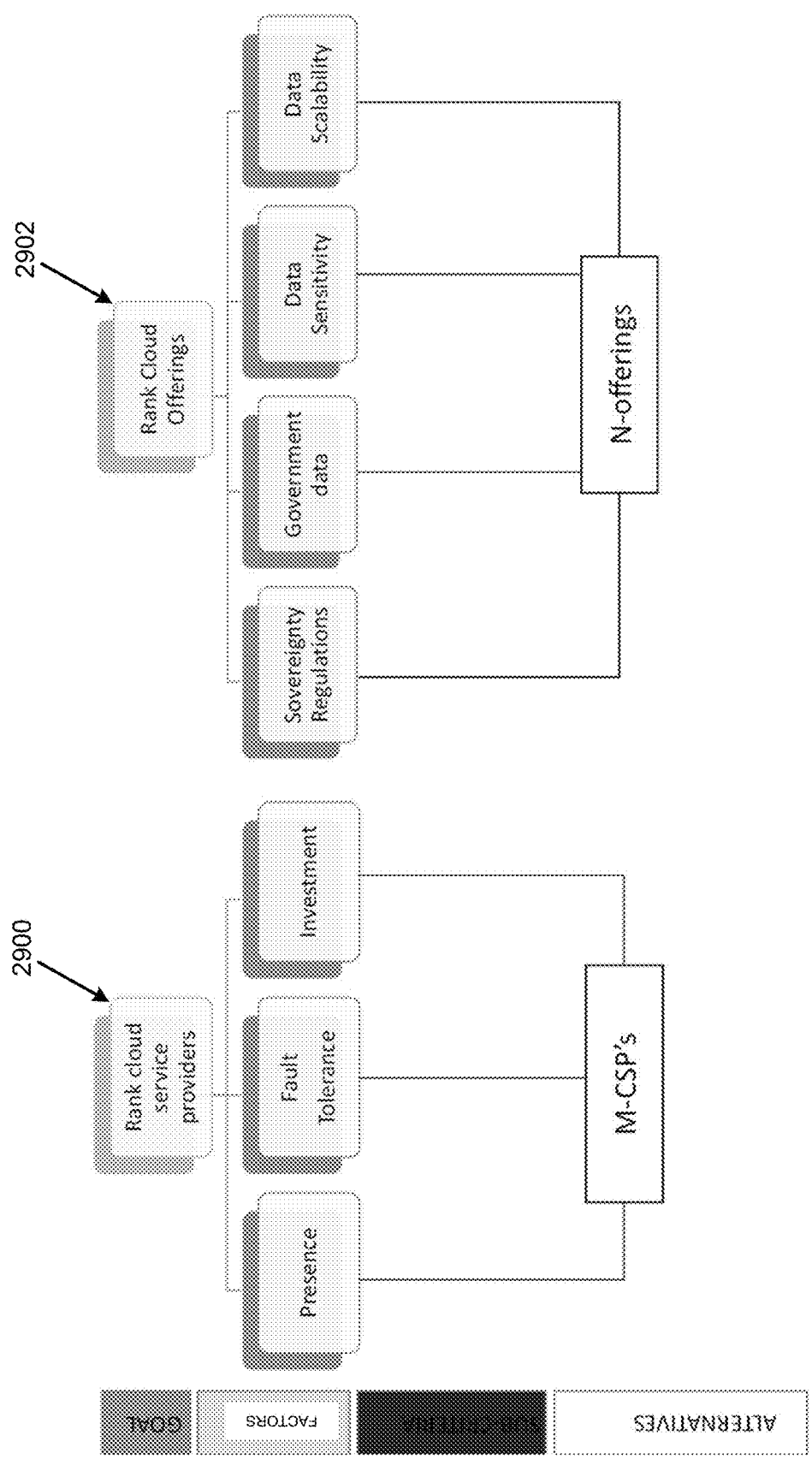
FIGS. 29A-29B illustrate ranking of cloud service providers and cloud service provider offerings to illustrate operation of the data classification and modelling based application compliance analysis apparatus of FIG. 1 in accordance with an example of the present disclosure.
Figure 29B:
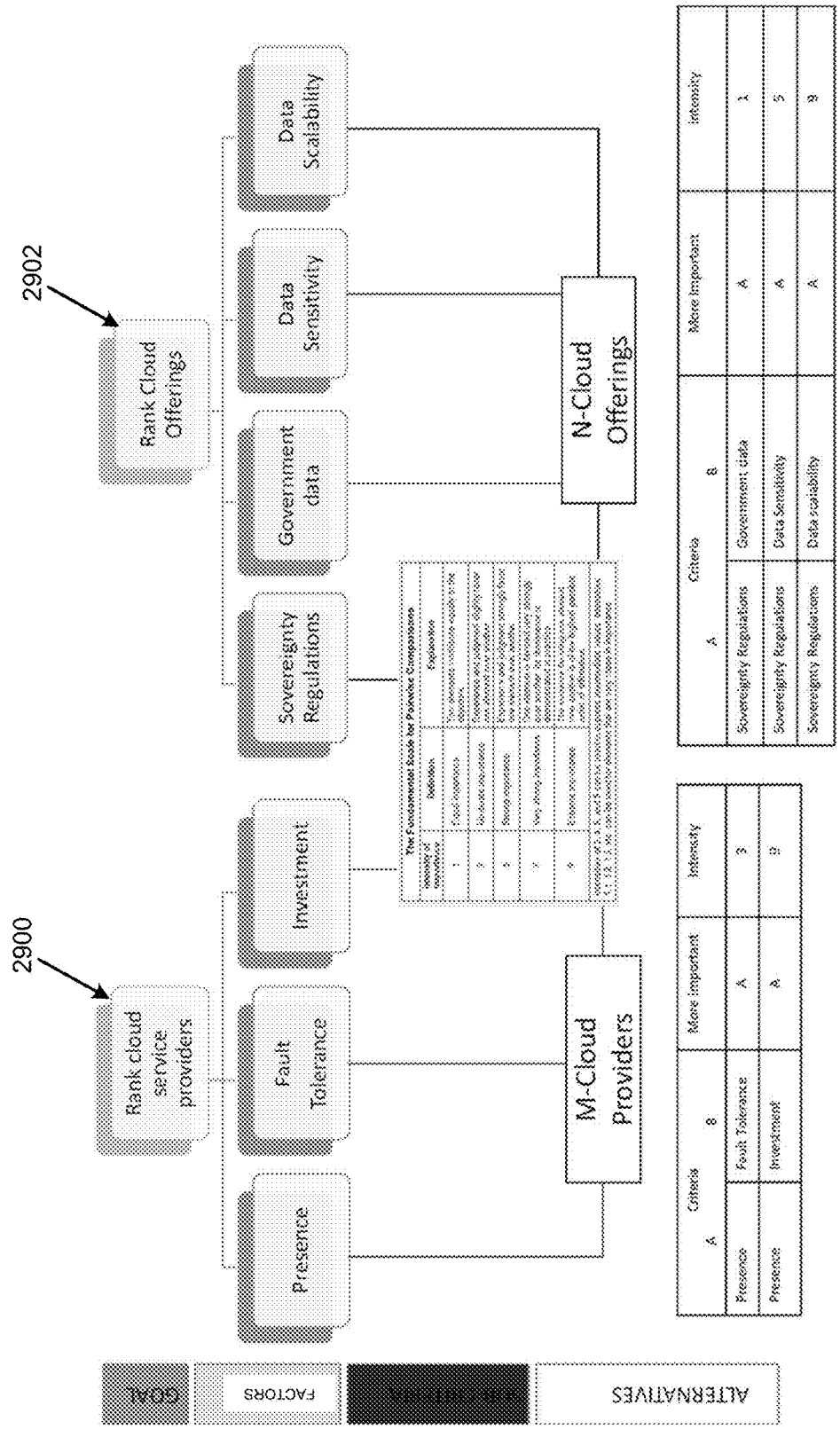

FIGS. 29A-29B illustrate a logical flow associated with the sovereign cloud strategy generator 132, and ranking of cloud service providers and cloud service provider offerings to illustrate operation of the apparatus 100 in accordance with an example of the present disclosure.

Referring to FIGS. 29A and 29B, at 2900, factors associated with ranking of cloud service providers for determination of a best fit cloud service provider and cloud service provider offering combination may account for whether a cloud service provider meets or does not meet requirements for presence, fault tolerance, and investment. Further, at 2902, factors associated with ranking of cloud service provider offerings for determination of a best fit best fit cloud service provider and cloud service provider offering combination may account for whether an offering meets or does not meet requirements for sovereignty regulations, government data, data sensitivity, and data scalability.

Figure 30:
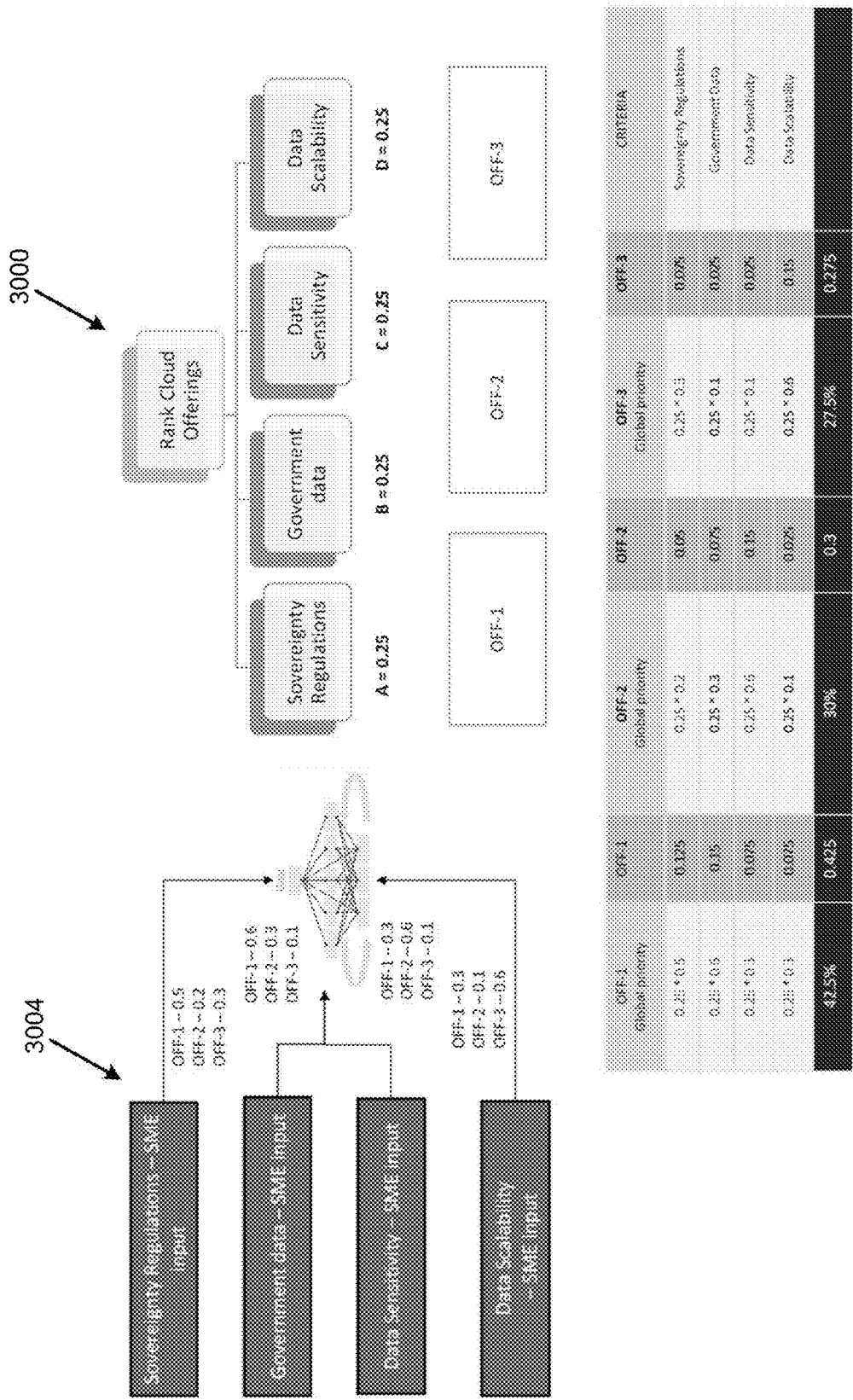
FIG. 30 illustrates details related to offering ranking associated with the sovereign cloud strategy generator to illustrate operation of the data classification and modelling based application compliance analysis apparatus of FIG. 1 in accordance with an example of the present disclosure.

FIG. 30 illustrates details related to cloud service provider offering ranking associated with the sovereign cloud strategy generator 132 to illustrate operation of the apparatus 100 in accordance with an example of the present disclosure.

Referring to FIG. 30, cloud service provider offering ranking associated with the sovereign cloud strategy generator 132 may be implemented as specified as 3000. For example, at 3002, the sovereign cloud strategy generator 132 may determine, based on weighted scores for all of the factors 3004, an overall weighted factor score for each of the cloud service provider offerings OFF-1 as 0.425 (e.g., 42.5%), OFF-2 as 0.300 (e.g., 30.0%), and OFF-3 as 0.275 (e.g., 27.5%). For example, the factors at 3004 may account for whether an offering meets or does not meet requirements for sovereignty regulations, government data, data sensitivity, and data scalability. Based on the overall weighted factor scores, cloud service provider offering OFF-1 that received a score of 0.425 (e.g., 42.5%) may be ranked the highest. The input weights for a factor with respect to the offering may be provided, for example, a subject matter expert. These factor weights may signify the impact of that factor on the cloud service provider offering. For example, sovereignty regulations may have an impact of 0.5 on OFF-1, whereas for OFF-2 the impact is 0.2, and for OFF-3 the impact is 0.3. Thus, for OFF-1, values for all the factors may be determined, and summed to determine a final score for the offering as 42.5%.

Figure 31A:
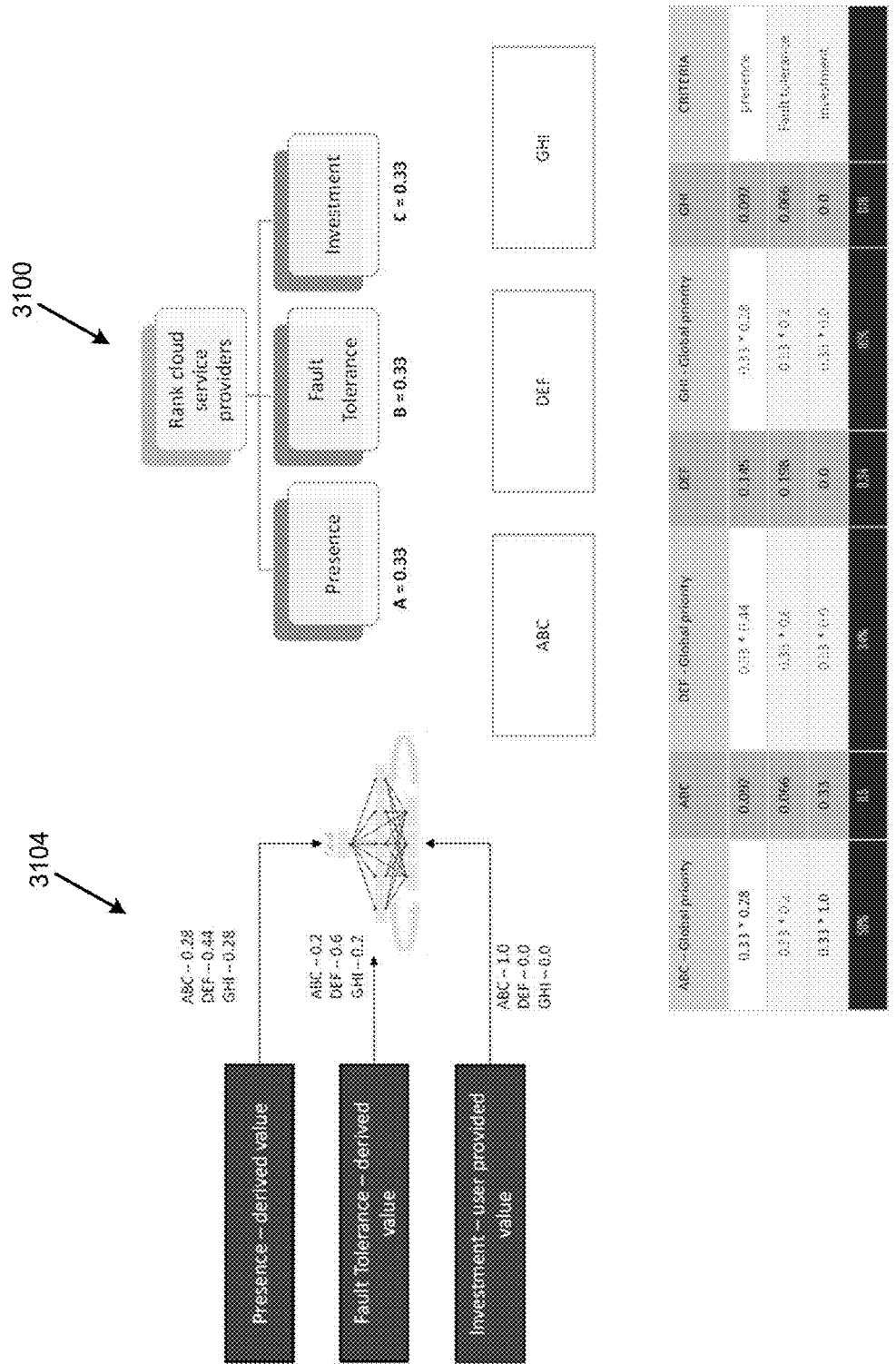
FIGS. 31A and 31B illustrate details related to ranking of cloud service provider's for offering suggestion associated with the sovereign cloud strategy generator to illustrate operation of the data classification and modelling based application compliance analysis apparatus of FIG. 1 in accordance with an example of the present disclosure.
Figure 31B:
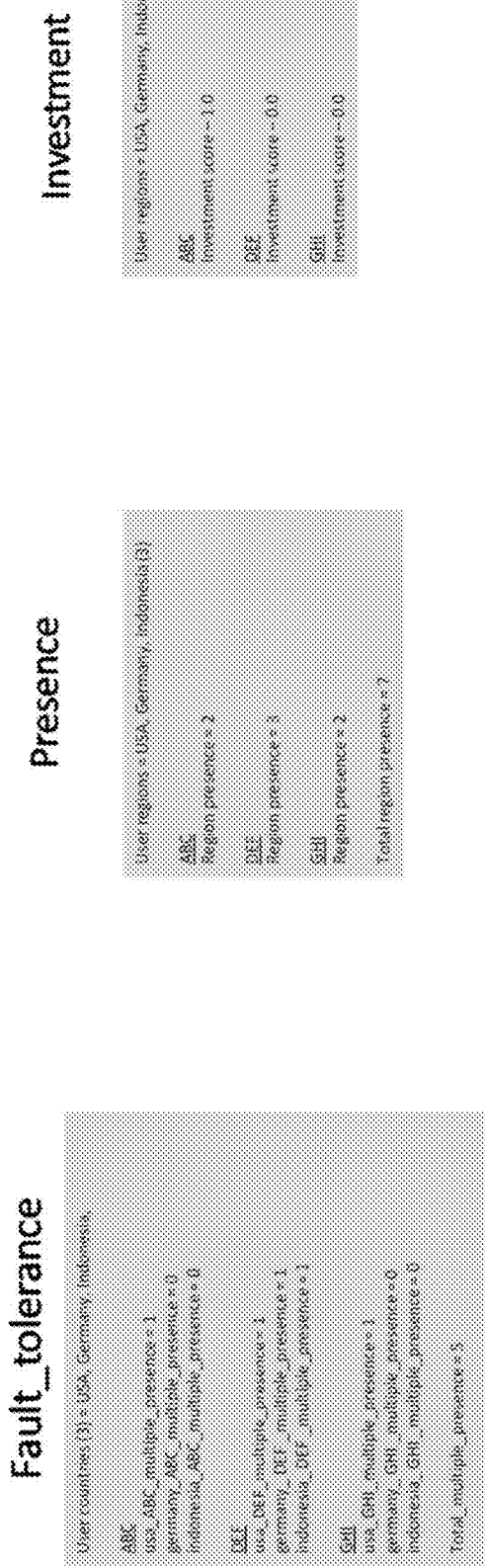

FIGS. 31A and 31B illustrate details related to ranking of cloud service provider's for offering suggestion associated with the sovereign cloud strategy generator 132 to illustrate operation of the apparatus 100 in accordance with an example of the present disclosure.

Referring to FIGS. 31A and 31B, ranking of cloud service provider's for offering suggestion associated with the sovereign cloud strategy generator 132 may be implemented as specified as 3100. For example, at 3102, the sovereign cloud strategy generator 132 may determine, based on weighted scores for all of the factors 3104, an overall weighted factor score for each of the cloud service providers as ABC as 0.50 (e.g., 50.0%), DEF as 0.34 (e.g., 34.0%), and GHI as 0.16 (e.g., 16.0%). For example, the factors at 3104 may account for whether a cloud service provider meets or does not meet requirements for presence, fault tolerance, and investment. Based on the overall weighted factor scores, cloud service provider ABC that received a score of 0.50 (e.g., 50.0%) may be ranked the highest. The scores for factors presence and fault tolerance may be derived based on the regions selected by the user and the presence of multiple cloud service provider offering availability of the cloud service providers in that region. As illustrated in FIG. 31A, assuming three regions including the USA, Germany and Indonesia, cloud service provider ABC is present in two regions, cloud service provider DEF is present in all three regions, and cloud service provider GM is only present in one region, hence the scores may be determined for presence as follows: ABC_presence_score is 2/7 e.g., 0.28, DEF_presence_score is 3/7 e.g., 0.43 and GHI_presence_score is 1/7 e.g., 0.28. Similarly, scores for fault tolerance may be determined as shown in FIG. 19. For the factor investment, these values may be directly obtained from a subject matter expert based on their usage of a cloud service provider.

Figure 32:
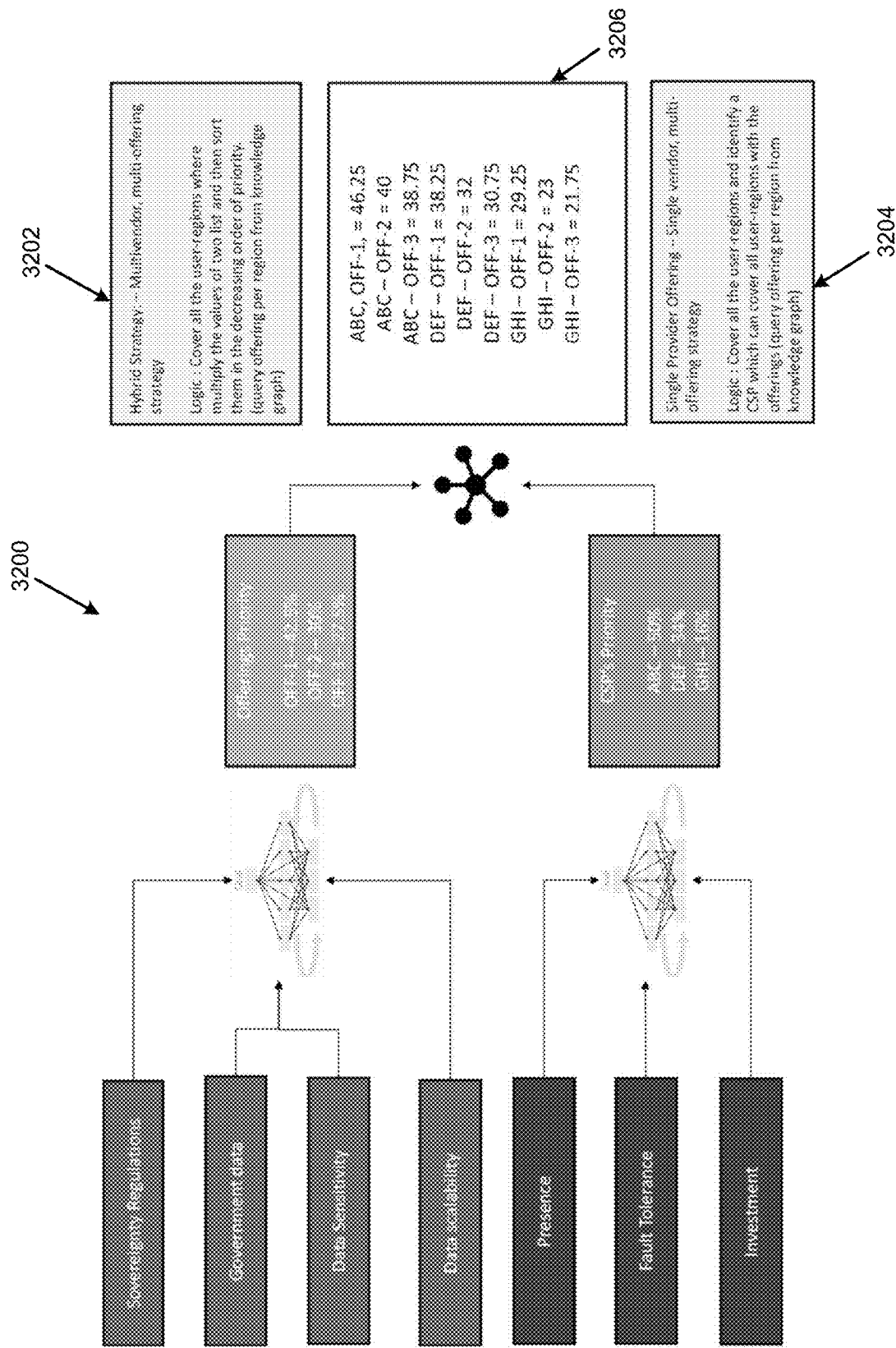
FIG. 32 illustrates details related to offerings priority versus cloud service provider's priority associated with the sovereign cloud strategy generator to illustrate operation of the data classification and modelling based application compliance analysis apparatus of FIG. 1 in accordance with an example of the present disclosure.

FIG. 32 illustrates details related to offerings priority versus cloud service provider's priority associated with the sovereign cloud strategy generator 132 to illustrate operation of the apparatus 100 in accordance with an example of the present disclosure.

Referring to FIG. 32, cloud service provider offerings priority versus cloud service provider's priority associated with the sovereign cloud strategy generator 132 may be implemented as specified as 3200. For example, the sovereign cloud strategy generator 132 may implement a hybrid strategy at 3202 (e.g., multivendor, multi-offering strategy), or a single cloud service provider offering at 3204 (e.g., single vendor, multi-offering strategy) to generate the results at 3206. With respect to identification of the best fit cloud service provider and cloud service provider offering combination, the aforementioned analysis may independently determine the best-fit cloud service provider and best-fit cloud service provider offering based on the various factors. As a next step, the sovereign cloud strategy generator 132 may determine a cloud service provider and cloud service provider offering matrix {m*n}, including m cloud service providers, and n cloud service provider offerings, and determine scores by normalizing both scores together. For example, the cloud service provider ABC with a score of 50%, and cloud service provider offering OFF-1 with a score of 42.5% results in average score of 46.25 for ABC-OFF-1. Similarly, the sovereign cloud strategy generator 132 may determine other factor combination scores, and rank them in ascending order of preference. For this illustration, cloud service provider ABC and cloud service provider offering OFF-1 may represent the best fit cloud service provider and best fit cloud service provider offering with the highest score followed by other combinations.

Figure 33:
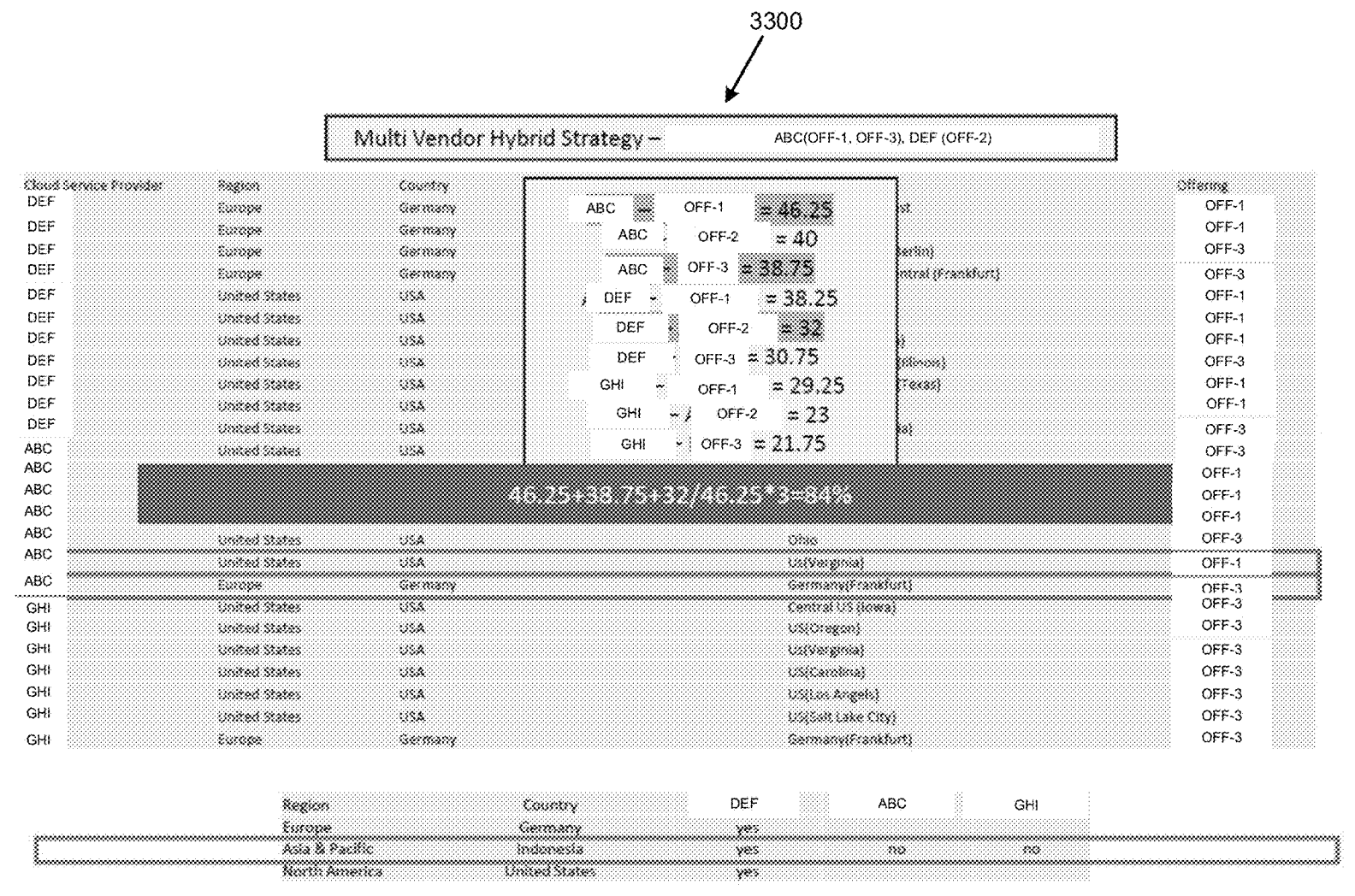

FIG. 33 illustrates details related to multi-vendor hybrid strategy associated with the sovereign cloud strategy generator 132 to illustrate operation of the apparatus 100 in accordance with an example of the present disclosure. In this regard, a vendor may represent a cloud service provider.

Referring to FIG. 33, multi-vendor hybrid strategy associated with the sovereign cloud strategy generator 132 may be implemented as specified as 3300. In this regard, the sovereign cloud strategy generator 132 may iterate through each user country of an application, and iterate through the matrix element from top to bottom to determine the existence of the cloud service provider and cloud service provider offering. If the cloud service provider and cloud service provider offering exists, then the option may be recommended for the country, an otherwise an iteration may be performed through the next element from the matrix. For example, USA maps to ABC and OFF-1, Germany maps to ABC and OFF-3, and Indonesia maps to DEF and OFF-2.

Figure 34:
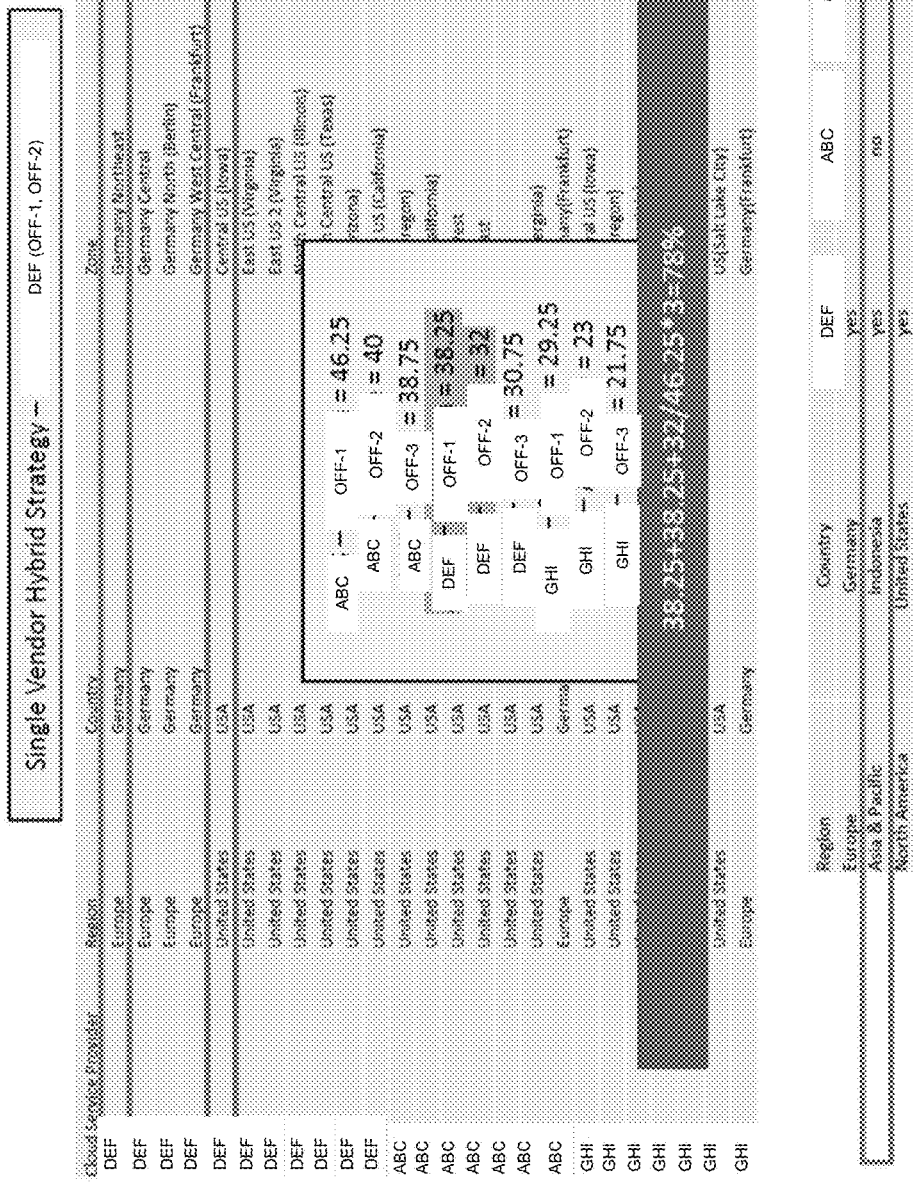
FIG. 34 illustrates details related to single vendor hybrid strategy associated with the sovereign cloud strategy generator to illustrate operation of the data classification and modelling based application compliance analysis apparatus of FIG. 1 in accordance with an example of the present disclosure.

FIG. 34 illustrates details related to single vendor hybrid strategy associated with the sovereign cloud strategy generator 132 to illustrate operation of the apparatus 100 in accordance with an example of the present disclosure.

Referring to FIG. 34, single vendor hybrid strategy associated with the sovereign cloud strategy generator 132 may be implemented as specified as 3400. In this regard, the sovereign cloud strategy generator 132 may determine the best single cloud strategy based on the availability of the cloud service provider across all countries in a similar manner as disclosed herein with respect to the mapping of the matrix. For example, cloud provider DEF is present across three countries (e.g., the USA, Germany, and Indonesia, and its combined score is above the other cloud service provider scores, hence is preferred as a single vendor).

Figure 35:
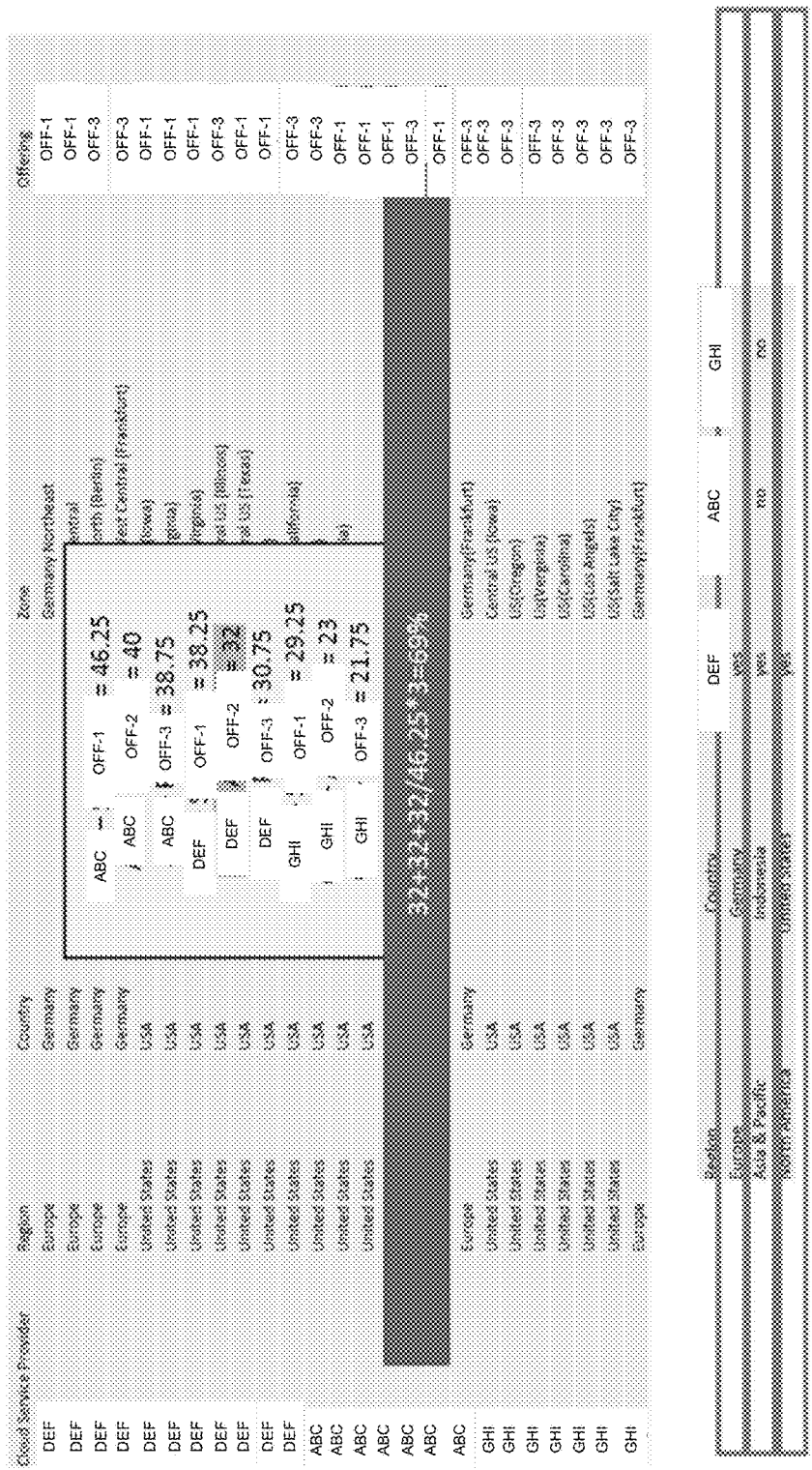
FIG. 35 illustrates details related to single vendor strategy associated with the sovereign cloud strategy generator to illustrate operation of the data classification and modelling based application compliance analysis apparatus of FIG. 1 in accordance with an example of the present disclosure.

FIG. 35 illustrates details related to single vendor strategy associated with the sovereign cloud strategy generator 132 to illustrate operation of the apparatus 100 in accordance with an example of the present disclosure.

Referring to FIG. 35, single vendor strategy associated with the sovereign cloud strategy generator 132 may be implemented as specified as 3500, in a similar manner as disclosed above with respect to FIG. 34.

Figure 36:
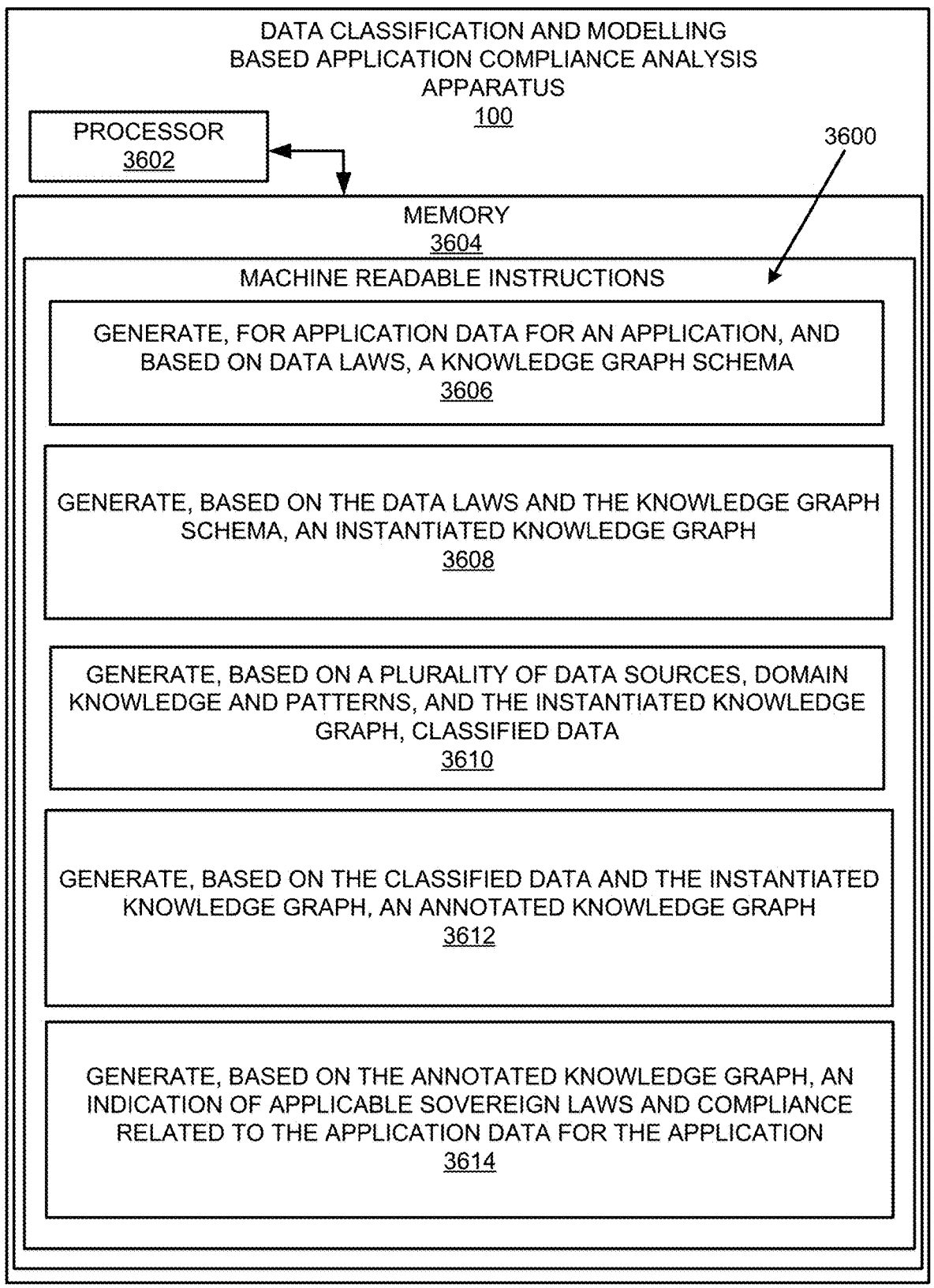
FIG. 36 illustrates an example block diagram for data classification and modelling based application compliance analysis in accordance with an example of the present disclosure.
Figure 36:
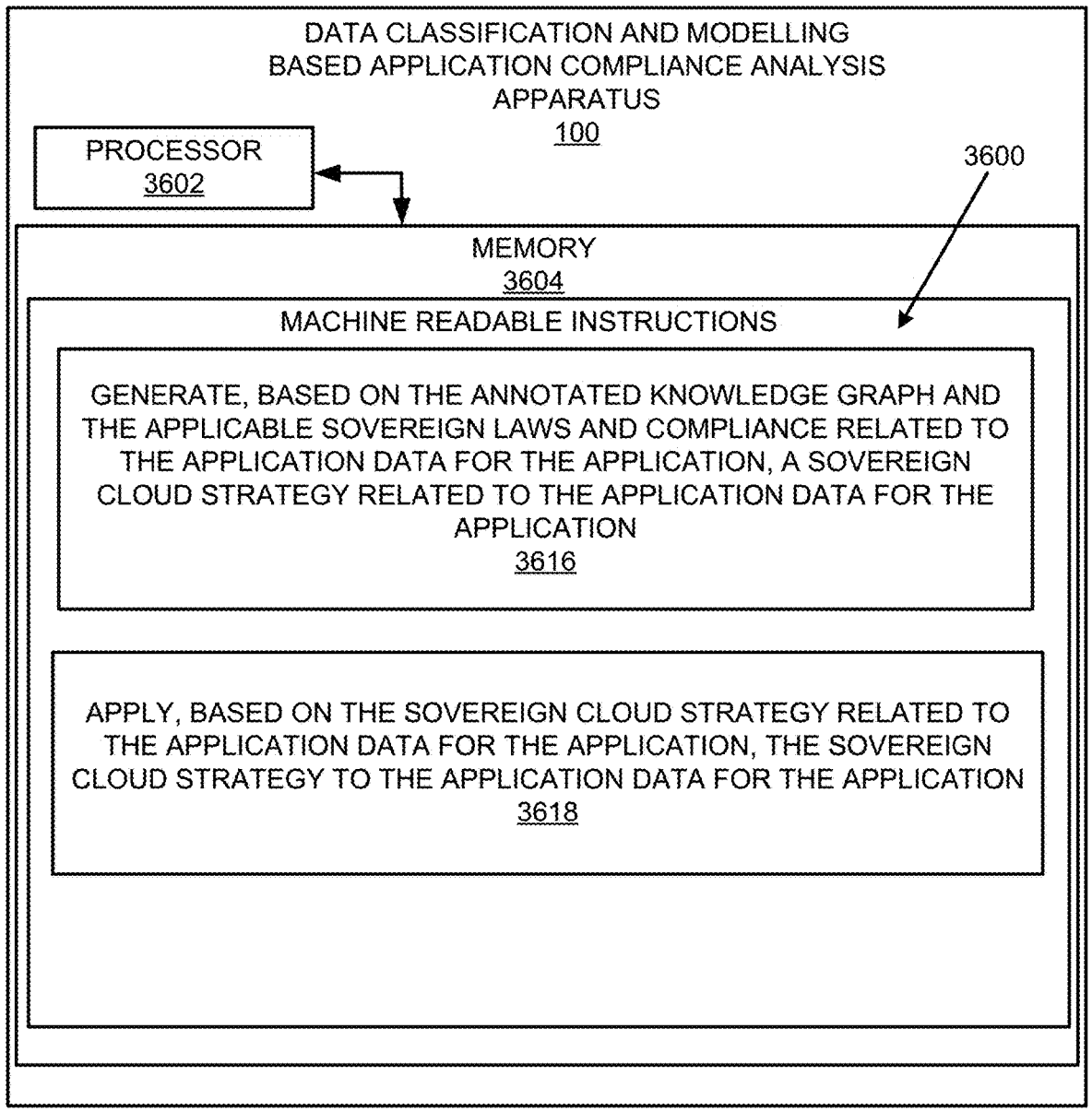
Figure 38:
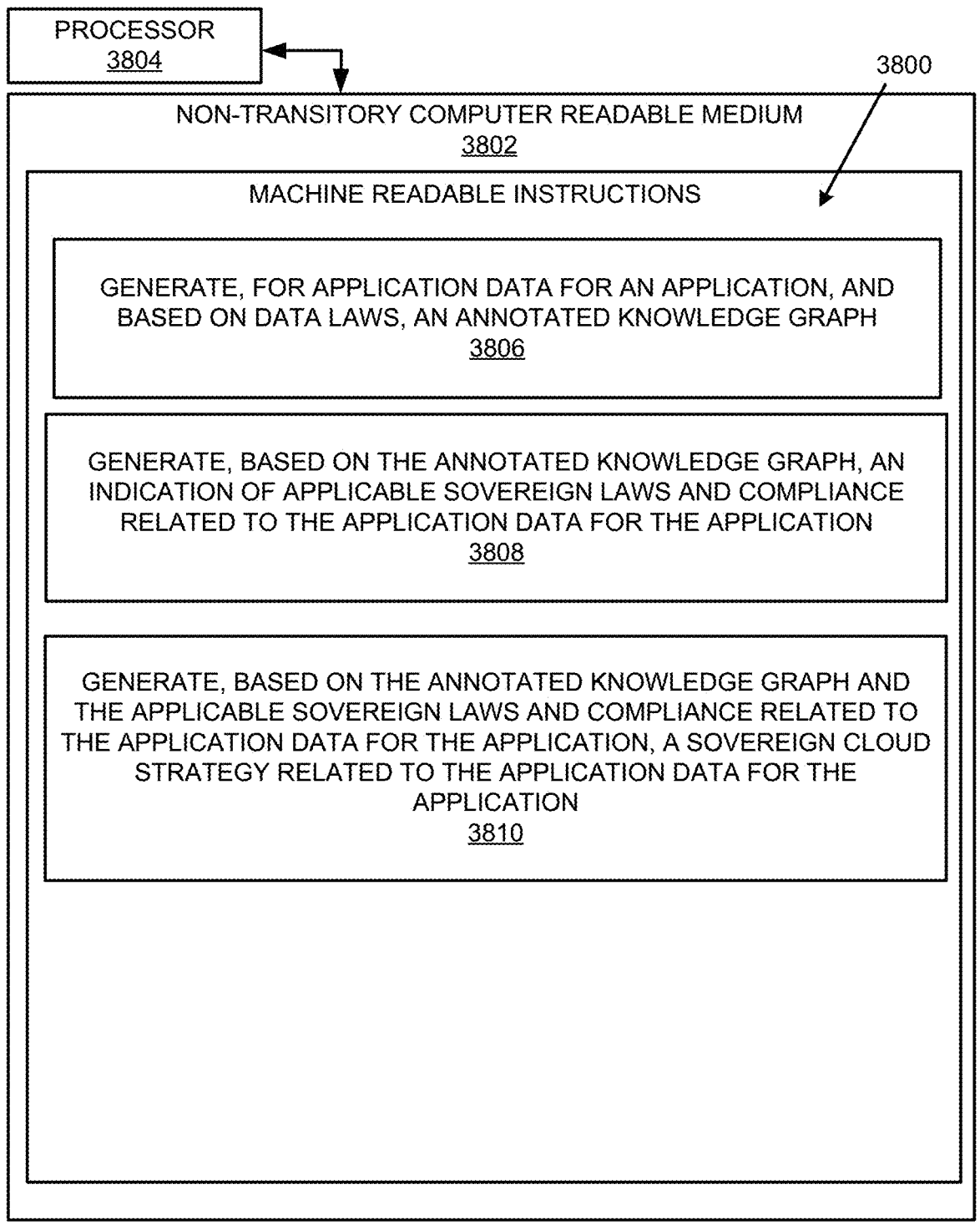
FIG. 38 illustrates a further example block diagram for data classification and modelling based application compliance analysis in accordance with another example of the present disclosure.

FIGS. 36-38 respectively illustrate an example block diagram 3600, a flowchart of an example method 3700, and a further example block diagram 3800 for data classification and modelling based application compliance analysis, according to examples. The block diagram 3600, the method 3700, and the block diagram 3800 may be implemented on the apparatus 100 described above with reference to FIG. 1 by way of example and not of limitation. The block diagram 3600, the method 3700, and the block diagram 3800 may be practiced in other apparatus. In addition to showing the block diagram 3600, FIG. 36 shows hardware of the apparatus 100 that may execute the instructions of the block diagram 3600. The hardware may include a processor 3602, and a memory 3604 storing machine readable instructions that when executed by the processor cause the processor to perform the instructions of the block diagram 3600. The memory 3604 may represent a non-transitory computer readable medium. FIG. 37 may represent an example method for data classification and modelling based application compliance analysis, and the steps of the method. FIG. 38 may represent a non-transitory computer readable medium 3802 having stored thereon machine readable instructions to provide data classification and modelling based application compliance analysis according to an example. The machine readable instructions, when executed, cause a processor 3804 to perform the instructions of the block diagram 3800 also shown in FIG. 38.

The processor 3602 of FIG. 36 and/or the processor 3804 of FIG. 38 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 3802 of FIG. 38), such as hardware storage devices (e.g., RAM (random access memory), ROM (read only memory), EPROM (erasable, programmable ROM), EEPROM (electrically erasable, programmable ROM), hard drives, and flash memory). The memory 3604 may include a RAM, where the machine readable instructions and data for a processor may reside during runtime.

Referring to FIGS. 1-36, and particularly to the block diagram 3600 shown in FIG. 36, the memory 3604 may include instructions 3606 to generate, for application data 104 for an application 106, and based on data laws 108, a knowledge graph schema 110.

The processor 3602 may fetch, decode, and execute the instructions 3608 to generate, based on the data laws 108 and the knowledge graph schema 110, an instantiated knowledge graph 114.

The processor 3602 may fetch, decode, and execute the instructions 3610 to generate, based on a plurality of data sources 118, domain knowledge and patterns 120, and the instantiated knowledge graph 114, classified data 122.

The processor 3602 may fetch, decode, and execute the instructions 3612 to generate, based on the classified data 122 and the instantiated knowledge graph 114, an annotated knowledge graph 126.

The processor 3602 may fetch, decode, and execute the instructions 3614 to generate, based on the annotated knowledge graph 126, an indication of applicable sovereign laws and compliance 130 related to the application data 104 for the application 106.

The processor 3602 may fetch, decode, and execute the instructions 3616 to generate, based on the annotated knowledge graph 126 and the applicable sovereign laws and compliance 130 related to the application data 104 for the application 106, a sovereign cloud strategy 134 related to the application data 104 for the application 106.

The processor 3602 may fetch, decode, and execute the instructions 3618 to apply, based on the sovereign cloud strategy 134 related to the application data 104 for the application 106, the sovereign cloud strategy 134 to the application data 104 for the application 106.

Referring to FIGS. 1-35 and 37, and particularly FIG. 37, for the method 3700, at block 3702, the method may include generating, by at least one hardware processor, for application data for an application, and based on data laws, an annotated knowledge graph.

At block 3704, the method may include generating, based on the annotated knowledge graph, an indication of applicable sovereign laws and compliance related to the application data for the application.

At block 3706, the method may include generating, based on the annotated knowledge graph and the applicable sovereign laws and compliance related to the application data for the application, a sovereign cloud strategy related to the application data for the application.

At block 3708, the method may include applying, based on the sovereign cloud strategy related to the application data for the application, the sovereign cloud strategy to the application data for the application.

Referring to FIGS. 1-35 and 38, and particularly FIG. 38, for the block diagram 3800, the non-transitory computer readable medium 3802 may include instructions 3806 to generate, for application data for an application, and based on data laws, an annotated knowledge graph.

The processor 3804 may fetch, decode, and execute the instructions 3808 to generate, based on the annotated knowledge graph, an indication of applicable sovereign laws and compliance related to the application data for the application.

The processor 3804 may fetch, decode, and execute the instructions 3810 to generate, based on the annotated knowledge graph and the applicable sovereign laws and compliance related to the application data for the application, a sovereign cloud strategy related to the application data for the application.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A data classification and modelling based application compliance analysis apparatus comprising:
at least one hardware processor;
a knowledge graph schema generator, executed by the at least one hardware processor, to
generate, for application data for an application, and based on data laws, a knowledge graph schema;
a knowledge graph instantiator, executed by the at least one hardware processor, to
generate, based on the data laws and the knowledge graph schema, an instantiated knowledge graph;
a data classifier, executed by the at least one hardware processor, to
generate, based on a plurality of data sources, domain knowledge and patterns, and the instantiated knowledge graph, classified data;
a knowledge graph annotator, executed by the at least one hardware processor, to
generate, based on the classified data and the instantiated knowledge graph, an annotated knowledge graph;
a governance and compliance advisor, executed by the at least one hardware processor, to
generate, based on the annotated knowledge graph, an indication of applicable sovereign laws and compliance related to the application data for the application;
a sovereign cloud strategy generator, executed by the at least one hardware processor, to
generate, based on the annotated knowledge graph and the applicable sovereign laws and compliance related to the application data for the application, a sovereign cloud strategy related to the application data for the application;

a sovereign cloud strategy implementer, executed by the at least one hardware processor, to
apply, based on the sovereign cloud strategy related to the application data for the application, the sovereign cloud strategy to the application data for the application; and
store, based on application of the sovereign cloud strategy to the application data for the application, the application data for the application.

2. The data classification and modelling based application compliance analysis apparatus according to claim 1, wherein the sovereign cloud strategy generator is executed by the at least one hardware processor to:
generate, based on the annotated knowledge graph and the applicable sovereign laws and compliance related to the application data for the application, the sovereign cloud strategy that includes a ranking of cloud service providers for storage of the application data for the application.

3. The data classification and modelling based application compliance analysis apparatus according to claim 2, wherein the sovereign cloud strategy generator is executed by the at least one hardware processor to generate, based on the annotated knowledge graph and the applicable sovereign laws and compliance related to the application data for the application, the sovereign cloud strategy that includes the ranking of cloud service providers for storage of the application data for the application by:
determining, for each cloud service provider of the cloud service providers, and for each factor of a plurality of factors associated with the applicable sovereign laws and compliance, a score.

4. The data classification and modelling based application compliance analysis apparatus according to claim 3, wherein the sovereign cloud strategy generator is executed by the at least one hardware processor to determine, for each cloud service provider of the cloud service providers, and for each factor of the plurality of factors associated with the applicable sovereign laws and compliance, the score by:
modifying, based on a weight associated with each factor of the plurality of factors, the score to generate, for each cloud service provider of the cloud service providers, and for each factor of the plurality of factors, a weighted score.

5. The data classification and modelling based application compliance analysis apparatus according to claim 4, wherein the sovereign cloud strategy generator is executed by the at least one hardware processor to:
determine, for each cloud service provider of the cloud service providers and based on the weighted score corresponding to each factor of the plurality of factors, an overall weighted factor score; and
rank, based on the overall weighted factor score for each cloud service provider of the cloud service providers, the cloud service providers.

6. The data classification and modelling based application compliance analysis apparatus according to claim 2, wherein the sovereign cloud strategy generator is executed by the at least one hardware processor to:
generate, for a highest ranked cloud service provider of the ranked cloud service providers, a ranking of cloud service provider offerings for storage of the application data for the application, and
the sovereign cloud strategy implementer is executed by the at least one hardware processor to:
apply, based on the sovereign cloud strategy related to the application data for the application, a highest ranked cloud service provider offering of the ranked cloud service provider offerings to store the application data for the application.

7. The data classification and modelling based application compliance analysis apparatus according to claim 2, wherein the sovereign cloud strategy generator is executed by the at least one hardware processor to:
generate, for each ranked cloud service provider of the ranked cloud service providers, a ranking of cloud service provider offerings for storage of the application data for the application; and
determine, based on analysis of a plurality of ranked cloud service provider and ranked cloud service provider offering combinations, a best fit cloud service provider and cloud service provider offering combination, and
the sovereign cloud strategy implementer is executed by the at least one hardware processor to:
apply, based on the sovereign cloud strategy related to the application data for the application, the best fit cloud service provider and cloud service provider offering combination to store the application data for the application.

8. The data classification and modelling based application compliance analysis apparatus according to claim 1, wherein the knowledge graph schema includes:
a data classification model to classify the application data according to the data laws;
a regional model to encapsulate geographies with respect to larger geographical entities;
a data regulations model to encapsulate the data laws for regions associated with storage of the application data for the application;
a cloud service provider model to encapsulate properties associated with cloud service providers for the storage of the application data for the application; and
a cloud service provider offering model to encapsulate cloud service offerings associated with the cloud service providers.

9. A method for data classification and modelling based application compliance analysis, the method comprising:
generating, by at least one hardware processor, for application data for an application, and based on data laws, a knowledge graph schema;
generating, by the at least one hardware processor, based on the data laws and the knowledge graph schema, an instantiated knowledge graph;
generating, by the at least one hardware processor, based on a plurality of data sources, domain knowledge and patterns, and the instantiated knowledge graph, an annotated knowledge graph;
generating, by the at least one hardware processor, based on the annotated knowledge graph, an indication of applicable sovereign laws and compliance related to the application data for the application;
generating, by the at least one hardware processor, based on the annotated knowledge graph and the applicable sovereign laws and compliance related to the application data for the application, a sovereign cloud strategy related to the application data for the application;
applying, by the at least one hardware processor, based on the sovereign cloud strategy related to the application data for the application, the sovereign cloud strategy to the application data for the application; and storing, by the at least one hardware processor, based on application of the sovereign cloud strategy to the application data for the application, the application data for the application.

10. The method for data classification and modelling based application compliance analysis according to claim 9, further comprising:
generating, by the at least one hardware processor, based on the annotated knowledge graph and the applicable sovereign laws and compliance related to the application data for the application, the sovereign cloud strategy that includes a ranking of cloud service providers for storage of the application data for the application.

11. The method for data classification and modelling based application compliance analysis according to claim 10, wherein generating, by the at least one hardware processor, based on the annotated knowledge graph and the applicable sovereign laws and compliance related to the application data for the application, the sovereign cloud strategy that includes the ranking of cloud service providers for storage of the application data for the application, further comprises:
determining, by the at least one hardware processor, for each cloud service provider of the cloud service providers, and for each factor of a plurality of factors associated with the applicable sovereign laws and compliance, a score.

12. The method for data classification and modelling based application compliance analysis according to claim 11, wherein determining, by the at least one hardware processor, for each cloud service provider of the cloud service providers, and for each factor of the plurality of factors associated with the applicable sovereign laws and compliance, the score, further comprises:
modifying, by the at least one hardware processor, based on a weight associated with each factor of the plurality of factors, the score to generate, for each cloud service provider of the cloud service providers, and for each factor of the plurality of factors, a weighted score.

13. The method for data classification and modelling based application compliance analysis according to claim 12, further comprising:
determining, by the at least one hardware processor, for each cloud service provider of the cloud service providers and based on the weighted score corresponding to each factor of the plurality of factors, an overall weighted factor score; and
ranking, by the at least one hardware processor, based on the overall weighted factor score tor each cloud service provider of the cloud service providers, the cloud service providers.

14. The method for data classification and modelling based application compliance analysis according to claim 10, further comprising:
generating, by the at least one hardware processor, for a highest ranked cloud service provider of the ranked cloud service providers, a ranking of cloud service provider offerings for storage of the application data for the application.

15. The method for data classification and modelling based application compliance analysis according to claim 14, further comprising:
applying, by the at least one hardware processor, based on the sovereign cloud strategy related to the application data for the application, a highest ranked cloud service provider offering of the ranked cloud service provider offerings to store the application data for the application.

16. The method for data classification and modelling based application compliance analysis according to claim 9, wherein the annotated knowledge graph further comprises at least one of:
a data classification model to classify the application data according to the data laws;
a regional model to encapsulate geographies with respect to larger geographical entities;
a data regulations model to encapsulate the data laws for regions associated with storage of the application data for the application;
a cloud service provider model to encapsulate properties associated with cloud service providers for the storage of the application data for the application; or a cloud service provider offering model to encapsulate cloud service offerings associated with the cloud service providers.

17. A non-transitory computer readable medium having stored thereon machine readable instructions, the machine readable instructions, when executed by at least one hardware processor, cause the at least one hardware processor to:
generate, for application data for an application, and based on data laws and a knowledge graph schema, an annotated knowledge graph;
generate, based on the annotated knowledge graph, an indication of applicable sovereign laws and compliance related to the application data for the application; and
generate, based on the annotated knowledge graph and the applicable sovereign laws and compliance related to the application data for the application, a sovereign cloud strategy related to the application data for the application, apply, based on the sovereign cloud strategy related to the application data for the application, the sovereign cloud strategy to the application data for the application; and
store, based on application of the sovereign cloud strategy to the application data for the application, the application data for the application.

18. The non-transitory computer readable medium according to claim 17, the machine readable instructions, when executed by at least one hardware processor, further cause the at least one hardware processor to:
generate, based on the annotated knowledge graph and the applicable sovereign laws and compliance related to the application data for the application, the sovereign cloud strategy that includes a ranking of cloud service providers for storage of the application data for the application.

19. The non-transitory computer readable medium according to claim 18, the machine readable instructions to generate, based on the annotated knowledge graph and the applicable sovereign laws and compliance related to the application data for the application, the sovereign cloud strategy that includes the ranking of cloud service providers for storage of the application data for the application, when executed by at least one hardware processor, further cause the at least one hardware processor to:
determine, for each cloud service provider of the cloud service providers, and for each factor of a plurality of factors associated with the applicable sovereign laws and compliance, a score.

20. The non-transitory computer readable medium according to claim 19, the machine readable instructions to determine, for each cloud service provider of the cloud service providers, and for each factor of the plurality of factors associated with the applicable sovereign laws and compliance, the score, when executed by at least one hardware processor, further cause the at least one hardware processor to:

modify, based on a weight associated with each factor of the plurality of factors, the score to generate, for each cloud service provider of the cloud service providers, and for each factor of the plurality of factors, a weighted score.

\* \* \* \* \*

UNITED STATES PATENT AND TRADEMARK OFFICE
CERTIFICATE OF CORRECTION

| | | |
|---|---|---|
| PATENT NO. | : 11,416,524 B2 | Page 1 of 1 |
| APPLICATION NO. | : 17/100569 | |
| DATED | : August 16, 2022 | |
| INVENTOR(S) | : Kapil Singi et al. | |

It is certified that error appears in the above-identified patent and that said Letters Patent is hereby corrected as shown below:

In the Claims

At Claim 13, Column 25, Line 51 from the top, the phrase "tor each" should instead read "for each".

At Claim 17, Column 26, Line 35 from the top, the phrase "for the application," should instead read "for the application;".

Signed and Sealed this
Twenty-fifth Day of July, 2023

Katherine Kelly Vidal
*Director of the United States Patent and Trademark Office*